US010958847B2

(12) United States Patent
Sakamoto et al.

(10) Patent No.: US 10,958,847 B2
(45) Date of Patent: Mar. 23, 2021

(54) IMAGING DEVICE, IMAGE PROCESSING METHOD, AND IMAGE PROCESSING SYSTEM

(71) Applicant: SONY SEMICONDUCTOR SOLUTIONS CORPORATION, Kanagawa (JP)

(72) Inventors: Junichi Sakamoto, Kanagawa (JP); Yasunori Kano, Kanagawa (JP); Yasushi Sato, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/469,434

(22) PCT Filed: Jan. 5, 2018

(86) PCT No.: PCT/JP2018/000083
§ 371 (c)(1),
(2) Date: Jun. 13, 2019

(87) PCT Pub. No.: WO2018/135315
PCT Pub. Date: Jul. 26, 2018

(65) Prior Publication Data
US 2020/0112662 A1 Apr. 9, 2020

(30) Foreign Application Priority Data
Jan. 20, 2017 (JP) .............................. JP2017-008180

(51) Int. Cl.
H04N 5/235 (2006.01)
H04N 9/04 (2006.01)
(Continued)

(52) U.S. Cl.
CPC ............... *H04N 5/235* (2013.01); *G06T 7/74* (2017.01); *G06T 7/90* (2017.01); *H04N 5/33* (2013.01);
(Continued)

(58) Field of Classification Search
None
See application file for complete search history.

(56) References Cited

U.S. PATENT DOCUMENTS 6,741,279 B1* 5/2004 Allen ................. G01B 11/2513
348/207.99
2009/0278048 A1* 11/2009 Choe ................. H01L 27/14652
250/339.05
(Continued)

FOREIGN PATENT DOCUMENTS

JP 20142-07493 A 10/2014
JP 2017-005401 A 1/2017
(Continued)

OTHER PUBLICATIONS

International Search Report and Written Opinion of PCT Application No. PCT/JP2018/000083, dated Mar. 20, 2018, 10 pages of ISRWO.

Primary Examiner — Mark T Monk
(74) Attorney, Agent, or Firm — Chip Law Group

(57) ABSTRACT

Provided is an imaging device, an image processing method, and an image processing system which obtains a sensing image and a viewing image by one imaging element. The imaging device includes a control unit that controls irradiation with invisible light, an imaging element that includes a first pixel that is capable of detecting the invisible light, and a second pixel that is capable of detecting visible light. The imaging device further includes an image generation unit that generates a first image including the invisible light component and a second image including a visible light
(Continued)

component on the basis of a first pixel signal transmitted from the first pixel and a second pixel signal transmitted from the second pixel.

15 Claims, 40 Drawing Sheets

(51) Int. Cl.
G06T 7/73 (2017.01)
G06T 7/90 (2017.01)
H04N 5/33 (2006.01)
(52) U.S. Cl.
CPC .............. G06T 2207/10024 (2013.01); G06T 2207/10048 (2013.01)

(56) References Cited

U.S. PATENT DOCUMENTS

2013/0002882 A1* 1/2013 Onozawa ............... H04N 5/332
                                                                      348/164
2014/0351073 A1* 11/2014 Murphy ................ G01B 11/02
                                                                      705/23
2016/0255286 A1* 9/2016 Tsukada ................ G02B 5/201
                                                                      348/162

FOREIGN PATENT DOCUMENTS

WO    2013/027340 A1    2/2013
WO    2015/059897 A1    4/2015
WO    2016/199573 A1    12/2016

* cited by examiner

FIG.12

| R | W | B | W |
|---|---|---|---|
| W | G | W | G |
| B | W | R | W |
| W | G | W | G |

FIG.41

| G | B |
|---|---|
| R | W |

FIG.42

IMAGING DEVICE, IMAGE PROCESSING METHOD, AND IMAGE PROCESSING SYSTEM

CROSS REFERENCE TO RELATED APPLICATIONS

This application is a U.S. National Phase of International Patent Application No. PCT/JP2018/000083 filed on Jan. 5, 2018, which claims priority benefit of Japanese Patent Application No. JP 2017-008180 filed in the Japan Patent Office on Jan. 20, 2017. Each of the above-referenced applications is hereby incorporated herein by reference in its entirety.

TECHNICAL FIELD

The present technology relates to an imaging device, an image processing method, and an image processing system, and more particularly, to an imaging device, an image processing method, and an image processing system which are suitable for a use in the case of capturing an image through irradiation with invisible light.

BACKGROUND ART

In the related art, there is suggested a configuration in which a coherent random spectacle pattern is projected to an object to capture an image, and a three-dimensional map of the object is constructed on the basis of a deviation between a pattern in an acquired image and a pattern in a reference image (for example, refer to Patent Literature 1).

CITATION LIST

Patent Literature

Patent Literature 1: International Publication No. 2007/043036

DISCLOSURE OF INVENTION

Technical Problem

However, in the invention described in Patent Literature 1, there is no consideration for capturing of a viewing image including visible light components for observing an object in addition to a sensing image for constructing the three-dimensional map.

In addition, typically, in the case of performing depth sensing, a sensing sensor such as a time-of-fight (ToF) sensor, a stereo camera, and an IR sensor is provided separately from a viewing sensor that captures the viewing image. However, when the sensing sensor and the viewing sensor are separately provided, parallax occurs between the sensors. Accordingly, for example, in the case of applying a result of the depth sensing to the viewing image, it is necessary to perform parallax correction.

The present technology has been made in consideration of such circumstances, and an object thereof is to obtain a sensing image and a viewing image by one imaging element.

Solution to Problem

An image device according to a first aspect of the present technology includes: a control unit that controls irradiation with invisible light; an imaging element that includes a first pixel that is capable of detecting the invisible light, and a second pixel that is capable of detecting visible light; and an image generation unit that generates a first image including the invisible light component and a second image including a visible light component on the basis of a first pixel signal transmitted from the first pixel and a second pixel signal transmitted from the second pixel.

An object detection unit, which performs detection of a distance to an object on the basis of the first image and performs detection of an object in the second image on the basis of a detection result of the distance to the object, may be further provided.

The control unit may be caused to control irradiation with the invisible light that projects a predetermined pattern.

A filter that attenuates the invisible light component that is included in light incident to a light-receiving unit of the second pixel may be provided in the imaging element.

The control unit may be caused to perform control so that irradiation with the invisible light is continuously performed.

The control unit may be caused to set an exposure period of the first pixel and the second pixel in each frame period, to set an independent exposure period that is a period in which only the first pixel is exposed, and to perform control so that irradiation with the invisible light is performed in the independent exposure period.

The control unit may be caused to control presence or absence of irradiation with the invisible light for every frame period, and the image generation unit may be caused to generate the first image on the basis of the first pixel signal in a frame period in which irradiation with the invisible light is performed, and to generate the second image on the basis of the second pixel signal in a frame period in which irradiation with the invisible light is not performed.

The first pixel may include an IR pixel that is used in detection of infrared light, the second pixel may include a color pixel that is used in detection of a predetermined color, and the invisible light may be set to infrared light.

The color pixel may include an R pixel that is used in detection of a red color, a G pixel that is used in detection of a green color, and a B pixel that is used in detection of a blue color.

The first pixel may include a white pixel, the second pixel may include a color pixel that is used in detection of a predetermined color, and the invisible light may be set to infrared light.

The color pixel may include an R pixel that is used in detection of a red color, a G pixel that is used in detection of a green color, and a B pixel that is used in detection of a blue color.

An irradiation unit that performs irradiation with the invisible light may be further provided.

The irradiation unit may be caused to perform irradiation with the invisible light having same brightness, or the invisible light that projects a predetermined pattern.

An image processing method according to the first aspect of the present technology includes: a control step of controlling irradiation with invisible light; and an image generation step of generating a first image including the invisible light component, and a second image including a visible light component on the basis of a first pixel signal transmitted from a first pixel of an imaging element and a second pixel signal transmitted from a second pixel of the imaging element, the first pixel being capable of detecting the invisible light, the second pixel being capable of detecting visible light.

An image processing system according to a second aspect of the present technology includes: an irradiation device that performs irradiation with invisible light; an imaging device that includes an imaging element including a first pixel capable of detecting the invisible light and a second pixel capable of detecting visible light; and an image processing device that generates a first image including the invisible light component and a second image including a visible light component on the basis of a first pixel signal transmitted from the first pixel and a second pixel signal transmitted from the second pixel.

In the first aspect of the present technology, irradiation with invisible light is controlled, and a first image including the invisible light component and a second image including a visible light component are generated on the basis of a first pixel signal that is transmitted from a first pixel of an imaging element and a second pixel signal that is transmitted from a second pixel of the imaging element, the first pixel being capable of detecting the invisible light, the second pixel being capable of detecting visible light.

In the second aspect of the present technology, irradiation with invisible light is performed, and a first image including the invisible light component and a second image including a visible light component are generated on the basis of a first pixel signal that is transmitted from a first pixel of an imaging element and a second pixel signal that is transmitted from a second pixel of the imaging element, the first pixel being capable of detecting the invisible light, the second pixel being capable of detecting visible light.

Advantageous Effects of Invention

In accordance with the first aspect or the second aspect of the present technology, it is possible to obtain a sensing image and a viewing image by one imaging element.

It should be noted that the effect described here is not limited, and may be any one effect described in the present disclosure.

BRIEF DESCRIPTION OF DRAWINGS

FIG. 12 is a view illustrating an example of a color signal after component separation.

FIG. 41 is a view illustrating a second modification example of the pixel array of the imaging element.

FIG. 42 is a view illustrating a third modification example of the pixel array of the imaging element.

MODE(S) FOR CARRYING OUT THE INVENTION

Hereinafter, modes for carrying out the present technology (hereinafter, referred to as embodiments) will be described. Description will be made in the following order.
1. Embodiment
2. Modification Example
3. Application Example

1. First Embodiment

First, an embodiment of the present technology will be described with reference to FIG. 1 to FIG. 36.

[Configuration Example of Imaging Device 100]

Figure 1:
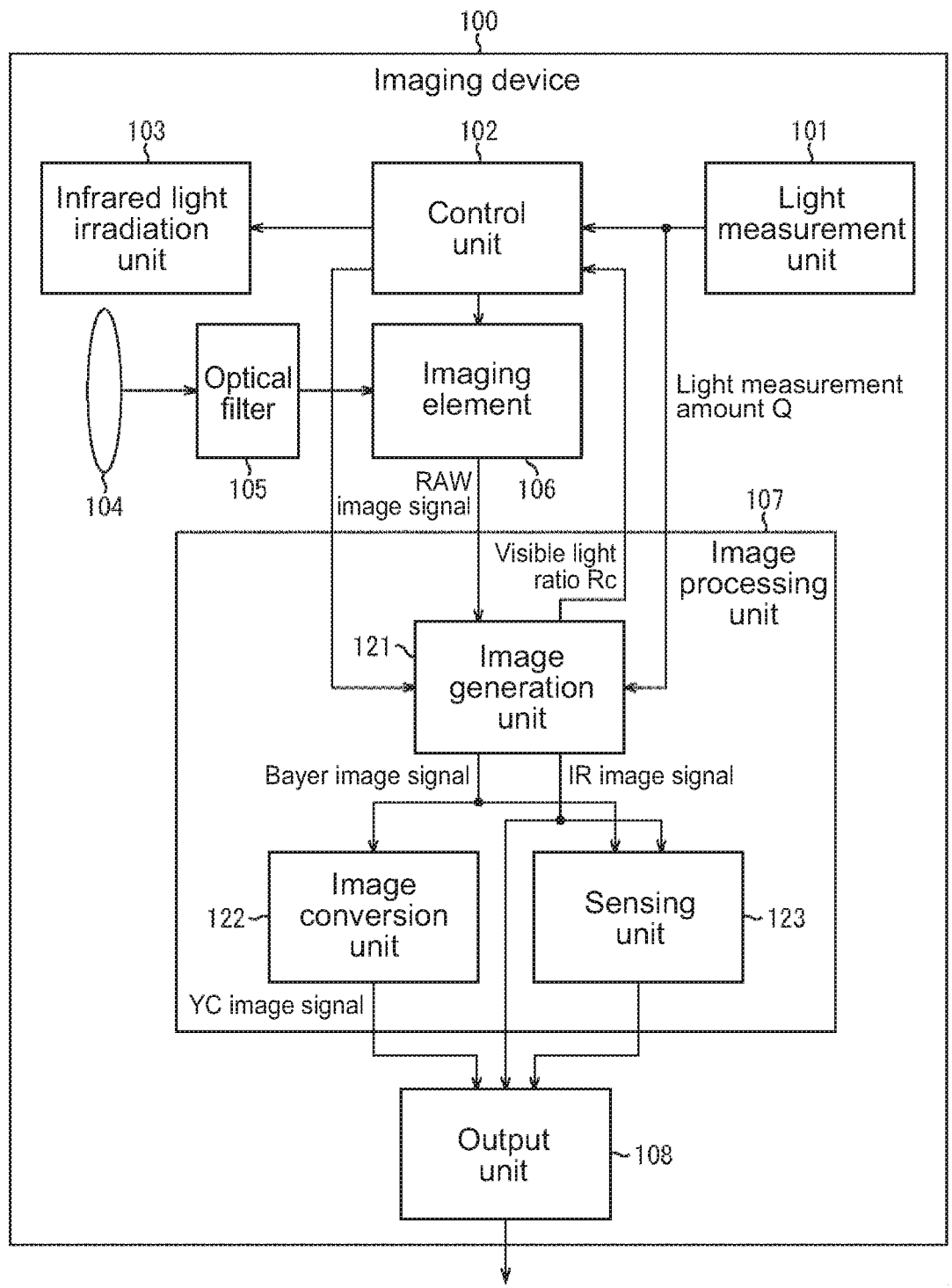
FIG. 1 is a block diagram illustrating a configuration example of an imaging device to which the present technology is applied.

FIG. 1 is a block diagram illustrating a configuration example of an imaging device 100 that is one embodiment of the present technology. The imaging device 100 includes a light measurement unit 101, a control unit 102, an infrared light irradiation unit 103, an imaging lens 104, an optical filter 105, an imaging element 106, an image processing unit 107, and an output unit 108. In addition, the image processing unit 107 includes an image generation unit 121, an image conversion unit 122, and a sensing unit 123.

The light measurement unit 101 measures brightness of surroundings of the imaging device 100, and supplies a light measurement amount Q indicating a measurement result to the control unit 102 and the image generation unit 121.

The control unit 102 controls the entirety of the imaging device 100. For example, the control unit 102 acquires a visible light ratio Rc indicating a ratio of visible light component in an image signal from the image generation unit 121. In addition, the control unit 102 sets an imaging mode of the imaging device 100 on the basis of user's setting, the light measurement amount Q, and the visible light ratio Rc. The control unit 102 supplies a mode signal indicating the imaging mode that is set to the image generation unit 121.

For example, the imaging mode is classified into two modes including a sensing mode and a viewing mode. For example, the sensing mode is a mode in the case of performing sensing such as detection of an object, and the viewing mode is a mode in the case of performing observation of a subject without performing sensing. It should be noted that even in the sensing mode, it is possible to observe a subject in parallel to sensing.

The viewing mode is classified into three modes including a day mode, a CNV mode, and a night mode. For example, the day mode is a mode that is used in the case of capturing an image in a state in which surroundings of the imaging device 100 are bright. For example, the CNV mode is a mode that is used in the case of capturing an image in a state in which surroundings of the imaging device 100 are dark, and intensity of infrared light that is included in environmental light (hereinafter, referred to as environmental infrared light) is low. For example, the night mode is a mode that is used in the case of capturing an image in a state in which surroundings of the imaging device 100 are very dark, or in a state in which surroundings of the imaging device 100 are dark, and the intensity of the environmental infrared light is high. In the day mode and the CNV modes, a color image and a monochrome image are obtained, and in the night mode, a monochrome image is obtained.

It should be noted that details of the imaging modes will be described later.

In addition, for example, the control unit 102 controls the imaging element 106 in accordance with a user's operation and the like to generate an image signal. For example, the control unit 102 generates a vertical synchronizing signal VSYNC indicating an imaging timing, and supplies the vertical synchronizing signal VSYNC to the imaging element 106. In addition, the control unit 102 controls ON/OFF of a shutter for every pixel of the imaging element 106 in correspondence with an imaging mode. The shutter for every pixel represents a function of controlling an exposure period of a pixel for every color as described later.

In addition, for example, the control unit 102 controls an irradiation period of the infrared light irradiation unit 103 in correspondence with an imaging mode.

In addition, for example, the control unit 102 controls ON/OFF of a component separation unit 303 (FIG. 9) of the image generation unit 121 in correspondence with an imaging mode.

The infrared light irradiation unit 103 irradiates an imaging range (subject) with infrared light in accordance with control of the control unit 102.

Figure 2:
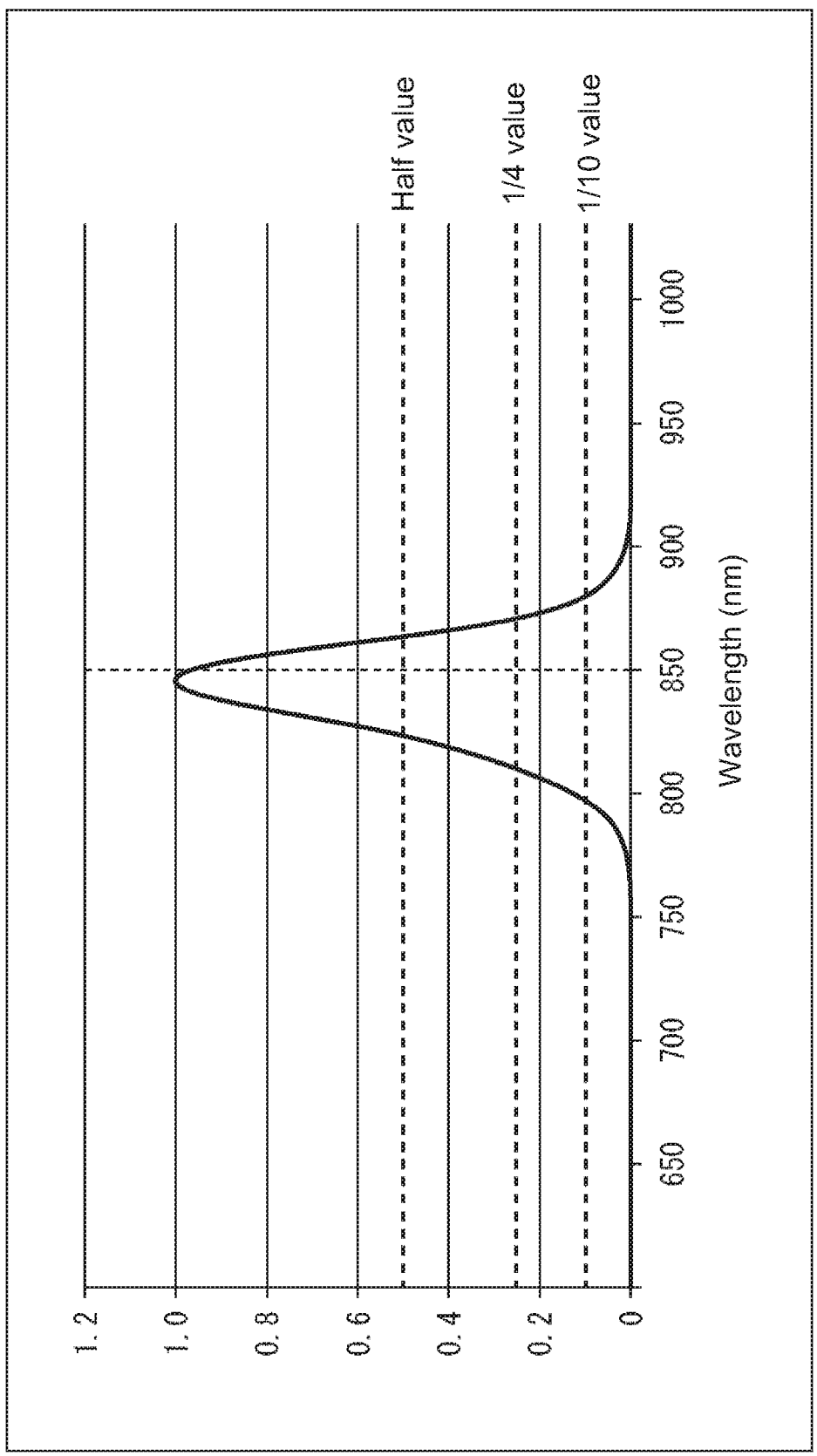
FIG. 2 is a graph showing an example of wavelength characteristics of infrared light.

FIG. 2 is a graph showing an example of wavelength characteristics of infrared light that is emitted from the infrared light irradiation unit 103. In the same drawing, the horizontal axis represents a wavelength of light, and the vertical axis represents a value obtained by normalizing intensity of infrared light. As illustrated in the same drawing, for example, the infrared light irradiation unit 103 emits infrared light in which the vicinity of 845 nm is set as a peak, and full width at half maximum becomes a range of approximately 820 nm to approximately 865 nm.

The imaging lens 104 condenses light from a subject, and guides the light to the imaging element 106 through the optical filter 105.

For example, the optical filter 105 is constituted by a dual band-pass filter through which visible light and infrared light in the light from the imaging lens 104 is transmitted.

Figure 3:
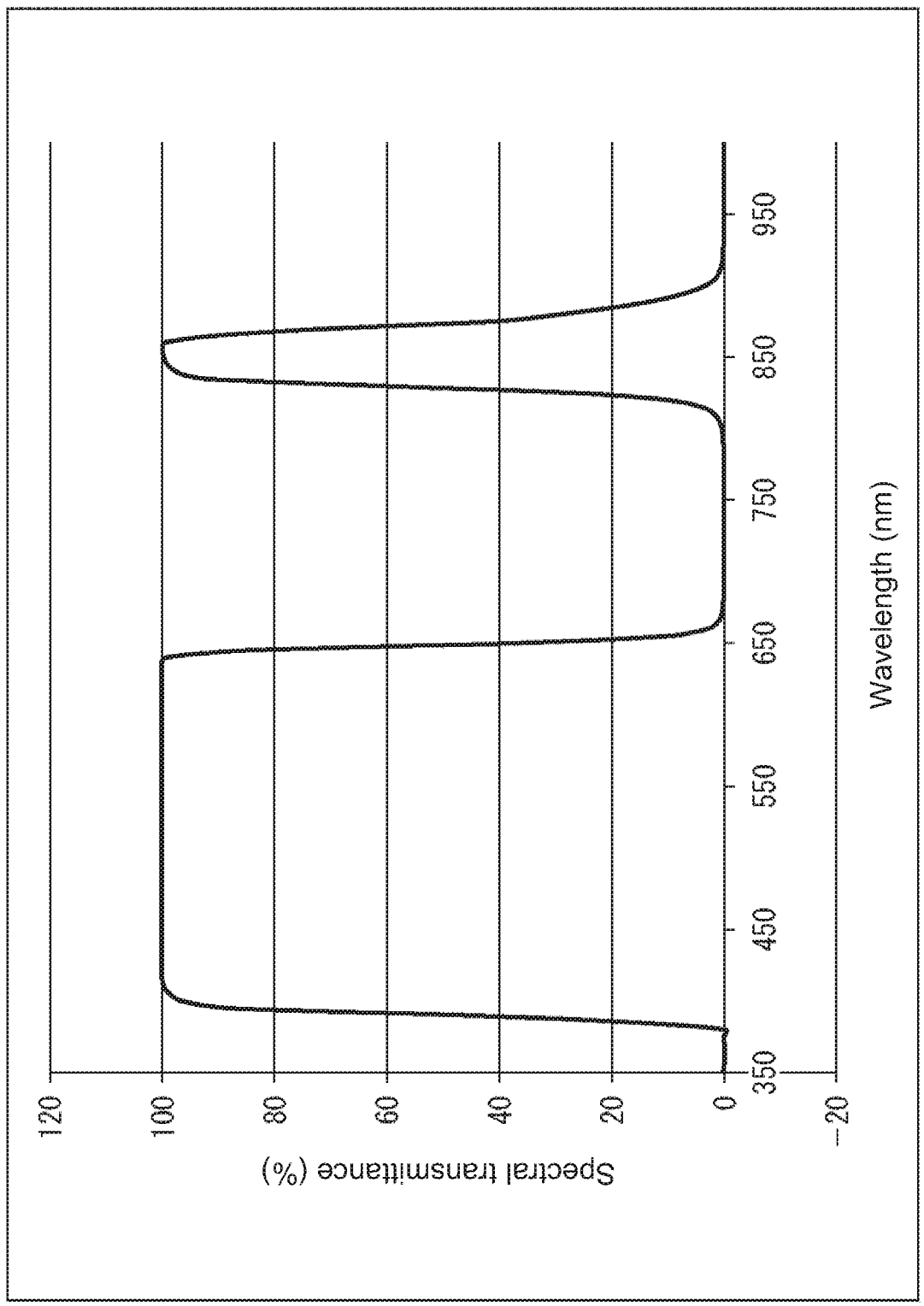
FIG. 3 is a graph showing an example of transmission characteristics of an optical filter.

FIG. 3 is a graph showing an example of transmission characteristics of the optical filter 105. In the same drawing, the horizontal axis represents a wavelength of light, and the vertical axis represents a spectral transmittance of the optical filter 105. As illustrated in the same drawing, for example, the optical filter 105 allows visible light in a wavelength region near 380 nm to 650 nm and infrared light in a wavelength near 830 nm to 870 nm to be transmitted therethrough.

It should be noted that it is possible to employ a configuration in which the optical filter 105 is not provided, but it is desirable to provide the optical filter 105 from the viewpoint of separating infrared light with high accuracy.

The imaging element 106 converts light that is received through the imaging lens 104 and the optical filter 105 into an electric signal to generate image data. For example, as described later with reference to FIG. 5, in the imaging element 106, a red (R) pixel that is used in detection of a red color, a green (G) pixel that is used in detection of a green color, a blue (B) pixel that is used in detection of a blue color, and an infrared (IR) pixel that is used in detection of infrared light are provided in a two-dimensional lattice shape.

The imaging element 106 performs analog to digital (AD) conversion for every pixel with respect to analog electric signals which are photoelectrically converted in each pixel to generate pixel signals which are digital signals, and generates image signals (hereinafter, referred to as RAW image signals) including the pixel signals. As the imaging element 106, for example, a charge coupled device (CCD) sensor or a complementary metal oxide semiconductor (CMOS) sensor is used. The imaging element 106 supplies the RAW image signals which are generated to the image generation unit 121.

The image generation unit 121 removes an invisible light component (for example, an infrared light component) from the RAW image signals, and converts the RAW image signals from which the invisible light component is removed into Bayer image signals in which pixel signals are arranged in accordance with a Bayer array. In addition, the image generation unit 121 extracts an invisible light component (for example, an infrared light component) from the RAW image signals, and generates IR image signals including the extracted invisible light component. The image generation unit 121 supplies the Bayer image signals to the image conversion unit 122 and the sensing unit 123. In addition, the image generation unit 121 supplies the IR image signals to the sensing unit 123 and the output unit 108.

The image conversion unit 122 performs predetermined signal processing such as demosaic processing with respect to the Bayer image signals. The image conversion unit 122 converts image signals after being subjected to the demosaic processing into YC image signals including a luminance signal and a color difference signal for every pixel, and supplies the YC image signals to the output unit 108.

The sensing unit 123 performs sensing such as detection of an object on the basis of the IR image signals and the Bayer image signals. The sensing unit 123 supplies a sensing result to the output unit 108.

The output unit 108 outputs the YC image signals, the IR image signals, and the sensing result to a device (for example, a display device or the like) on an outer side of the imaging device 100.

It should be noted that the imaging device 100 outputs the YC image signals, the IR image signals, and the sensing result to an outer side, but there is no limitation to the configuration. For example, the imaging device 100 may further include a recording unit such as a memory, and may records the YC image signals, the IR image signals, and the sensing result in the recording unit. In addition, the imaging device 100 may further include a display unit such as a liquid crystal monitor, and may display an image based on the YC image signals, an image based on the IR image signals, or the sensing result on the display unit.

In addition, FIG. 1 illustrates an example in which all of the light measurement unit 101, the control unit 102, the infrared light irradiation unit 103, the imaging lens 104, the optical filter 105, the imaging element 106, the image processing unit 107, and the output unit 108 are provided on an inner side of the imaging device 100, but the units may be formed in a state of being dispersed to a plurality of devices. For example, the light measurement unit 101, the control unit 102, the imaging lens 104, the optical filter 105, and the imaging element 106 may be provided in the imaging device 100, and the image processing unit 107 and the output unit 108 may be provided in an image processing device. In addition, for example, the infrared light irradiation unit 103 may be provided separately from the imaging device 100.

[Configuration Example of Imaging Element]

Figure 4:
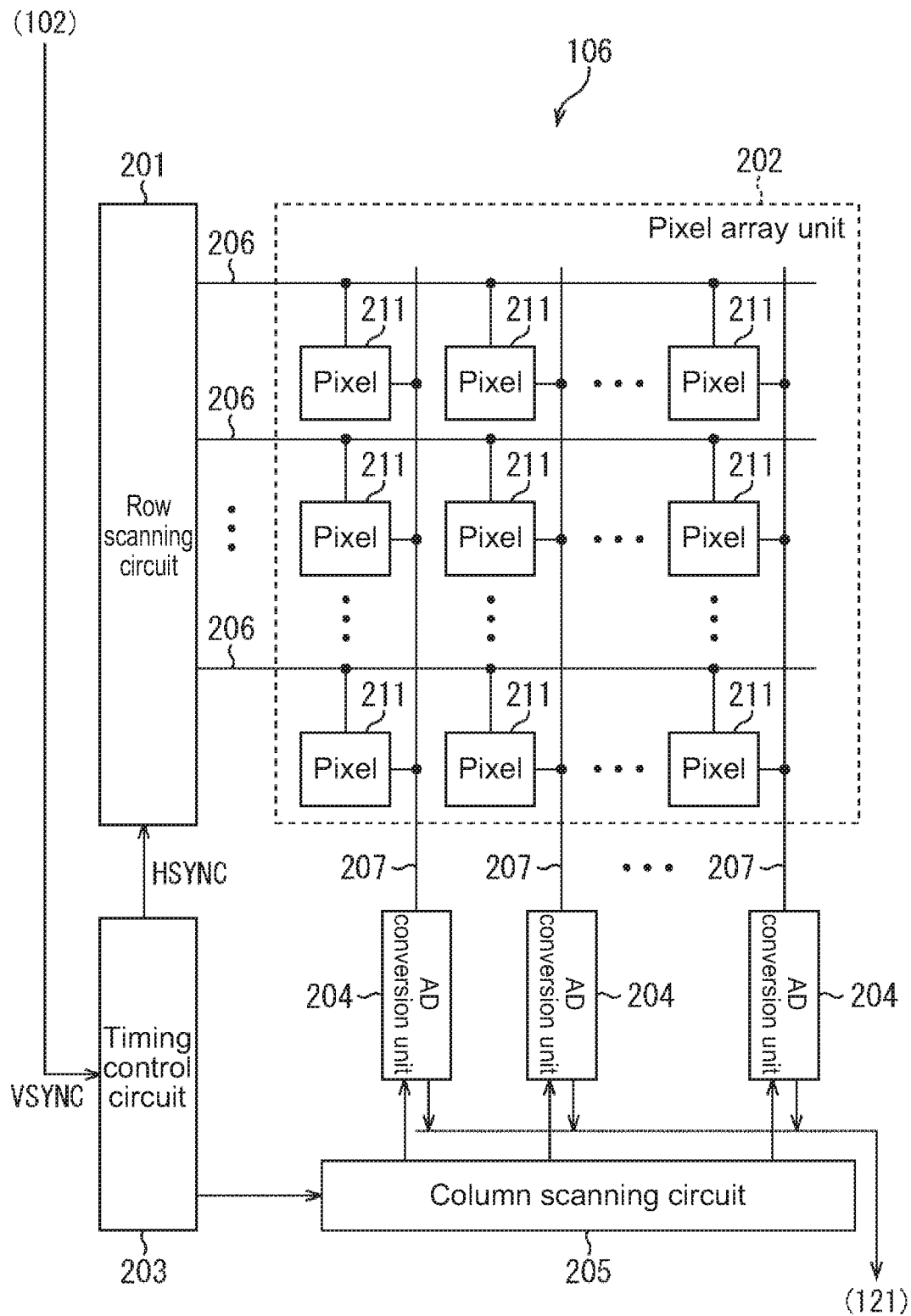
FIG. 4 is a block diagram illustrating a configuration example of an imaging element.

FIG. 4 is a block diagram illustrating a configuration example of the imaging element 106. The imaging element 106 includes a row scanning circuit 201, a pixel array unit 202, a timing control circuit 203, an analog to digital (AD) conversion unit 204, and a column scanning circuit 205. A plurality of pixels 211 are provided in the pixel array unit 202 in a two-dimensional lattice shape.

The timing control circuit 203 controls a scanning timing of a column and a row. Here, in the row of the pixel array unit 202, a plurality of pixels 211 are arranged in an arbitrary one direction, and the row is also referred to as a line. In addition, in the column of the pixel array unit 202, a plurality of pixels 211 are arranged in a direction that is orthogonal to the row. Pixels 211 of n rows and m columns are arranged in the pixel array unit 202. Here, n and m represents an integer.

The timing control circuit 203 generates a horizontal synchronizing signal HSYNC that gives an instruction for a row scanning timing in synchronization with a vertical synchronizing signal VSYNC from the control unit 102, and supplies the horizontal synchronizing signal HSYNC to the row scanning circuit 201. In addition, the timing control circuit 203 generates a timing signal that gives an instruction for a column scanning timing in synchronization with the horizontal synchronizing signal HSYNC, and supplies the vertical synchronizing signal VSYNC to the column scanning circuit 205.

The row scanning circuit 201 selects each of rows in synchronization with the horizontal synchronizing signal HSYNC. The row scanning circuit 201 selects the row by sequentially outputting a row selection signal to each of the rows through a signal line 206. In addition, whenever the row is selected, the row scanning circuit 201 exposes pixels 211 of the row over a predetermined exposure period in correspondence with an imaging mode.

The pixels 211 convert incident light into electric signal, and supplies the electric signal that is generated to the AD conversion unit 204 through signal lines 207 in corresponding columns.

Figures 5, 6:
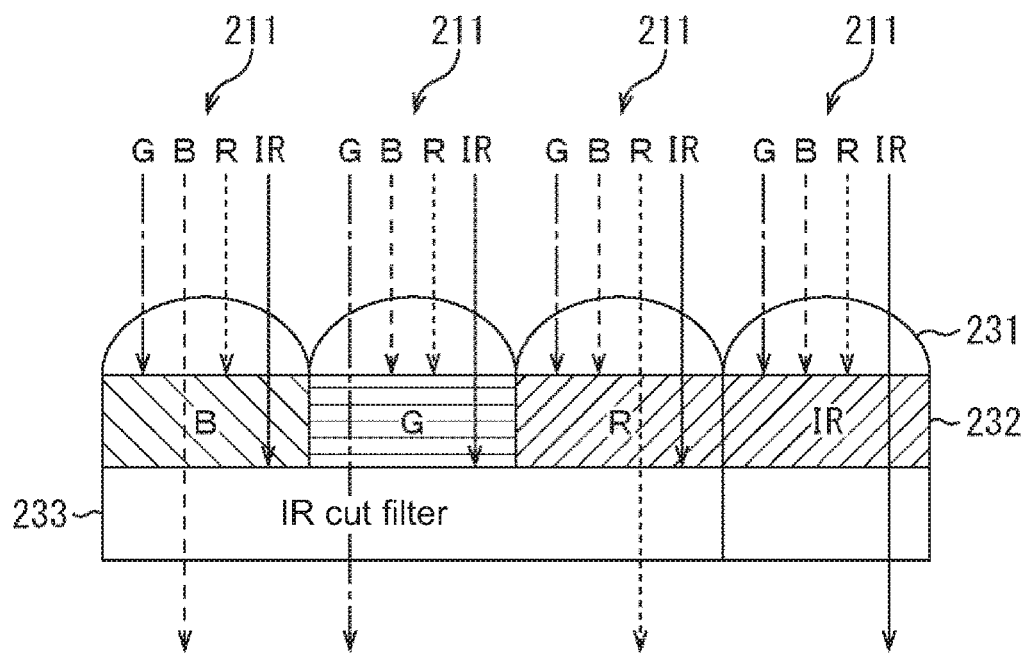
FIG. 5 is a view illustrating an example of a pixel array of the imaging element.
FIG. 6 is a schematic view illustrating a configuration example of a filter of each pixel of the imaging element.

FIG. 5 illustrates an example of an array of the pixels 211 in the pixel array unit 202. In this example, an example of a pixel array in which a pattern of four pixels (vertical)×four pixels (horizontal) is set as one unit is illustrated, and the pixels 211 are arranged in a ratio of R pixels:G pixels:B pixels:IR pixels=2:8:2:4. More specifically, the G pixels are arranged in a checkered pattern. The R pixels are disposed at a first column of a first row and at a third column of a third row. The B pixels are disposed at a third column of the first row and at a first column of the third row. The IR pixels are disposed at the remaining pixel positions. In addition, the pixel array pattern is repetitively disposed in a row direction and in a column direction on the pixel array unit 202.

FIG. 6 schematically illustrates a configuration example of a filter of each of the pixels 211. In the example, a B pixel, a G pixel, an R pixel, and an IR pixel are arranged from a left side to a right side.

In the R pixels, the G pixel, and the B pixel, a microlens array 231, a color filter 232, and an IR cut filter 233 are laminated in this order from a light incidence side. In the color filter 232, an R filter that allows wavelength regions of red and infrared light to be transmitted therethrough is provided with respect to the R pixel, a G filter that allows wavelength regions of green and infrared light to be transmitted therethrough is provided with respect to the G pixel, and a B filter that allows wavelength regions of blue and infrared light to be transmitted through is provided with respect to the B pixel.

Figure 7:
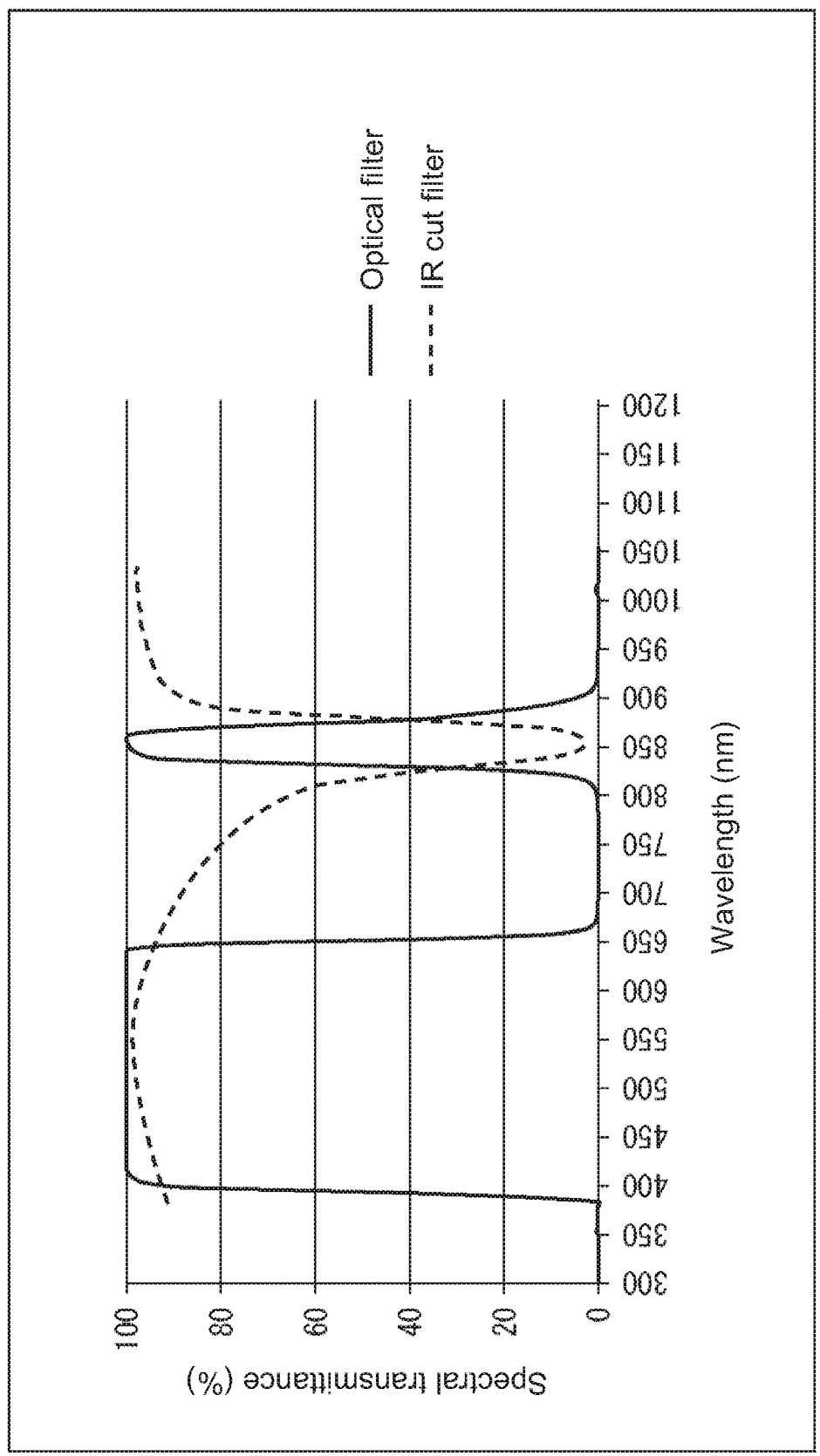
FIG. 7 is a graph showing an example of transmission characteristics of an IR cut filter.

FIG. 7 is a graph showing an example of transmission characteristics of the IR cut filter 233. In the same drawing, the horizontal axis represents a wavelength of light, and the vertical axis represents a spectral transmittance. In addition, a dotted line represents transmission characteristics of the IR cut filter 233, and a solid line represents transmission characteristics of the optical filter 105 as in FIG. 3.

The IR cut filter 233 mainly attenuates infrared light in a wavelength region near 830 nm to 870 nm which is transmitted through the optical filter 105. Accordingly, infrared light components which are included in light incident to a light-receiving unit (for example, a photodiode) (not illustrated) of the R pixel, the G pixel, and the B pixel are attenuated by the IR cut filter 233.

In the IR pixel, the microlens array 231 and the color filter 232 are laminated in this order from the light incident side, and the IR cut filter 233 is not laminated. In the color filter 232, an IR filter which attenuates visible light and through which infrared light is transmitted is provided with respect to the IR pixel.

Figure 8:
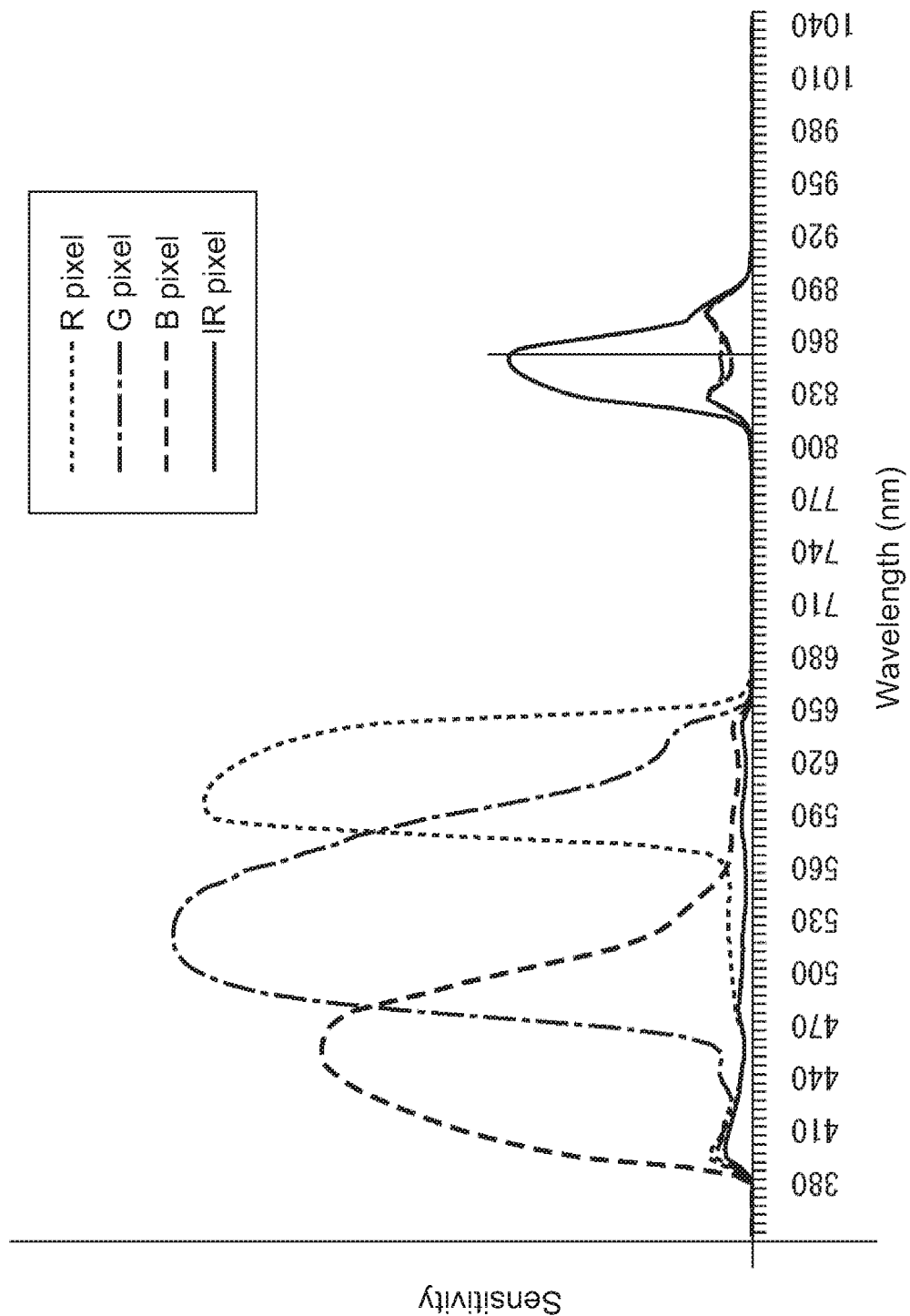
FIG. 8 is a graph showing a first example of sensitivity characteristics for every pixel.

FIG. 8 is a graph showing an example of sensitivity characteristics for every pixel 211. In the same drawing, the horizontal axis represents a wavelength of light, and the vertical axis represents sensitivity of the pixels 211 with respect to light of the wavelength. In addition, a solid line represents sensitivity characteristics of the IR pixels, and a fine dotted line represents sensitivity characteristics of the R pixels. In addition, a one-dot chain line represents sensitivity characteristics of the G pixels, and a rough dotted line represents sensitivity characteristics of the B pixels.

The sensitivity of each of the R pixels, the G pixels, and the B pixels shows a peak with respect to each of red visible right, green visible light, and blue visible light. In addition, since the IR cut filter 233 does not completely shield infrared red light, each of the R pixel, the G pixel, and the B pixel also has slight sensitivity with respect to infrared light. It should be noted that sensitivity of the R pixel, the G pixel, and the B pixel with respect to infrared light is approximately the same in each case, and is very lower in comparison to the IR pixel.

The sensitivity of the IR pixel shows a peak with respect to infrared light of a wavelength near 845 nm. In addition, since the IR filter (R filter+B filter) does not completely shield visible light, the IR pixel also slight sensitivity with respect to visible light. It should be noted that the sensitivity of the IR pixel with respect to visible light is very lower in comparison to the R pixel, the G pixel, and the B pixel.

Returning to FIG. 4, the AD conversion unit 204 is provided for every column, and performs AD conversion with respect to the electric signal from the pixel 211 to generate a digital signal. In addition, the AD conversion unit 204 in a column that is selected by the column scanning circuit 205 supplies the digital signal that is generated to the image generation unit 121 of the image processing unit 107 as a pixel signal.

The column scanning circuit 205 selects a column by sequentially outputting a column selection signal to the AD conversion unit 204 in accordance with a timing signal.

[Configuration Example of Image Generation Unit]

Figure 9:
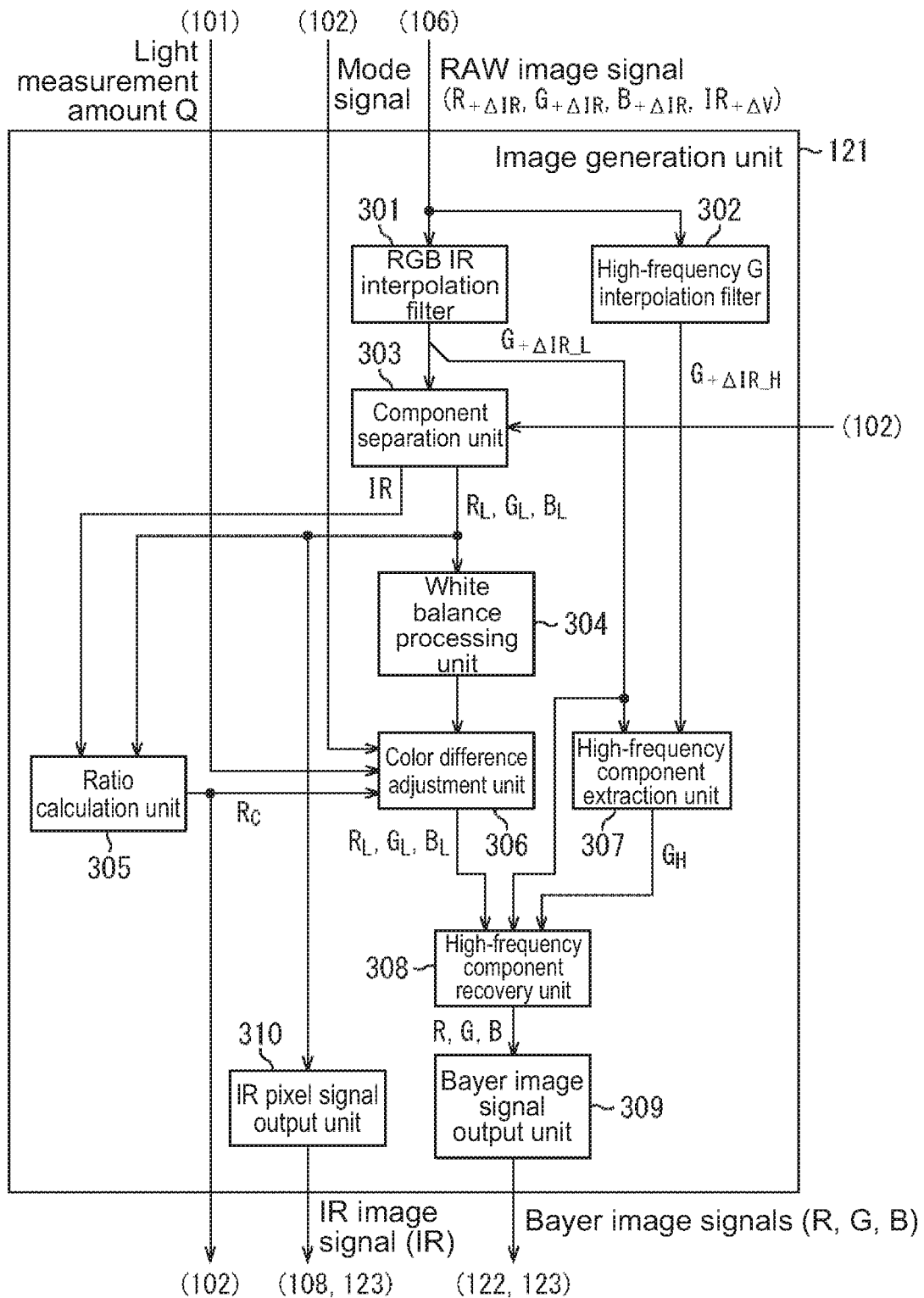
FIG. 9 is a block diagram illustrating a configuration example of an image generation unit.

FIG. 9 is a block diagram illustrating a configuration example of the image generation unit 121. The image generation unit 121 includes an RGBIR interpolation filter 301, a high-frequency G interpolation filter 302, a component separation unit 303, a white balance processing unit 304, a ratio calculation unit 305, a color difference adjustment unit 306, a high-frequency component extraction unit 307, a high-frequency component recovery unit 308, a Bayer image signal output unit 309, and an IR image signal output unit 310.

The RGBIR interpolation filter 301 interpolates all color signals for every pixel signal in the RAW image signals.

Here, as described above with reference to FIG. 8, each of the R pixel, the G pixel, and the B pixel has slight sensitivity with respect to infrared light. Accordingly, color signals of the pixels include a visible light component that is a signal that is photoelectrically converted from visible light, and an infrared light component that is a signal that is photoelectrically converted from infrared light. Accordingly, hereinafter, respective color components of the R pixel, the G pixel, and the B pixel before separating the infrared light component are referred to as "$R_{+\Delta IR}$", "$G_{+\Delta IR}$", and "$B_{+\Delta IR}$". "$_{+\Delta IR}$" that is a suffix represents that a slight infrared light component is included in color signals.

In addition, as described above with reference to FIG. 8, the IR pixel has slight sensitivity with respect to visible light. Accordingly, a color signal of the IR pixel (hereinafter, referred to as "infrared light signal" or "IR signal") includes an infrared light component that is a signal photoelectrically converted from infrared light, and a visible light component that is a signal photoelectrically converted from visible light. Accordingly, hereinafter, an infrared light signal of the IR pixel before separating the visible light component is referred to as "$IR_{+\Delta V}$". "$_{+\Delta V}$" that is a suffix represents that a slight visible light component is included in the infrared light signal.

The RGBIR interpolation filter 301 sequentially pays attention to pixel signals, sets a pixel signal to which attention is paid as an interpolation target, and interpolates a color signal by using pixel signals of surroundings of interpolation target, for example, by using the following Expressions (1) to (4).

[Math. 1]

$$R_{+\Delta IR\_L} = \sum_{i=0}^{M-1} R_{+\Delta IR\_i} \times k_i \qquad (1)$$

$$G_{+\Delta IR\_L} = \sum_{i=0}^{M-1} G_{+\Delta IR\_i} \times k_i \qquad (2)$$

$$B_{+\Delta IR\_L} = \sum_{i=0}^{M-1} B_{+\Delta IR\_i} \times k_i \qquad (3)$$

$$IR_{+\Delta V\_L} = \sum_{i=0}^{M-1} IR_{+\Delta V\_i} \times k_i \qquad (4)$$

In Expressions (1) to (4), M represents the number of pixel signals which are used in the interpolation, and hereinafter, M is referred to as "the number of taps". "i" is an integer of 0 to M−1, and represents a number that identifies the pixel signals which are used in the interpolation. "$k_i$" is a real number coefficient. The coefficient $k_i$ represents is set to a greater value as a distance from a pixel signal according to "i" to the interpolation target is shorter, and is set to the same value when the distance is the same in each case. For example, in a case where $R_{+\Delta IR\_0}$ to $R_{+\Delta IR\_3}$ on upper, lower, left, and right sides of an interpolation target are used in the interpolation, distances to the interpolation target are the same as each other, and thus ¼ is set to all of coefficients $k_0$ to $k_3$.

The RGBIR interpolation filter 301 supplies an $R_{+\Delta IR\_L}$ signal, a $B_{+\Delta IR\_L}$ signal, and $IR_{+\Delta V\_L}$ after interpolation to the component separation unit 303 after interpolation, and supplies a $G_{+\Delta IR\_L}$ signal after interpolation to the component separation unit 303, the high-frequency component extraction unit 307, and the high-frequency component recovery unit 308.

Figure 10:
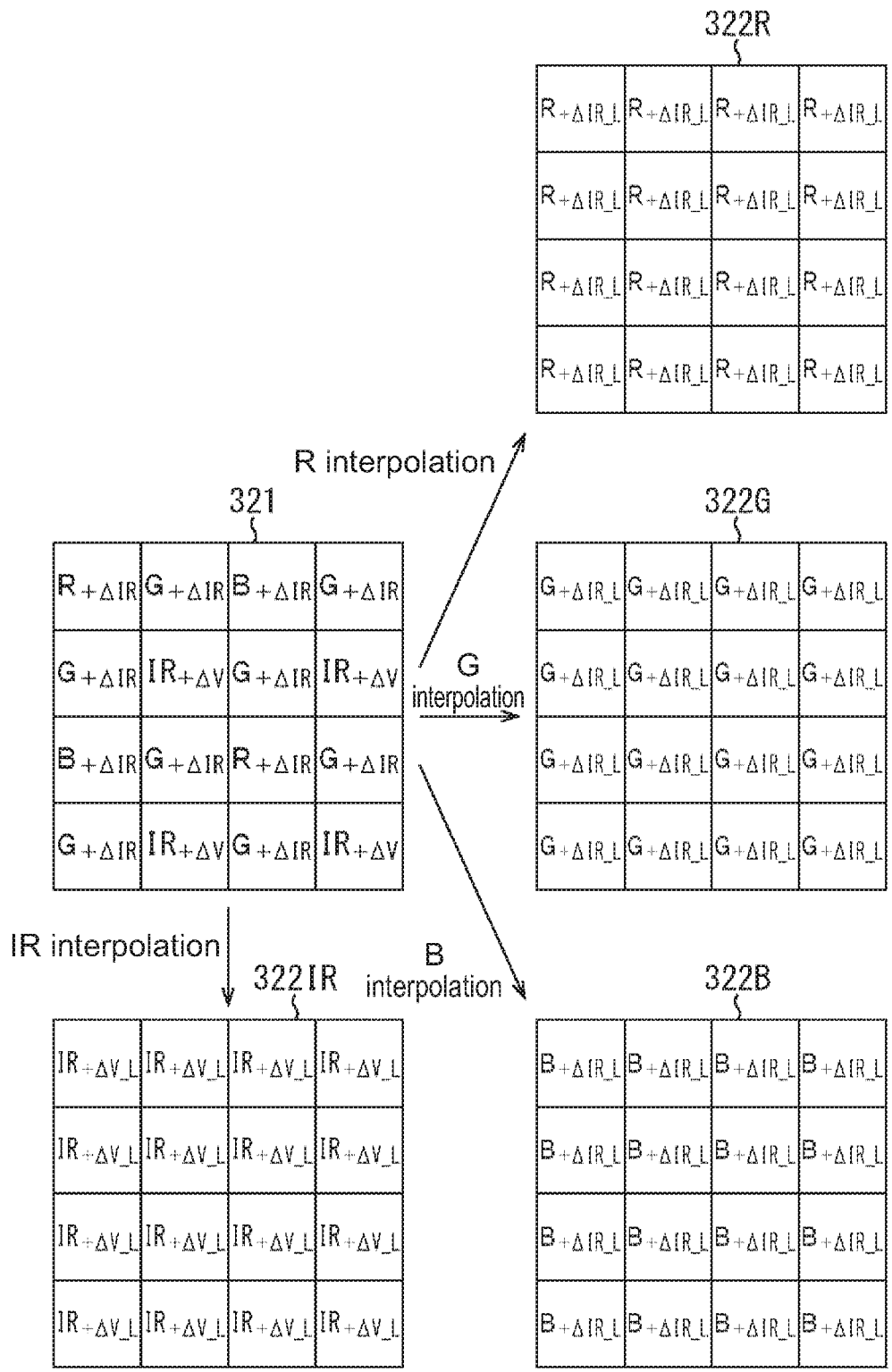
FIG. 10 is a view illustrating an example of an image signal before and after interpolation.

FIG. 10 illustrates an example of image signals before and after interpolation by the RGBIR interpolation filter 301. In RAW image signals 321 before interpolation, $R_{+\Delta IR}$ signals, $G_{+\Delta IR}$ signals, $B_{+\Delta IR}$ signals, and $IR_{+\Delta V}$ signals are arranged in the same array as in FIG. 5.

Data 322IR represents an example of data including $IR_{+\Delta V\_L}$ signals after interpolation. Data 322R represents an example of data including $R_{+\Delta IR\_L}$ signals after interpolation. Data 322G represents an example of data including $G_{+\Delta IR\_L}$ signals after interpolation. Data 322B represents an example of data including $B_{+\Delta IR\_L}$ signals after interpolation. As illustrated in the data 322IR and the data 322G, all color signals are interpolated for every pixel.

The high-frequency G interpolation filter 302 interpolates only G signals for every pixel in RGB image signals.

For example, the high-frequency G interpolation filter 302 interpolates G signals by using the following Expression (5)

[Math. 2]

$$G_{+\Delta IR\_H} = \sum_{i=0}^{N-1} G_{+\Delta IR\_i} \times k_i \quad (5)$$

It should be noted that in Expression (5), N represents the number of taps. "i" and "$k_i$" are the same as in Expression (2). It should be noted that for example, the number of taps N is set to a value that is smaller than the number of taps M of the RGBIR interpolation filter 301. For example, in the RGBIR interpolation filter 301, the number of taps M is set to 81 (=nine rows×nine columns). On the other hand, in the high-frequency G interpolation filter 302, the number of taps N is set to 25 (=five rows×five columns).

The high-frequency G interpolation filter 302 supplies $G_{+\Delta IR\_H}$ signals after interpolation to the high-frequency component extraction unit 307.

It should be noted that the high-frequency G interpolation filter 302 may detect an edge in a specific direction, and may perform interpolation by preferentially using pixel signals along a direction of the edge. For example, the high-frequency G interpolation filter 302 detects an edge in a horizontal direction or a vertical direction. In addition, in the case of detecting an edge in the horizontal direction, the high-frequency G interpolation filter 302 performs interpolation with an average of pixel signals on upper and lower sides of an interpolation target, and in the case of detecting an edge in the vertical direction, the high-frequency G interpolation filter 302 performs interpolation with an average of pixel signals on right and left sides of an interpolation target. Similarly, the RGBIR interpolation filter 301 may detect an edge, and may perform interpolation by preferentially using pixel signals along a direction of the edge.

The component separation unit 303 is turned on or off under the control of the control unit 102. In the case of being turned on, the component separation unit 303 separates and removes an infrared light component from the $R_{+\Delta IR\_L}$ signals, the $G_{+\Delta IR\_L}$ signals, and the $B_{+\Delta IR\_L}$ signals, and separates and removes an visible light component from the $IR_{+\Delta V\_L}$ signals by using the following Expression (6).

[Math. 3]

$$\begin{pmatrix} R_L \\ G_L \\ B_L \\ IR \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} R_{+\Delta IR\_L} \\ G_{+\Delta IR\_L} \\ B_{+\Delta IR\_L} \\ IR_{+\Delta V\_L} \end{pmatrix} \quad (6)$$

In Expression (6), $R_L$, $G_L$, and $B_L$ represent color signals from which the infrared light component is removed, and IR represents infrared light signals from which the visible light component is removed.

The following Expression (7) represents an example of a coefficient of a separation matrix in a right-handed side in Expression (6).

[Math. 4]

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} = \begin{pmatrix} 1 & -0.00364 & -0.07218 & -0.14415 \\ -0.006729 & 1 & -0.02388 & -0.18537 \\ -0.050448 & -0.0099 & 1 & -0.15243 \\ -0.01155 & -0.00964 & -0.01814 & 1 \end{pmatrix} \quad (7)$$

It should be noted that Expression (6) is an example of a mathematical formula for performing separation and removal of an infrared light component or a visible light component, and the component separation unit 303 can also perform separation and removal of the infrared light component or the visible light component by using another mathematical formula.

The component separation unit 303 supplies the $R_L$ signals, the $G_L$ signals, and the $B_L$ signals to the white balance processing unit 304 and the ratio calculation unit 305. In addition, the component separation unit 303 supplies the IR signals to the ratio calculation unit 305 and the IR image signal output unit 310.

Figure 11:
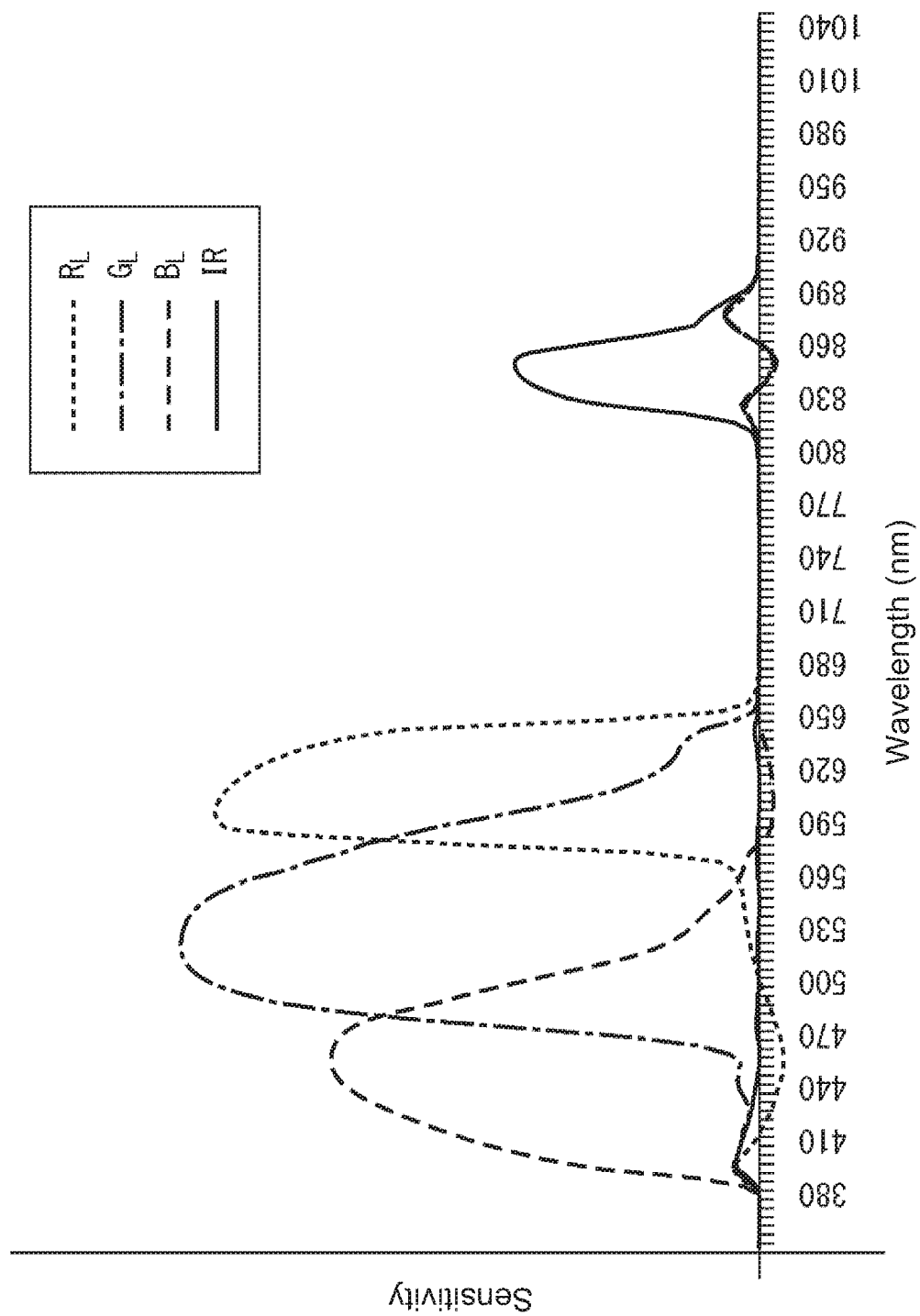
FIG. 11 is a view showing an example of sensitivity characteristics after component separation of each pixel.

FIG. 11 is a graph showing an example of sensitivity characteristics of respective pixels after component separation. In the same drawing, the horizontal axis represents a wavelength of light, and the vertical axis represents sensitivity of pixels with respect to the light. Actually, the infrared light component and the visible light component instead of sensitivity are separated from the pixel signals, but in the same drawing, the sensitivity is shown in substitution for the components. In the same drawing, a solid line represents sensitivity characteristics of the IR signals, and a fine dotted line represents sensitivity characteristics of the $R_L$ signals. In addition, a one-dot chain line represents sensitivity characteristics of the $G_L$ signals, and a rough dotted line represents sensitivity characteristics of the $B_L$ signals. As illustrated in the same drawing, the infrared light component is removed from the $R_L$ signals, the $G_L$ signals, and the $B_L$ signals to a certain extent. In addition, the visible light component is removed from the $IR_L$ signals to a certain extent.

Figure 12:
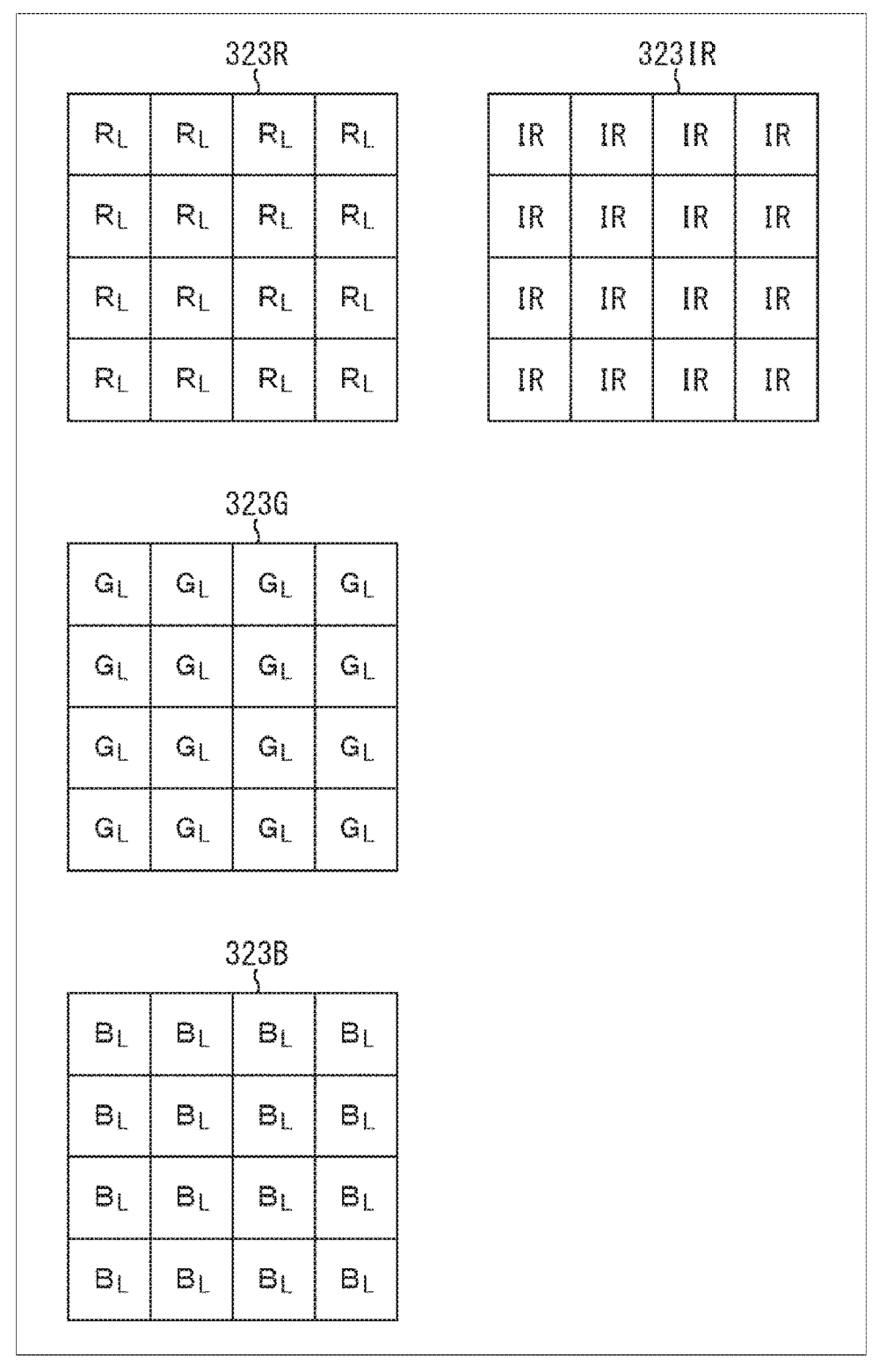

FIG. 12 illustrates an example of color signals after separation of infrared rays. Data 323R represents an example of data including $R_L$ signals after performing separation of infrared rays with respect to the data 322R in FIG. 10. Data 323G represents an example of data including $G_L$ signals after performing separation of infrared rays with respect to the data 322G in FIG. 10. Data 323B represents an example of data including $B_L$ signals after performing separation of infrared rays with respect to the data 322B in FIG. 10. As illustrated in the data 323R to the data 323B, an infrared light component is removed from color signals.

In addition, data 323IR represents an example of data including IR signals after performing separation of visible light with respect to the data 322IR in FIG. 10. As illustrated in the data 323IR, a visible light component is removed from infrared light signals.

On the other hand, in the case of being turned off, the component separation unit 303 does not separate and remove the infrared light component from the $R_{+\Delta IR\_L}$ signal, the $G_{+\Delta IR\_L}$ signal, and the $B_{+\Delta IR\_L}$ signal, and supplies the signals to the white balance processing unit 304 and the ratio calculation unit 305 as the $R_L$ signals, the $G_L$ signals, and the $B_L$ signals. In addition, in the case of being turned off, the component separation unit 303 does not remove and separate the visible light component form the $IR_{+\Delta V\_L}$ signals, and supplies the signals to the ratio calculation unit 305 and the IR image signal output unit 310 as the IR signals. In this case, the $R_{+\Delta IR\_L}$ signals, the $G_{+\Delta IR\_L}$ signals, the $B_{+\Delta IR\_L}$ signals, and the $IR_{+\Delta V\_L}$ signal, and the $R_L$ signals, the $G_L$ signals, the $B_L$ signals, and the IR signals satisfy relationships of the following Expression (8) to (11).

$$R_L = R_{+\Delta IR\_L} \quad (8)$$

$$G_L = G_{+\Delta IR\_L} \quad (9)$$

$$B_L = B_{+\Delta IR\_L} \quad (10)$$

$$IR = IR_{+\Delta V\_L} \quad (11)$$

It should be noted that even in the case of being turned on, the component separation unit 303 may output the $IR_{+\Delta V\_L}$ signals as the IR signals by using Expression (11).

The white balance processing unit 304 adjusts white balance in the $R_L$ signals, the $G_L$ signals, and the $B_L$ signals. For example, the white balance processing unit 304 multiplies each of the $R_L$ signals and the $B_L$ signals by a gain to adjust the white balance. The white balance processing unit 304 supplies the $R_L$ signals, the $G_L$ signals, and the $B_L$ signals of which the white balance is adjusted to the color difference adjustment unit 306.

For example, the ratio calculation unit 305 calculates visible light ratio Rc by using the following Expressions (12) to (15), and supplies the visible light ratio Rc to the control unit 102 and the color difference adjustment unit 306.

[Math. 5]

$$Y_j = (5 \times G_{L-j} + 2 \times R_{L-j} + B_{L-j})/8 \quad (12)$$

$$IR_{av} = \frac{\sum_{j=0}^{N-1} IR_j}{N} \quad (13)$$

$$Y_{av} = \frac{\sum_{j=0}^{N-1} Y_j}{N} \quad (14)$$

$$Rc = Y_{av}/(Y_{av} + IR_{av}) \quad (15)$$

In Expression (12), $R_{L\_j}$, $G_{L\_j}$, and $B_{L\_j}$ represent a $j^{th} R_L$ signal, a $j^{th} G_L$ signal, and a $j^{th} B_L$ signal (J represents an integer of 0 to N−1). $Y_j$ represents a luminance component in a $j^{th}$ pixel signal. In Expression (13), N represents the number of pixel signals in an image signal. $IR_j$ represents a $j^{th}$ IR signal. $IR_{av}$ represents an average value of IR signals. In Expression (14), $Y_{av}$ represents an average value of luminance components.

The color difference adjustment unit 306 adjusts a color difference signal on the basis of the visible light ratio Rc and the light measurement amount Q in correspondence with the imaging mode. Specifically, the color difference adjustment unit 306 converts the $R_L$ signals, the $G_L$ signals, and the $B_L$ signals in the pixel signal into luminance signals and color difference signals for every signal. In addition, the color difference adjustment unit 306 adjusts the color difference signals on the basis of the visible light ratio Rc and the light measurement amount Q in correspondence with the imaging mode, and returns the luminance signals and the color difference signals to the $R_L$ signals, the $G_L$ signals, and the $B_L$ signals, and supplies the signals to the high-frequency component recovery unit 308.

The high-frequency component extraction unit 307 extracts a difference between the $G_{+\Delta IR\_L}$ signals from the low-frequency RGBIR interpolation filter 301 and the $G_{+\Delta IR\_H}$ signals from the high-frequency G interpolation filter 302 as a high-frequency component $G_H$. As described above, the number of taps N of the high-frequency G interpolation filter 302 is smaller than the number of taps M of the RGBIR interpolation filter 301. Accordingly, a higher frequency component in comparison to the $G_{+\Delta IR\_L}$ signal from the RGBIR interpolation filter 301 is included in the $G_{+\Delta IR\_H}$ signals from the high-frequency G interpolation filter 302. Accordingly, it is possible to extract the high-frequency component $G_H$ by taking the difference. The high-frequency component extraction unit 307 supplies the extracted high-frequency component $G_H$ to the high-frequency component recovery unit 308.

The high-frequency component recovery unit 308 recovers the high-frequency component $G_H$ in the $R_L$ signals, the $G_L$ signals, and the $B_L$ signals. For example, the high-frequency component recovery unit 308 recovers the high-frequency component $G_H$ by using the following Expressions (16) to (18).

$$R = R_L + (G_H/G_{+\Delta IR\_L}) \times R_L \quad (16)$$

$$G = G_L + (G_H/G_{+\Delta IR\_L}) \times G_L \quad (17)$$

$$B = B_L + (G_H/G_{+\Delta IR\_L}) \times B_L \quad (18)$$

In Expressions (16) to (18), R, G, and B represent color signals after recovery. A high-frequency component of each color signal is lost due to the interpolation in the RGBIR interpolation filter 301, and thus image quality of an image deteriorates. However, when the high-frequency component is recovered in the high-frequency component recovery unit 308, image quality is further improved in comparison to the case of not recovering the high-frequency component. The high-frequency component recovery unit 308 supplies the R signals, the G signals, and the B signals which are recovered to the Bayer image signal output unit 309.

The Bayer image signal output unit 309 arranges the R signals, the G signals, and the B signals in accordance with the Bayer array, and outputs the signals to the image conversion unit 122 and the sensing unit 123 as Bayer image signals.

Figure 13:
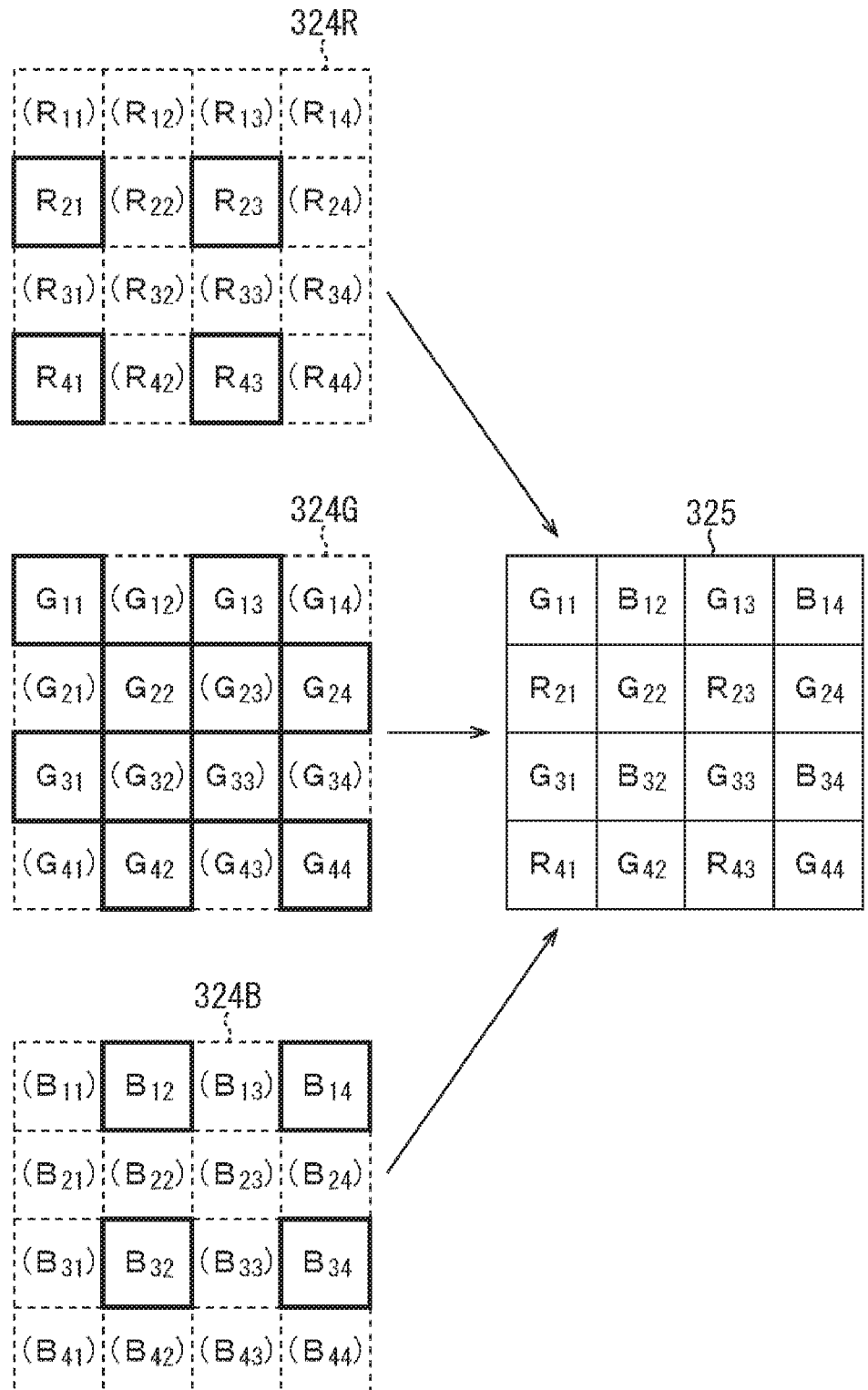
FIG. 13 is a view illustrating an example of an image signal before and after Bayer processing.

FIG. 13 illustrates an example of image signals before and after Bayer processing. Data 324R represents an example of data including the R signals after recovering the high-frequency component. Data 324G represents an example of data including the G signals after recovering the high-frequency component. Data 324B represents an example of data including the B signals after recovering the high-frequency component. It should be noted that in the data 324R to the data 324B, a suffix of each of the R signals, the G signals, and the B signals represents a position of a row and a column in which pixel signals are arranged. For example, an R signal at a first row and a first column is noted as $R_{11}$, and an R signals at the first row and at a second column is noted as $R_{12}$.

In addition, the R signals, the G signals, and the B signals after recovering the high-frequency component are arranged in accordance with the Bayer array, and thus a Bayer image signal 325 is generated. For example, among 4×4 pieces of R signals of the data 324R, $R_{21}$, $R_{23}$, $R_{41}$, and $R_{43}$ are selected, and are arranged in the Bayer image signal 325 without changing positions of rows and columns. In addition, for example, among 4×4 pieces of G signals of the data 324G, $G_{11}$, $G_{13}$, $G_{22}$, $G_{24}$, $G_{31}$, $G_{33}$, $G_{42}$, and $G_{44}$ are selected, and are arranged in the Bayer image signal 325 without changing positions of rows and columns. In addition, for example, among 4×4 pieces of B signals of the data 324B, $B_{12}$, $B_{14}$, $B_{32}$, and $B_{34}$ are selected, and are arranged in the Bayer image signal 325 without changing positions of rows and columns. In this manner, the Bayer image signal 325 in which the R signals, the G signals, and the B signals are arranged in the Bayer array is generated.

The IR image signal output unit 310 arranges IR signals in a two-dimensional lattice shape, and outputs the IR signals to the output unit 108 and the sensing unit 123 as IR image signals.

It should be noted that extraction and recovery of the high-frequency component are performed by the high-frequency G interpolation filter 302, the high-frequency component extraction unit 307, and the high-frequency component recovery unit 308, but these may not be provided. However, it is desirable to provide the high-frequency G interpolation filter 302, the high-frequency component extraction unit 307, and the high-frequency component recovery unit 308 from the viewpoint of improving image quality.

In addition, the ratio calculation unit 305 and the color difference adjustment unit 306 are provided in the image generation unit 121, but the units 305 and 306 may be formed in the image conversion unit 122 in a rear stage. However, it is desirable to provide the ratio calculation unit 305 and the color difference adjustment unit 306 in the image generation unit 121 from the viewpoint of improving image quality.

In addition, the Bayer image signal output unit 309 may not be provided, and image signals may be supplied to the image conversion unit 122 and the sensing unit 123 without being subjected to the Bayer processing.

{Configuration Example of Color Difference Adjustment Unit}

Figure 14:
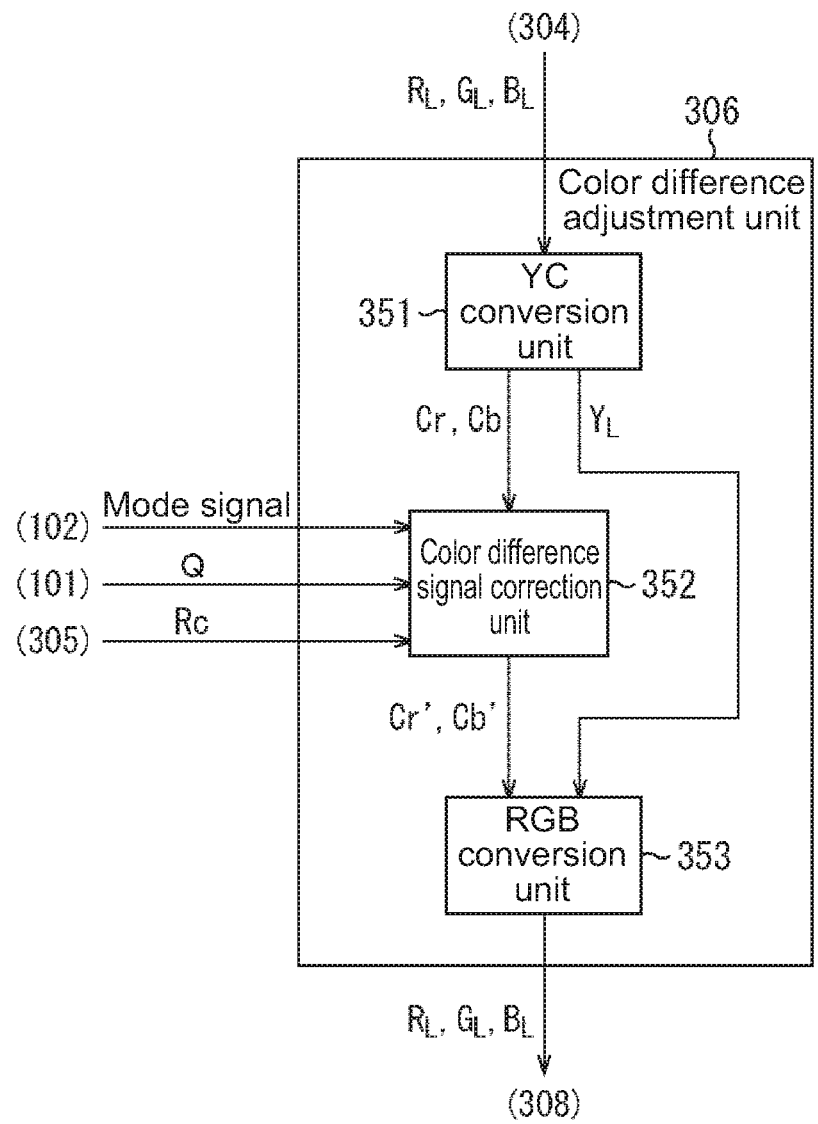
FIG. 14 is a block diagram illustrating a configuration example of a color difference adjustment unit.

FIG. 14 is a block diagram illustrating a configuration example of the color difference adjustment unit 306. The color difference adjustment unit 306 includes an YC conversion unit 351, a color difference signal correction unit 352, and an RGB conversion unit 353.

The YC conversion unit 351 converts an $R_L$ signal, a $G_L$ signal, and a $B_L$ signal into a luminance signal $Y_L$, and color difference signals Cr and Cb for every pixel. For example, the YC conversion unit 351 performs conversion by the following Expressions (19) to (21) on the basis of standards of international telecommunication union radio communication sector (ITU-R) BT.601. The YC conversion unit 351 supplies the color difference signals Cr and Cb to the color difference signal correction unit 352, and supplies the luminance signal $Y_L$ to the RGB conversion unit 353.

$$Y_L = 0.299 \times R_L + 0.587 \times G_L + 0.144 \times B_L \tag{19}$$

$$Cb = -0.168736 \times R_L - 0.331264 \times G_L + 0.5 \lambda B_L \tag{20}$$

$$Cr = 0.5 \times R_L - 0.418688 \times G_L - 0.081312 \times B_L \tag{21}$$

The color difference signal correction unit 352 corrects the color difference signals Cr and Cb. Specifically, the color difference signal correction unit 352 sets a chroma gain Gc on the basis of the imaging mode, the light measurement amount Q and the visible light ratio Rc. In addition, the color difference signal correction unit 352 performs correction of multiplying the gain that is set by the color difference signals Cr and Cb, and supplies color difference signals Cr' and Cb' after correction to the RGB conversion unit 353. Details of a method of setting the chroma gain will be described later.

The RGB conversion unit 353 converts the luminance signal $Y_L$ and the color difference signals Cr' and Cb' into the $R_L$ signal, the $G_L$ signal, and the $B_L$ signal for every pixel, and supplies the resultant signals to the high-frequency component recovery unit 308. The RGB conversion unit 353 performs conversion by using the following Expressions (22) to (24), for example, on the basis of the standards of ITU-R BT.601.

$$R_L = Y_L + 1.402 \times Cr' \tag{22}$$

$$G_L = Y_L - 0.344136 \times Cr' - 0.714136 \times Cb' \tag{23}$$

$$B_L = Y_L + 1.772 \times Cb' \tag{24}$$

{Configuration Example of Color Difference Signal Correction Unit}

Figure 15:
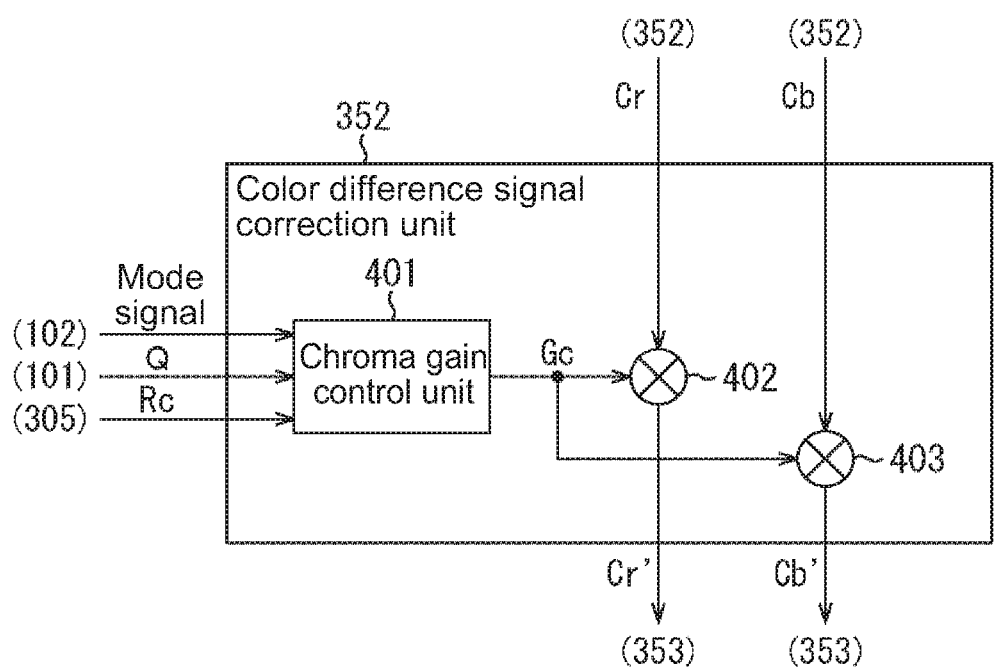
FIG. 15 is a block diagram illustrating a configuration example of a color difference signal correction unit.

FIG. 15 is a block diagram illustrating a configuration example of the color difference signal correction unit 352. The color difference signal correction unit 352 includes a chroma gain control unit 401, multipliers 402, and 403.

The chroma gain control unit 401 controls the chroma gain Gc that is a gain to be multiplied to a color difference signal on the basis of the imaging mode, the light measurement amount Q, and the visible light ratio Rc.

Figure 16:
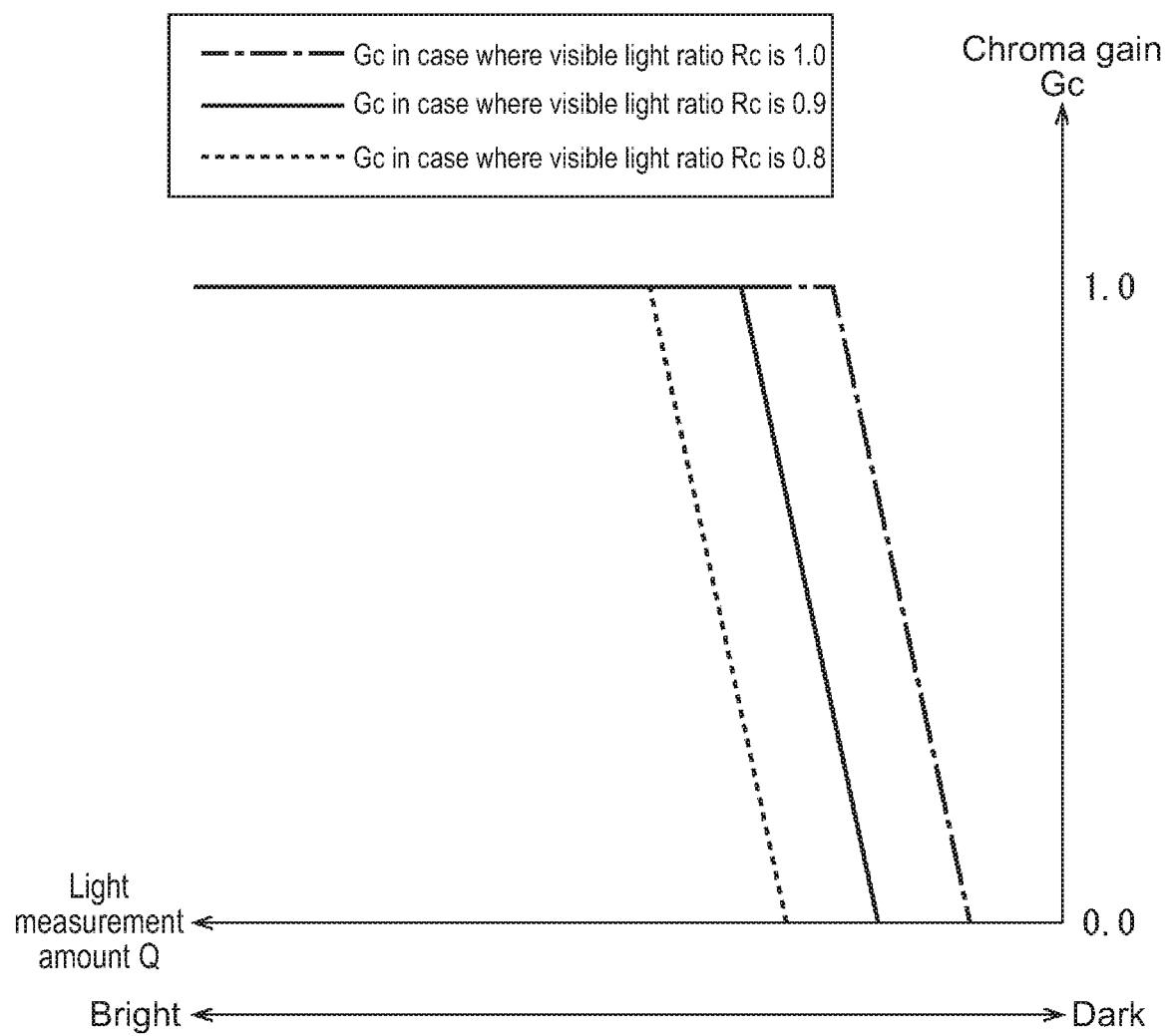
FIG. 16 is a graph showing a setting example of a chroma gain.

For example, in the case of being set to the sensing mode, the day mode, or the CNV mode, the chroma gain control unit 401 sets the chroma gain Gc by using a graph in FIG. 16.

In FIG. 16, the vertical axis represents the chroma gain Gc, and the horizontal axis represents the light measurement amount Q. In addition, in the same drawing, a one-dot chain line represents a setting example of the chroma gain Gc in a case where the visible light ratio Rc is 1.0, and a solid line represents a setting example of the chroma gain Gc in a case where the visible light ratio Rc is 0.9. In addition, a dotted line represents a setting example of the chroma gain Gc in a case where the visible light ratio Rc is 0.8. As illustrated in the same drawing, the smaller the light measurement amount Q is and the lower the visible light ratio Rc is (that is, the higher a ratio of an infrared light component is), the smaller the chroma gain Gc is set. As a result, the darker the surroundings of the imaging device 100 are and the higher a ratio of the infrared light component is, the further an image is set to a monochrome image. Accordingly, it is possible to maintain a signal-to-noise (SN) ratio of image signals in a satisfactory manner.

On the other hand, in the case of being set to the night mode, the chroma gain control unit 401 sets a value of the chroma gain Gc to zero.

The chroma gain control unit 401 supplies the chroma gain Gc that is set to the multipliers 402 and 403.

It should be noted that the chroma gain control unit 401 is provided in the image processing unit 107. However, for example, the chroma gain control unit 401 may be provided in the control unit 102.

The multiplier 402 multiplies the color difference signal Cr by the chroma gain Gc, and supplies a color difference signal Cr' that is a multiplication result to the RGB conversion unit 353.

The multiplier 403 multiplies the color difference signal Cb by the chroma gain Gc, and supplies a color difference signal Cb' that is a multiplication result to the RGB conversion unit 353.

Accordingly, in the case of being set to the sensing mode, the day mode, or the CNV mode, the color difference signals Cr' and Cb' satisfy relationships of the following Expressions (25) and (26).

$$Cr' = Gc \times Cr \quad (25)$$

$$Cb' = Gc \times Cb \quad (26)$$

On the other hand, in the case of being set to the night mode, the color difference signals Cr' and Cb' satisfy relationships of the following Expressions (27) and (28).

$$Cr' = 0 \quad (27)$$

$$Cb' = 0 \quad (28)$$

Accordingly, in the case of being set to the night mode, the $R_L$ signals, the $G_L$ signals, and the $B_L$ signals which are output from the RGB conversion unit 353 include only the luminance signal $Y_L$ and become a monochrome image signal.

{Configuration Example of Image Conversion Unit}

Figure 17:
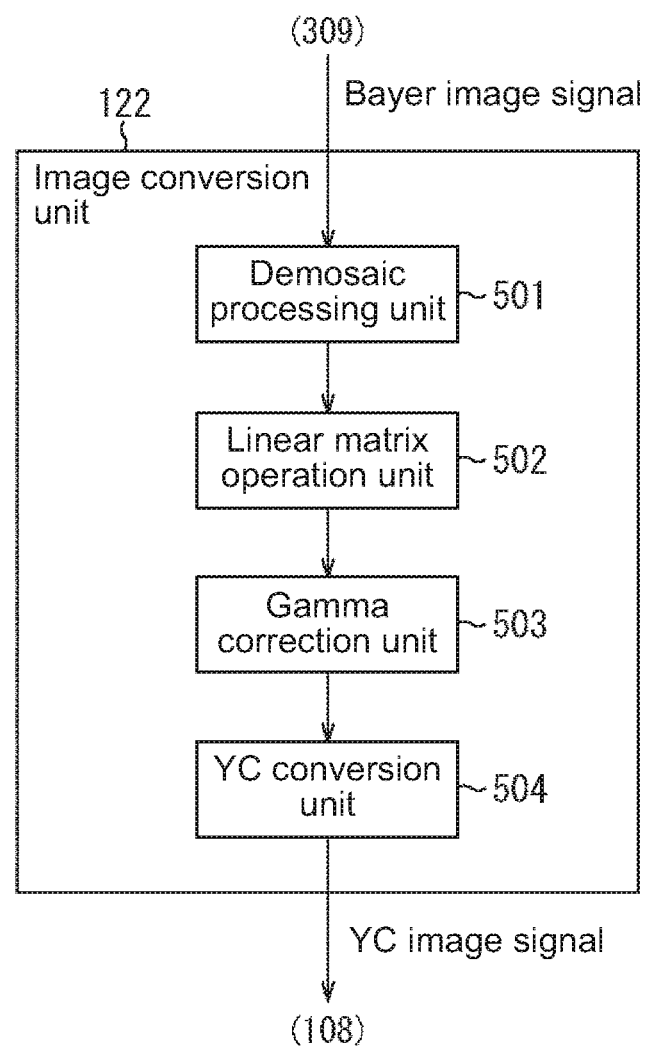
FIG. 17 is a block diagram illustrating a configuration example of an image conversion unit.

FIG. 17 is a block diagram illustrating a configuration example of the image conversion unit 122. The image conversion unit 122 includes a demosaic processing unit 501, a linear matrix operation unit 502, a gamma correction unit 503, and an YC conversion unit 504.

The demosaic processing unit 501 converts the Bayer image signals to demosaic image signals including the R signals, the G signals, and the B signals for every image signal by using predetermined demosaic algorithm. The demosaic processing unit 501 supplies the demosaic image signals after conversion to the linear matrix operation unit 502.

The linear matrix operation unit 502 performs a linear matrix operation to enhance color reproducibility. For example, the linear matrix operation unit 502 performs a linear matrix operation that is expressed by the following Expressions (29) to (31).

$$R' = R + k_a \times (R-G) + k_b \times (R-B) \quad (29)$$

$$G' = R + k_c \times (G-R) + k_d \times (G-B) \quad (30)$$

$$B' = B + k_e \times (B-R) + k_f \times (B-G) \quad (31)$$

In Expressions (29) to (31), $K_a$, $k_b$, $k_c$, $k_d$, $k_e$, and $k_f$ are coefficients of real numbers.

The linear matrix operation unit 502 supplies R' signals, G' signals, and B' signals after operation to the gamma correction unit 503. A signal level of a luminance signal or a color difference signal varies due to the linear matrix operation. Accordingly, it is desirable to perform correction of a color signal in the color difference signal correction unit 352 prior to the linear matrix operation. When the correction is performed by the image generation unit 121 as described above, it is possible to improve image quality.

The gamma correction unit 503 performs gamma correction in accordance with characteristics of a display. The gamma correction unit 503 supplies demosaic image signals after correction to the YC conversion unit 504.

The YC conversion unit 504 converts the R' signals, the G' signals, and the B' signals in the demosaic images into a luminance signal and a color difference signal. For example, the YC conversion unit 504 performs conversion by using Expressions (19) to (21), and outputs an image signal after conversion as an YC image signal. It should be noted that the YC conversion unit 504 uses the R' signals, the G' signals, and the B' signals instead of the $R_L$ signals, the $G_L$ signals, and the $B_L$ signals in Expressions (19) to (21)

It should be noted that in a case where the Bayer image signal output unit 309 is not provided in the image generation unit 121 as described above, in the image conversion unit 122, the demosaic processing unit 501 may not be provided.

{Configuration Example of Sensing Unit}

Figure 18:
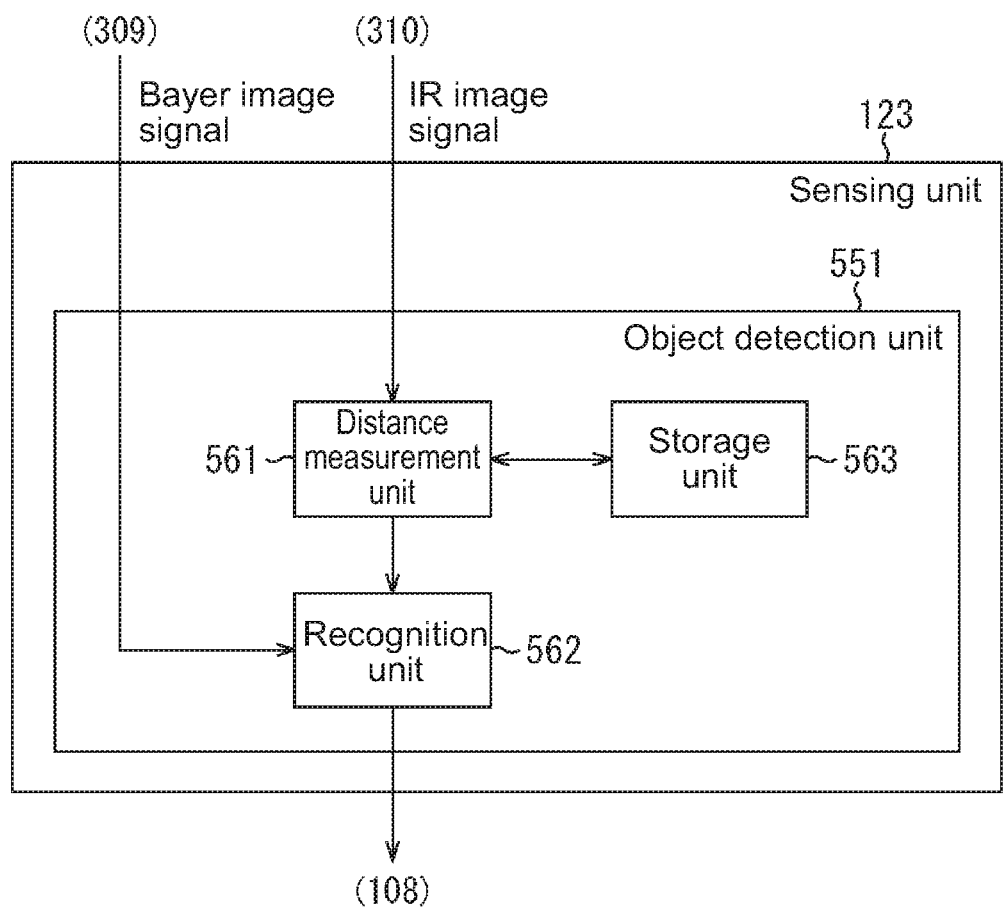
FIG. 18 is a block diagram illustrating a configuration example of a sensing unit.

FIG. 18 is a block diagram illustrating a configuration example of the sensing unit 123. The sensing unit 123 includes an object detection unit 551. The object detection unit 551 includes a distance measurement unit 561, a storage unit 563, and a recognition unit 562.

The distance measurement unit 561 performs depth sensing on the basis of an IR image based on an IR image signals supplied from the IR image signal output unit 310, and a calibration image stored in the storage unit 563 in advance, and measures a distance up to each object within the IR image. In addition, the distance measurement unit 561 generates a depth map indicating a distribution of the distance up to the object, and supplies the depth map to the recognition unit 562.

The recognition unit 562 detects a region in which an object exists on the basis of the depth map. In addition, the recognition unit 562 sets the detected region as a target, and performs recognition of the object within the Bayer image that is supplied from the Bayer image signal output unit 309. In addition, the recognition unit 562 supplies a detection result of the object to the output unit 108.

{Processing of Imaging Device 100}

Next, processing of the imaging device 100 will be described with reference to FIG. 19 to FIG. 36.

(Imaging Mode Setting Processing)

First, image mode setting processing that is executed by the imaging device 100 will be described with reference to a flowchart in FIG. 19. For example, the processing is executed when initiating imaging or at a predetermined timing for every predetermined interval during imaging.

In step S1, the control unit 102 determines whether or not to perform sensing on the basis of user's setting or the like. In a case where it is determined that sensing is performed, the processing proceeds to step S2.

In step S2, the control unit 102 performs setting to the sensing mode. The control unit 102 supplies a mode signal indicating setting to the sensing mode to the chroma gain control unit 401.

In step S3, the imaging device 100 initiates intermittent irradiation with infrared light, and turns on a shutter for every pixel. Specifically, the control unit 102 controls the infrared light irradiation unit 103 to initiate intermittent irradiation with infrared light. In addition, the control unit 102 controls the imaging element 106 to turn on the shutter for every pixel.

It should be noted that an example of an irradiation period of infrared light and an exposure period of each pixel in the case of setting to the sensing mode will be described later with reference to FIG. 23.

In step S4, the control unit 102 turns off the component separation unit 303.

Then, the imaging mode setting processing is terminated.

On the other hand, in step S1, in a case where it is determined that sensing is not performed, the processing proceeds to step S5.

In step S5, the imaging device 100 executes viewing mode setting processing, and then the imaging mode setting processing is terminated.

Figure 20:
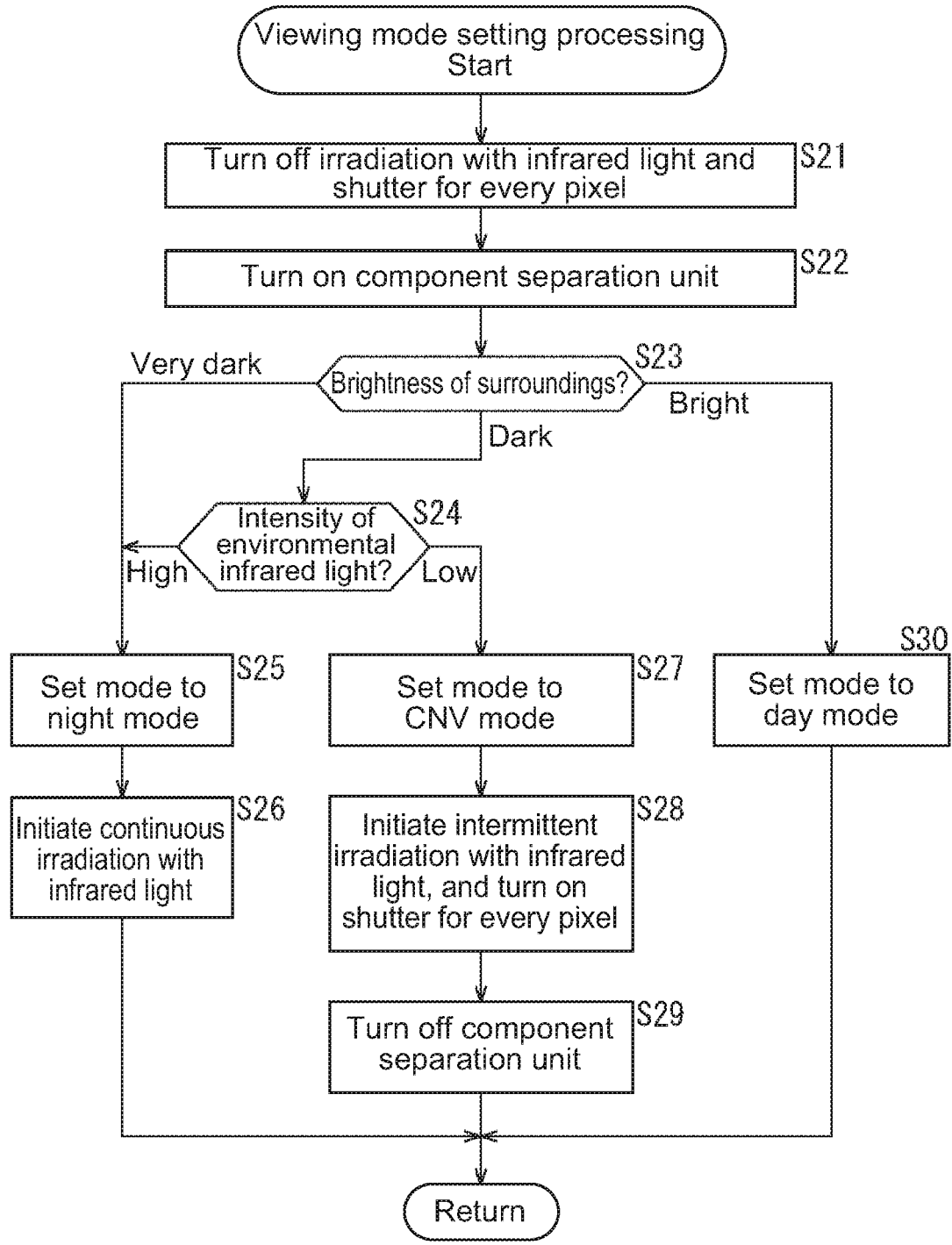
FIG. 20 is a flowchart illustrating an example of viewing mode setting processing.

Here, details of the viewing mode setting processing will be described with reference to a flowchart in FIG. 20.

In step S21, the imaging device 100 turns off irradiation with infrared light and the shutter for every pixel. Specifically, the control unit 102 controls the infrared light irradiation unit 103 to be turned off. In addition, the control unit 102 controls the imaging element 106 to turn off the shutter for every pixel.

In step S22, the control unit 102 turns on the component separation unit 303.

Figure 21:
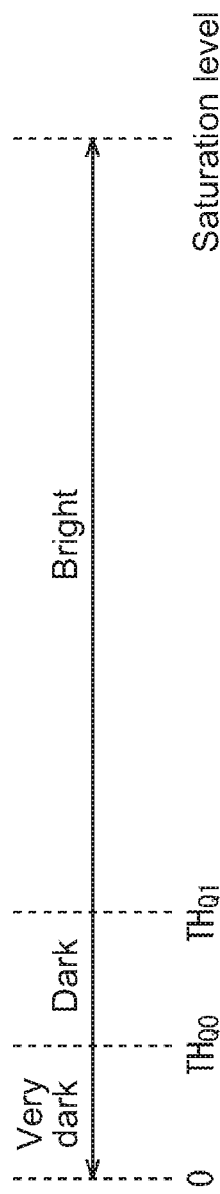
FIG. 21 is a view illustrating an example of a threshold value that is used in determination processing of brightness of surroundings.

In step S23, the control unit 102 performs determination on brightness of the surroundings. For example, as illustrated in FIG. 21, the control unit 102 classifies brightness of the surroundings into three stages of "bright", "dark", and "very dark" on the basis of the light measurement amount Q. Specifically, in a range of the light measurement amount Q from zero to a level at which a photoelectric conversion element of the imaging element 106 is saturated, a threshold value $TH_{Q0}$ and a threshold value $TH_{Q1}$ are set in advance. In addition, in the case of the light measurement amount Q≥the threshold value $TH_{Q1}$, the control unit 102 determines that the surroundings are bright. In the case of threshold value $TH_{Q0}$≤the light measurement amount Q<the threshold value $TH_{Q1}$, the control unit 102 determines that the surroundings are dark. In the case of the light measurement amount Q<the threshold value $TH_{Q0}$, the control unit 102 determines that the surroundings are very dark. In addition, in a case where it is determined that the surroundings are dark, the processing proceeds to step S24.

In step S24, the control unit 102 performs determination of intensity of environmental infrared light. Specifically, as described above, the ratio calculation unit 305 calculates the visible light ratio Rc by using Expressions (12) to (15), and supplies the visible light ratio Rc to the control unit 102.

Figure 22:
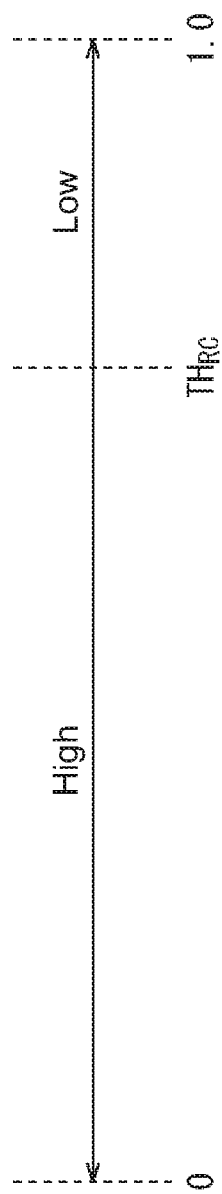
FIG. 22 is a view illustrating an example of a threshold value that is used in determination processing of intensity of environmental infrared light.

The control unit 102 performs the determination of the intensity of the environmental infrared light on the basis of the visible light ratio Rc. For example, as illustrated in FIG. 22, in a range of the visible light ratio Rc from 0 to 1, a threshold value $TH_{Rc}$ is set in advance. In the case of the visible light ratio Rc Z the threshold value $TH_{Rc}$, the control unit 102 determines that the intensity of the environmental infrared light is low. In the case of the visible light ratio Rc<threshold value $TH_{Rc}$, the control unit 102 determines that the intensity of the environmental infrared light is high. In addition, in a case where it is determined that the intensity of the environmental infrared light is high, the processing proceeds to step S25.

On the other hand, in step S23, in a case where it is determined that the surroundings are very dark, the processing in step S24 is skipped, and the processing proceeds to step S25.

In step S25, the control unit 102 performs setting to the night mode. That is, in the case of a state in which the surroundings are very dark, or a state in which the surroundings are dark and the intensity of the environmental infrared light is high, the control unit 102 performs setting to the night mode. The control unit 102 supplies a mode signal indicating setting to the night mode to the chroma gain control unit 401.

In step S26, the infrared light irradiation unit 103 initiate continuous irradiation with infrared light in accordance with control of the control unit 102. At this time, the shutter for every pixel remains in an OFF-state. In addition, the component separation unit 303 remains in an ON-state.

It should be noted that an example of an irradiation period of infrared light and an exposure period of each pixel in the case of setting to the night mode will be described later with reference to FIG. 25.

Then, the viewing mode setting processing is terminated.

On the other hand, in step S24, in a case where it is determined that the intensity of the environmental infrared light is low, the processing proceeds to step S27.

In step S27, the control unit 102 performs setting to the CNV mode. That is, in the case of a state in which the surroundings are dark, and the intensity of the environmental infrared light is low, the control unit 102 performs setting to the CNV mode. The control unit 102 supplies a mode signal indicating setting to the CNV mode to the chroma gain control unit 401.

Figure 19:
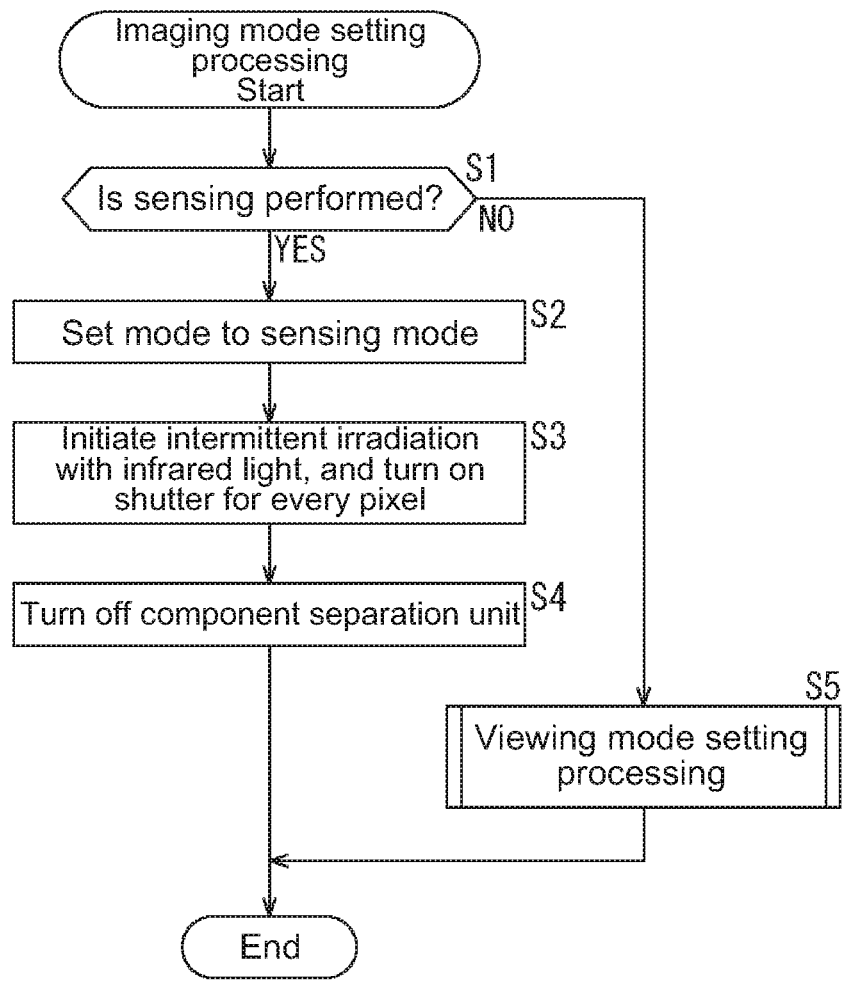
FIG. 19 is a flowchart illustrating an example of imaging mode setting processing.

In step S28, intermittent irradiation with infrared light is initiated, and the shutter for every pixel is turned on as in the processing in step S3 in FIG. 19.

It should be noted that an example of an irradiation period of infrared light and an exposure period of each pixel in the case of setting to the CNV mode will be described later with reference to FIG. 23.

In step S29, the component separation unit 303 is turned off as in the processing in step S4 in FIG. 19.

Then, the viewing mode setting processing is terminated.

On the other hand, in step S23, in a case where it is determined that the surroundings are bright, the processing proceeds to step S30.

In step S30, the control unit 102 performs setting to the day mode. The control unit 102 supplies a mode signal indicating setting to the day mode to the chroma gain control unit 401. At this time, the shutter for every pixel remains in an OFF-state. In addition, the infrared light irradiation unit 103 remains in an OFF-state. In addition, the component separation unit 303 remains in an ON-state.

It should be noted that an example of an irradiation period of infrared light and an exposure period of each pixel in the case of setting to the day mode will be described later with reference to FIG. 24.

Then, the viewing mode setting processing is terminated.

Here, an example of an irradiation period of infrared light and an exposure period of each pixel in the respective imaging modes will be described with reference to FIG. 23 to FIG. 25. It should be noted that in FIG. 23 to FIG. 25, a period from a time t0 to a time t4, and a period from the time t4 to a time t8 correspond to a one-frame period.

Figure 23:
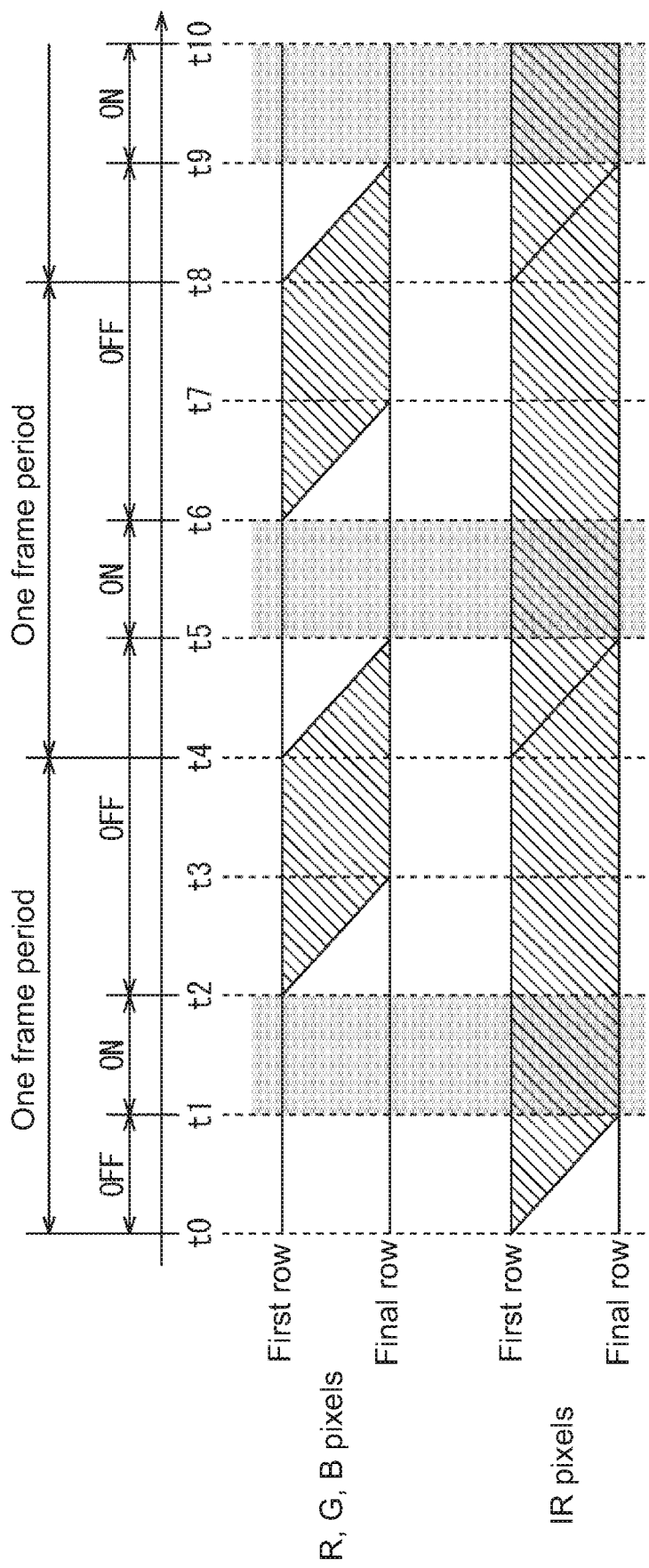
FIG. 23 is a view illustrating an example of an irradiation period of infrared light and an exposure period of each pixel in a sensing mode or a CNV mode.

FIG. 23 illustrates an example of an irradiation period of infrared light and an exposure period of each pixel in the case of setting to the sensing mode or the CNV mode. In the case of setting to the sensing mode or the CNV mode, the exposure period is shifted in a row unit along a sweeping direction from the first row to the final row of the pixel array unit 202 of the imaging element 106. In addition, when the shutter for every pixel is turned on, even in pixels in the same row, exposure periods are set to be different between the R pixel, the G pixel, and the B pixel (hereinafter, referred to as "color pixel"), and the IR pixel.

For example, at a time t2, an exposure period of color pixels of a first row of the pixel array unit 202 is initiated. Then, exposure periods of color pixels of respective rows of the pixel array unit 202 are initiated sequentially in the sweeping direction with predetermined time intervals. In addition, at a time t3, an exposure period of color pixels of the final row of the pixel array unit 202 is initiated. In this manner, in a period from the time t2 to the time t3, exposure periods of the color pixels are initiated sequentially in the sweeping direction with predetermined intervals.

Next, at the timing t4, an exposure period of color pixels of the first row of the pixel array unit 202 is terminated, and charge signals which are obtained in the exposure period are read out. Then, exposure periods of color pixels of respective rows of the pixel array unit 202 are terminated sequentially in the sweeping direction with predetermined time intervals, and charge signals obtained during the exposure periods are read out. In addition, at a time t5, an exposure period of color pixels of the final row of the pixel array unit 202 is terminated, and charge signals obtained during the exposure period are read out. As described above, in a period from the time t4 to the time t5, exposure period of color pixels are terminated sequentially in the sweeping direction with predetermined intervals, and charge signals obtained during the exposure periods are read out.

Next, in a period from the time t6 to a time t7, exposure periods of color pixels are initiated sequentially in the sweeping direction with predetermined time intervals as in the period from the time t2 to the time t3.

Next, in a period from the time t8 to a time t9, exposure periods of color pixels are terminated sequentially in the sweeping direction with predetermined time intervals, and charge signals obtained during the exposure periods are read out as in the period from the time t4 to the time t5.

Then, the same processing is repeated.

On the other hand, at the time t0, an exposure period of IR pixels of the first row of the pixel array unit 202 is initiated. Then, exposure periods of IR pixels of respective rows of the pixel array unit 202 are initiated sequentially in the sweeping direction with predetermined time intervals. In addition, at the time t1, an exposure period of IR pixels of the final row of the pixel array unit 202 is initiated. In this manner, in a period from the time t0 to the time t1, exposure periods of the IR pixels are initiated sequentially in the sweeping direction with predetermined time intervals.

Next, at the time t4, the exposure period of IR pixels of the first row of the pixel array unit 202 is terminated, and charge signals obtained during the exposure period are read out. Then, exposure period of the IR pixels of respective rows of the pixel array unit 202 are terminated sequentially in the sweeping direction with predetermined time intervals, and charge signals obtained during the exposure periods are read out. In addition, at the time t5, an exposure period of IR pixels of the final row of the pixel array unit 202 is terminated, and charge signals obtained during the exposure period are read out. In this manner, in a period from the time t4 to the time t5, an exposure period of the IR pixels are terminated sequentially in the sweeping direction with predetermined time intervals, and charge signals obtained during the exposure period are read out.

Next, in the period from the time t4 to the time t5, exposure periods of IR pixels are initiated sequentially in the sweeping direction as in the period from the time t0 to the time t1 with predetermined time intervals.

Next, in a period from the time t8 to the time t9, exposure periods of IR pixels are terminated sequentially in the sweeping direction with predetermined time intervals as in the period from the time t4 to the time t5, and charge signals obtained during the exposure periods are read out.

Then, the same processing is repeated.

As described above, the exposure periods of the color pixels and the IR pixels are set in each frame period. In addition, the exposure period of the IR pixels for infrared light reception is set to be longer than the exposure period of the color pixels which are not used in reception of infrared light. In addition, in each frame period, similar to the period from the time t1 to the time t2, the period from the time t5 to the time t6, and the period from the time t9 to a time t10, a period in which exposure periods of the IR pixels and the color pixels do not overlap each other, more specifically, a period in which all IR pixels are exposed, and all color pixels are not exposed (hereinafter, referred to "independent exposure period") is provided.

On the other hand, irradiation with infrared light is performed only in a partial period of respective frame periods. Specifically, irradiation with infrared light is performed intensively in the independent exposure period among the respective frame periods.

It should be noted that it is not necessary to perform irradiation with infrared light in a total period of the independent exposure period, and irradiation with infrared light may be performed only in a partial period of the independent exposure period.

As described above, in the case of setting to the sensing mode or the CNV mode, only the IR pixels receive infrared light from the infrared light irradiation unit 103, and the color pixels do not receive the infrared light from the infrared light irradiation unit 103. In addition, as described above with reference to FIG. 6, the IR cut filter 233 is provided in the color pixels, and the color pixels do not receive environmental infrared light. Here, as described above, color information of R, G, and B is generated from pixel signals of the color pixels, but the color pixels do not receive infrared light that is used in irradiation, and the environmental infrared light, and thus deterioration of color reproducibility is prevented.

On the other hand, the IR pixels receive the infrared light from the infrared light irradiation unit 103, and thus it is possible to obtain an IR image with high image quality.

In addition, due to setting to the CNV mode, even when the surroundings are dark, a frame rate is not lowered while performing irradiation with infrared light, and thus it is possible to obtain a color image with high image quality.

As described above, due to setting to the sensing mode or the CNV mode, it is possible to obtain a color image and an IR image with high image quality in each frame period in parallel to each other by using one piece of the imaging element 106.

Figure 24:
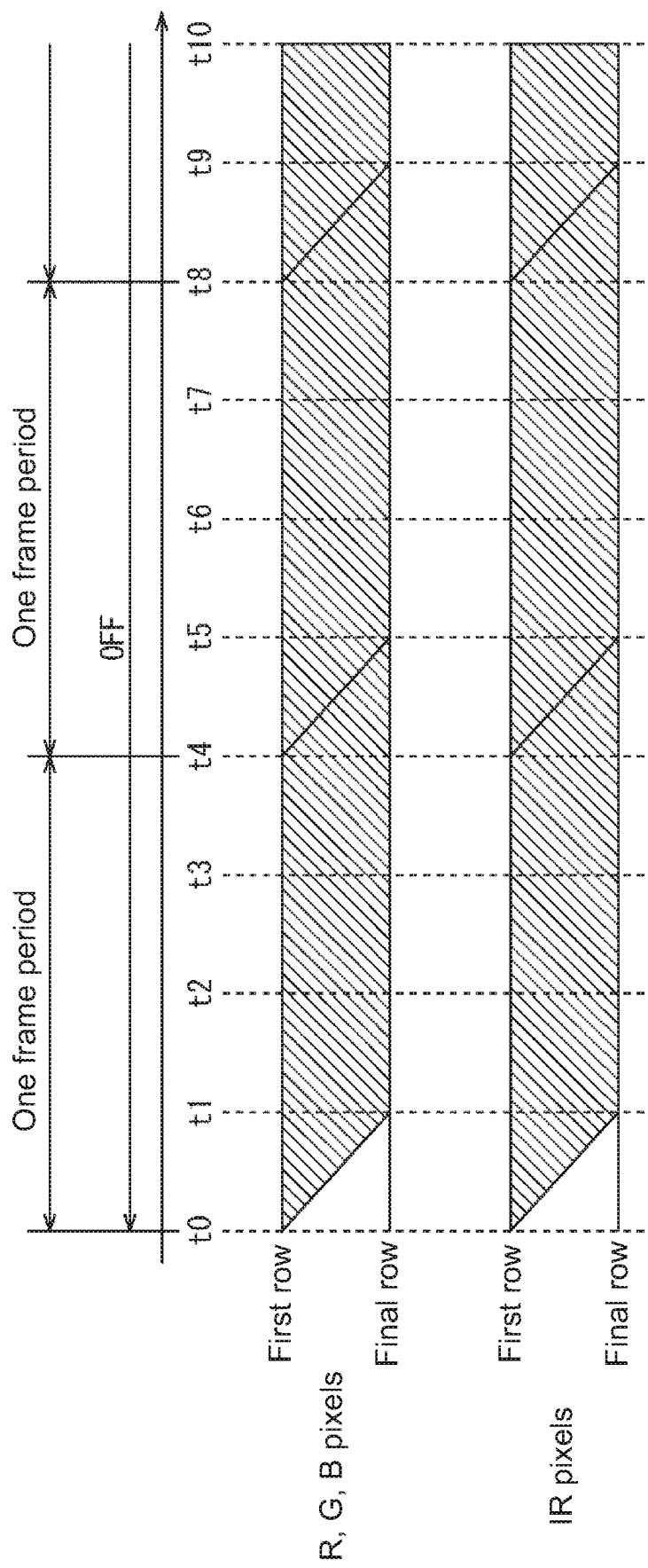
FIG. 24 is a view illustrating an example of an irradiation period of infrared light and an exposure period of each pixel in a day mode.

FIG. 24 illustrates an example of an irradiation period of infrared light and an exposure period of each pixel in the case of setting to the day mode. In the case of setting to the day mode, the exposure period is shifted in a row unit along the sweeping direction from the first row to the final row of the pixel array unit 202 of the imaging element 106 as in the setting to the sensing mode or the CNV mode. In addition, when the shutter for every pixel is turned off, an exposure period of the color pixels and an exposure period of the IR pixels match each other.

For example, in a period from a time t0 to a time t1, exposure periods of the color pixels and the IR pixels are initiated sequentially in the sweeping direction with predetermined time intervals.

Next, in a period from a time t4 to a time t5, exposure periods of the color pixels and the IR pixels are terminated sequentially in the sweeping direction, and charge signals obtained during the exposure periods are read out, and a new exposure period is initiated.

Next, in a period from a time t8 to a time t9, exposure periods of the color pixels and the IR pixels are terminated sequentially in the sweeping direction, and charge signals obtained during the exposure periods are read out, and a new exposure period is initiated.

Then, the same processing is repeated.

It should be noted that in the case of setting to the day mode, the intensity of environmental light is sufficient, and thus irradiation with infrared light is not performed.

Figure 25:
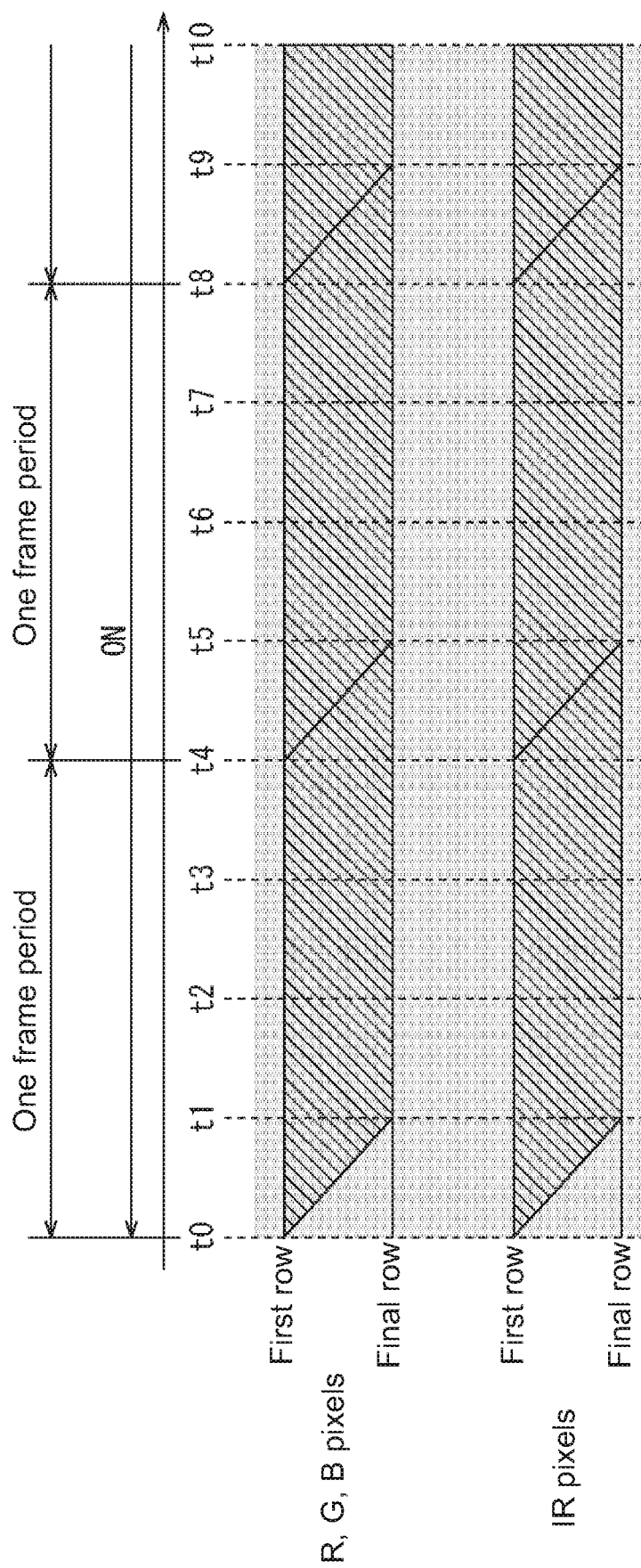
FIG. 25 is a view illustrating an example of an irradiation period of infrared light and an exposure period of each pixel in a night mode.

FIG. 25 illustrates an example of an irradiation period of infrared light and an exposure period of each pixel in the case of setting to the night mode. In the case of setting to the night mode, the exposure period is shifted in a row unit along the sweeping direction from the first row to the final row of the pixel array unit 202 of the imaging element 106 as in the case of setting to the other modes. In addition, when the shutter for every pixel is turned off, an exposure period of the color pixels and an exposure period of the IR pixels match each other.

For example, in a period from a time t0 to a time t1, exposure periods of the color pixels and the IR pixels are initiated sequentially in the sweeping direction with predetermined time intervals.

Next, in a period from a time t4 to a time t5, exposure periods of the color pixels and the IR pixels are terminated sequentially in the sweeping direction, and charge signals obtained during the exposure periods are read out, and a new exposure period is initiated.

Next, in a period from a time t8 to a time t9, exposure periods of the color pixels and the IR pixels are terminated sequentially in the sweeping direction, and charge signals obtained during the exposure periods are read out, and a new exposure period is initiated.

Then, the same processing is repeated.

On the other hand, irradiation with infrared light is continuously performed.

As described above, in the case of setting to the night mode, a monochrome image is generated without using color information. Accordingly, due to continuous irradiation with infrared light, reproducibility of luminance information is improved, and image quality of an image generated by the imaging device 100 is improved.

Figure 26:
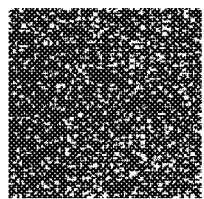
FIG. 26 is a view illustrating an example of a pattern of infrared light.

It should be noted that in the case of setting to the sensing mode, infrared light showing a predetermined pattern (hereinafter, referred to as "structured light") is emitted from the infrared light irradiation unit 103. For example, structured light showing a dot pattern illustrated in FIG. 26 is emitted from the infrared light irradiation unit 103. On the other hand, in the case of setting to the CNV mode or the night mode, infrared light that does not have a specific pattern and has the same brightness (hereinafter, referred to as "flat light") is emitted from the infrared light irradiation unit 103.

Figure 27:
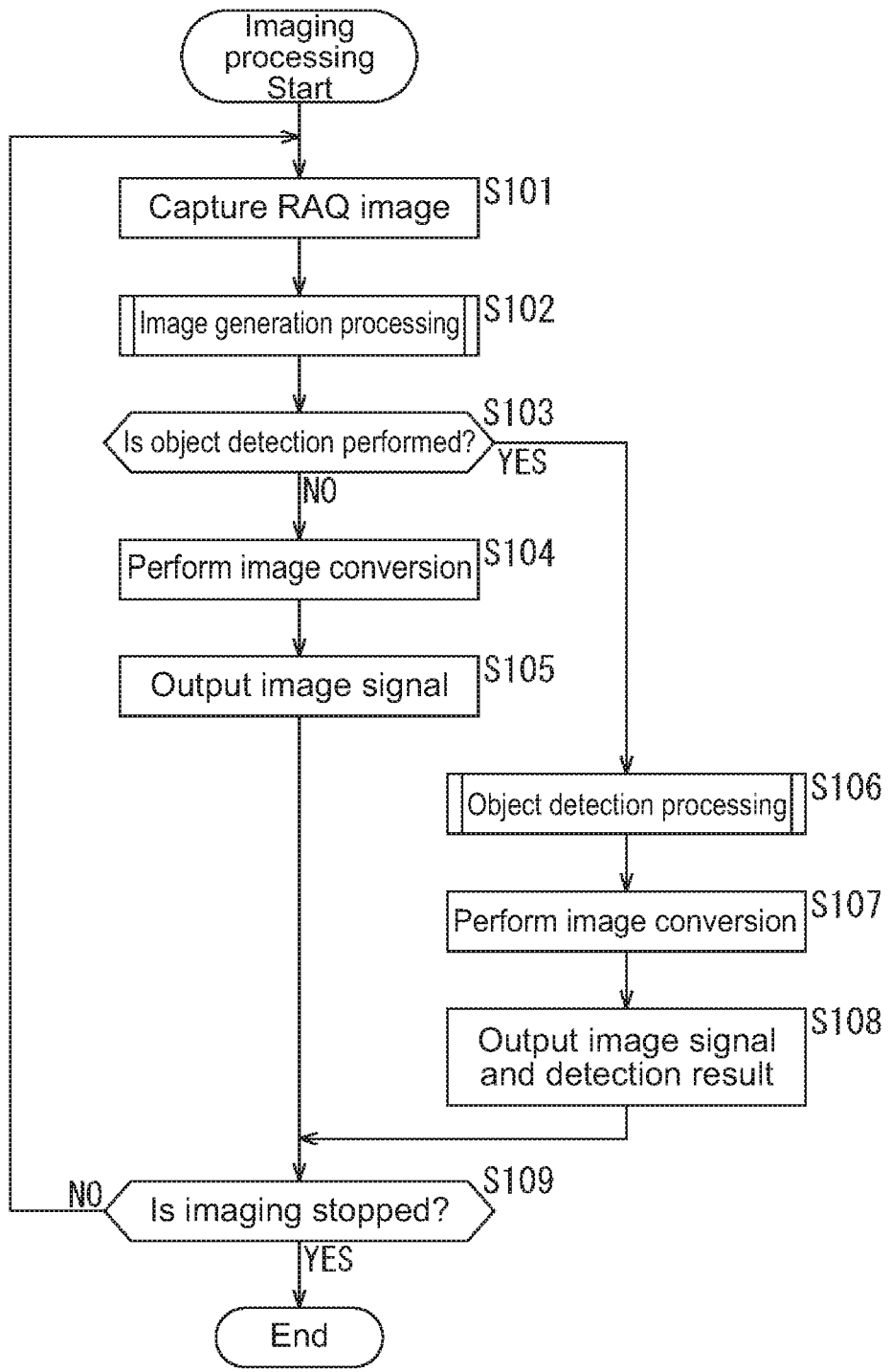
FIG. 27 is a flowchart illustrating an example of imaging processing.
Figure 28:
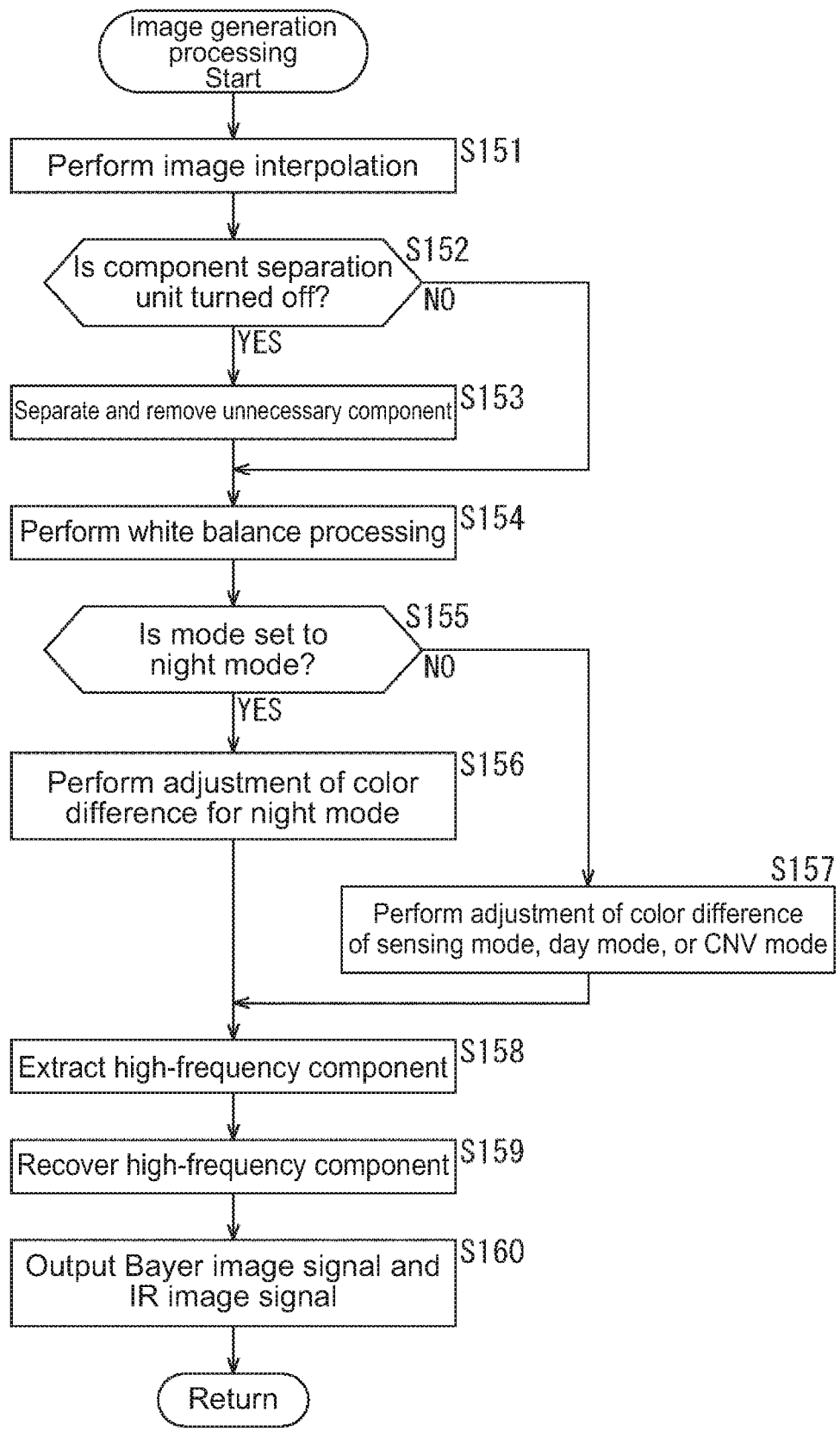
FIG. 28 is a flowchart illustrating an example of image generation processing.
Figure 29:
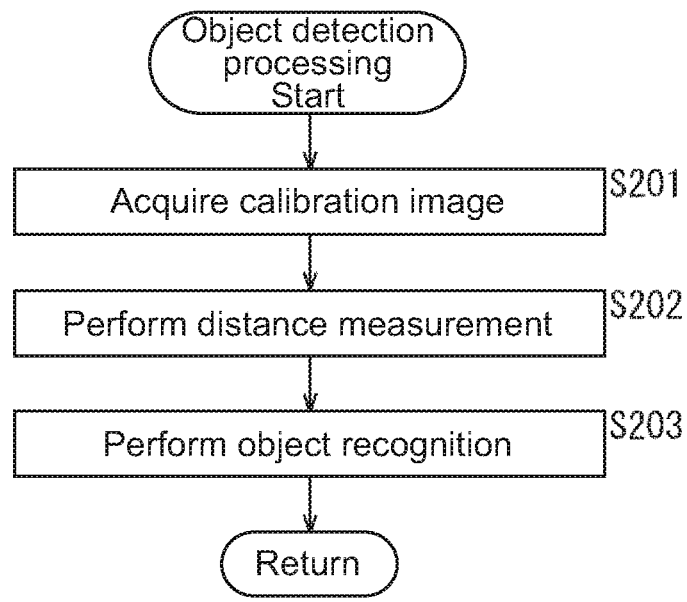
FIG. 29 is a flowchart illustrating an example of object detection processing.

(Imaging Processing) Next, imaging processing that is executed by the imaging device 100 will be described with reference to a flowchart in FIG. 27.

In step S101, the imaging element 106 captures an RAW image. Specifically, the imaging element 106 captures an image of light that is received through the imaging lens 104 and the optical filter 105, and supplies the RAW image signal that is obtained as a result of the imaging to the RGBIR interpolation filter 301 and the high-frequency G interpolation filter 302.

In step S102, the imaging device 100 executes image generation processing. Here, details of the image generation processing will be described with reference to a flowchart in FIG. 28.

In step S151, the RGBIR interpolation filter 301 and the high-frequency G interpolation filter 302 perform interpolation of pixels.

Specifically, as described above, the RGBIR interpolation filter 301 interpolates all of color signals for every pixel in the RAW image signals. The RGBIR interpolation filter 301 supplies $R_{+\Delta IR\_L}$ signals, $B_{+\Delta IR\_L}$ signals, and $IR_{+V\_L}$ signals after interpolation to the component separation unit 303, and supplies $G_{+\Delta IR\_L}$ signals after interpolation to the component separation unit 303, the high-frequency component extraction unit 307, and the high-frequency component recovery unit 308.

As described above, the high-frequency G interpolation filter 302 interpolates only the G signals for every pixel in the RAW image signals. The high-frequency G interpolation filter 302 supplies $G_{+\Delta IR\_H}$ signals after interpolation to the high-frequency component extraction unit 307.

In step S152, it is determined whether or not the component separation unit 303 is turned on. In a case where it is determined that the component separation unit 303 is turned on, the processing proceeds to step S153.

In step S153, the component separation unit 303 separates and removes an unnecessary component. Specifically, as described above, the component separation unit 303 separates and removes an infrared light component from the $R_{+\Delta IR\_L}$ signals, the $G_{+\Delta IR\_L}$ signals, and the $B_{+\Delta IR\_L}$ signals. The component separation unit 303 supplies $R_L$ signals, $G_L$ signals, and $B_L$ signals from which the infrared light component is removed to the white balance processing unit 304

In addition, as described above, the component separation unit 303 separates and removes a visible component from $IR_{+\Delta V\_L}$ signals. The component separation unit 303 supplies IR signals from which the visible component is removed to the IR image signal output unit 310.

Then, the processing proceeds to step S154.

On the other hand, in step S152, in a case where it is determined that the component separation unit 303 is turned off, the processing in step S153 is skipped, and the processing proceeds to step S154. At this time, the $R_{+\Delta IR\_L}$ signals, the $G_{+\Delta IR\_L}$ signals, and the $B_{+\Delta IR\_L}$ signals which are input to the component separation unit 303 are supplied to the white balance processing unit 304 as $R_L$ signals, $G_L$ signals, and $B_L$ signals without separating and removing the infrared light component. In addition, the $IR_{+\Delta V\_L}$ signals input to the component separation unit 303 are supplied to the IR image signal output unit 310 as IR signals without separating and removing the visible light component.

In step S154, the white balance processing unit 304 performs white balance processing. Specifically, as described above, the white balance processing unit 304 adjusts white balance in the $R_L$ signals, $G_L$ signals, and $B_L$ signals, and supplies the $R_L$ signals, $G_L$ signals, and $B_L$ signals of which white balance is adjusted to the YC conversion unit 351.

In step S155, the chroma gain control unit 401 determines whether or not a mode is set to the night mode. In a case where it is determined that the mode is set to the night mode, the processing proceeds to step S156.

In step S156, the color difference adjustment unit 306 performs adjustment of a color difference for the night mode.

Specifically, as described above, the YC conversion unit 351 converts an $R_L$ signal, a $G_L$ signal, and a $B_L$ signal into a luminance signal $Y_L$, and color difference signals Cr and Cb for every pixel. The YC conversion unit 351 supplies the luminance signal $Y_L$ to the RGB conversion unit 353. The YC conversion unit 351 supplies the color difference signal Cr to the multiplier 402, and supplies the color difference signal Cb to the multiplier 403.

The chroma gain control unit 401 sets the chroma gain Gc to zero. The chroma gain control unit 401 supplies the chroma gain Gc that is set to the multipliers 402 and 403.

The multiplier 402 multiplies the color difference signal Cr by the chroma gain Gc (=0), and supplies a color difference signal Cr' that is a multiplication result to the RGB conversion unit 353.

The multiplier 403 multiplies the color difference signal Cb by the chroma gain Gc (=0), and supplies a color difference signal Cb' that is a multiplication result to the RGB conversion unit 353.

As described above, the RGB conversion unit 353 converts the luminance signal $Y_L$, and the color difference signals Cr' and Cb' into an $R_L$ signal, a $G_L$ signal, and a $B_L$ signal for every pixel, and supplies the signals to the high-frequency component recovery unit 308.

Here, since the color difference signals Cr' and Cb' are zero, an image including $R_L$ signals, $G_L$ signals, and $B_L$ signals becomes a monochrome image.

Then, the processing proceeds to step S158.

On the other hand, in step S155, in a case where it is determined that the mode is set to the sensing mode, the day mode, or the CNV mode, the processing proceeds to step S157.

In step S157, the color difference adjustment unit 306 performs adjustment of a color difference for the sensing mode, the day mode, or the CNV mode.

Specifically, as described above, the YC conversion unit 351 converts an $R_L$ signal, a $G_L$ signal, and a $B_L$ signal into a luminance signal $Y_L$, and color difference signals Cr and Cb for every pixel. The YC conversion unit 351 supplies the luminance signal $Y_L$ to the RGB conversion unit 353. The YC conversion unit 351 supplies the color difference signal Cr to the multiplier 402, and supplies the color difference signal Cb to the multiplier 403.

As described above, the ratio calculation unit 305 calculates the visible light ratio Rc, and supplies the visible light ratio Rc to the control unit 102 and the chroma gain control unit 401.

As described above, the chroma gain control unit 401 sets the chroma gain Gc on the basis of the light measurement amount Q and the visible light ratio Rc by using the graph in FIG. 16. The chroma gain control unit 401 supplies the chroma gain Gc that is set to the multipliers 402 and 403.

The multiplier 402 multiplies the color difference signal Cr by the chroma gain Gc, and supplies a color difference signal Cr' that is a multiplication result to the RGB conversion unit 353.

The multiplier 403 multiplies the color difference signal Cb by the chroma gain Gc, and supplies a color difference signal Cb' that is a multiplication result to the RGB conversion unit 353.

As described above, the RGB conversion unit 353 converts the luminance signal $Y_L$, and the color difference signals Cr' and Cb' into an $R_L$ signal, a $G_L$ signal, and a $B_L$ signal for every pixel, and supplies the signals to the high-frequency component recovery unit 308.

Then, the processing proceeds to step S158.

In step S158, as described above, the high-frequency component extraction unit 307 extracts a high-frequency component $G_H$ on the basis of $G_{+AIR\_L}$ signals and $G_{+AIR\_H}$ signals. The high-frequency component extraction unit 307 supplies the extracted high-frequency component $G_H$ to the high-frequency component recovery unit 308.

In step S159, as described above, the high-frequency component recovery unit 308 recovers the high-frequency component $G_H$ in the $R_L$ signals, the $G_L$ signals, and the $B_L$ signals. The high-frequency component recovery unit 308 supplies R signals, G signals, and B signals in which the high-frequency component is recovered to the Bayer image signal output unit 309.

In step S160, the image generation unit 121 outputs Bayer image signals and IR image signals. Specifically, the Bayer image signal output unit 309 arranges R signals, G signals, and B signals in accordance with a Bayer array, and supplies the signals to the demosaic processing unit 501 and the recognition unit 562 as Bayer image signals. The IR image signal output unit 310 arranges IR signals in a two-dimensional lattice shape, and supplies the IR signals to the output unit 108 and the distance measurement unit 561 as IR image signals.

Then, the image generation processing is terminated.

Returning to FIG. 27, the object detection unit 551 determines whether or not perform object detection on the basis of user's setting or the like. In a case where it is determined that the object detection is not performed, the processing proceeds to step S104.

In step S104, the image conversion unit 122 performs image conversion.

Specifically, as described above, the demosaic processing unit 501 converts the Bayer image signals to demosaic image signals including the R signals, the G signals, and the B signals for every image signal, and supplies the demosaic image signals after conversion to the linear matrix operation unit 502.

As described above, the linear matrix operation unit 502 performs a linear matrix operation with respect to the demosaic image signals, and supplies the demosaic image signals after the operation to the gamma correction unit 503.

The gamma correction unit 503 performs gamma correction of the demosaic image signal in accordance with characteristics of a display, and supplies demosaic image signals after correction to the YC conversion unit 504.

As described above, the YC conversion unit 504 converts the demosaic image signals into YC image signals, and supplies the YG image signals after conversion to the output unit 108.

In step S105, the output unit 108 output image signals. That is, the output unit 108 outputs the YC image signals and the IR image signals.

Then, the processing proceeds to step S109.

On the other hand, in step S103, in a case where it is determined that the object detection is performed, the processing proceeds to step S106.

In step S106, the object detection unit 551 executes object detection processing. Here, details of the object detection processing will be described with reference to a flowchart in FIG. 29.

Figure 30:
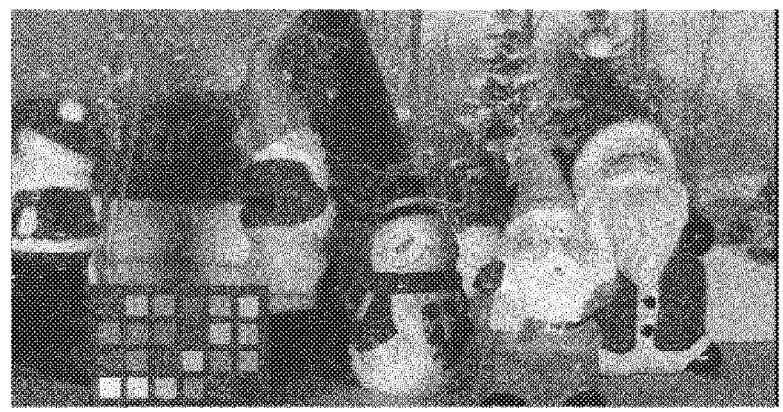
FIG. 30 is a view illustrating an example of a subject.

It should be noted that description will be given of the case of imaging subjects illustrated in FIG. 30 as an appropriate example. It should be noted that in FIG. 30, subjects are illustrated as a monochrome image. However, actually, colors are applied to the subjects.

Figure 31:
FIG. 31 is a view illustrating an example of a Bayer image.
Figure 32:
FIG. 32 is a view illustrating an example of an IR image.

In addition, FIG. 31 and FIG. 32 illustrate an example of a Bayer image based on the Bayer image signals obtained by the image generation processing in S102, and an IR image based on the IR image signals obtained by the image generation processing. The Bayer image in FIG. 31 and the IR image in FIG. 32 are parts of an image obtained by imaging the subjects illustrated in FIG. 30 in the same frame period. In addition, the IR image in FIG. 32 is obtained by imaging the subjects in FIG. 30 in a state in which the subjects are irradiated with structured light. It should be noted that the Bayer image in FIG. 31 is illustrated as a monochrome image. However, actually, the Bayer image is a color image.

In step S201, the distance measurement unit 561 acquires a calibration image.

Figure 33:
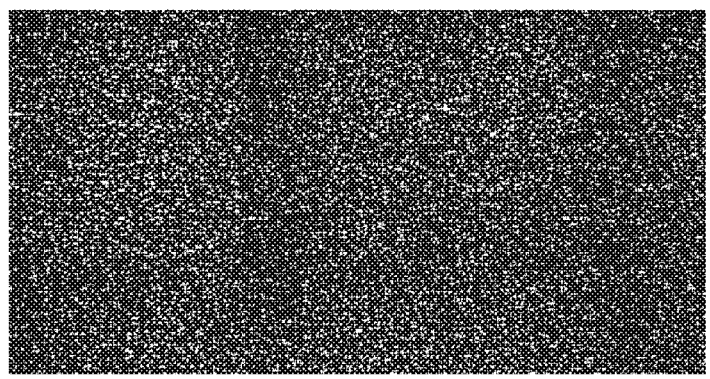
FIG. 33 is a view illustrating an example of a calibration image.

Here, the calibration image is an IR image obtained by imaging a plane that is formed vertically to an optical axis of the imaging device 100 (imaging lens 104) and does not have any pattern by the imaging device 100 in a state in which the plane is irradiated with structured light. Accordingly, as illustrated in FIG. 33, the calibration image becomes an image in which a pattern of the structured light is projected as is.

The calibration image is captured in advance, and is IR image signals indicating the calibration image (hereinafter, referred to as "calibration image signals") are stored in the storage unit 563. The distance measurement unit 561 reads out the calibration image signals from the storage unit 563.

Figure 34:
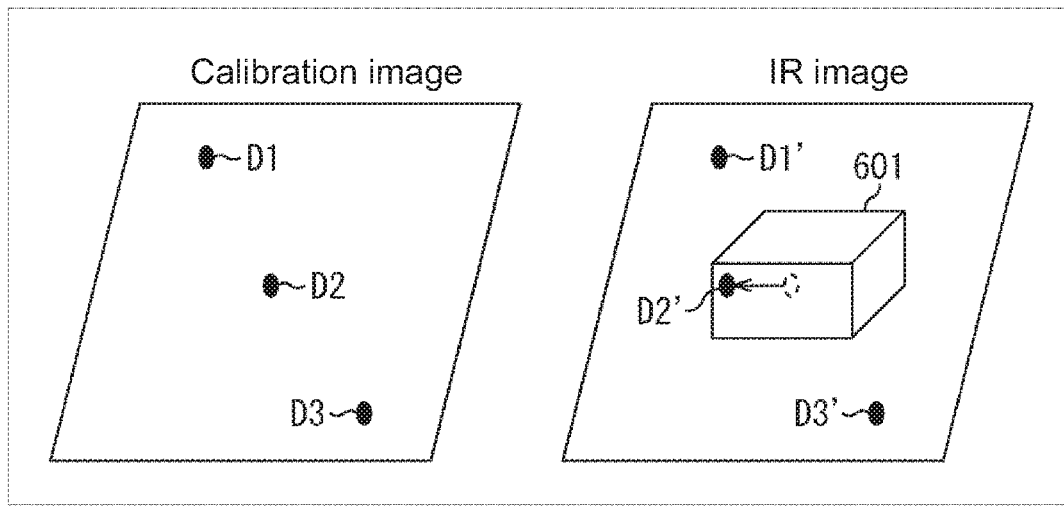
FIG. 34 is a view for describing a method of detecting a distance to an object.

In step S202, the distance measurement unit 561 performs distance measurement. For example, the distance measurement unit 561 performs correlation between respective dots in the calibration image and respective dots in the IR image obtained by imaging a subject. For example, as illustrated in FIG. 34, the distance measurement unit 561 performs detection of dots D1' to D3', which correspond to dots D1 to D3 in the calibration image, in the IR image. In addition, the distance measurement unit 561 calculates a distance from each of the dots in the IR image to an object on the basis of the distance between the corresponding dots.

For example, in an example illustrated in FIG. 34, structure light is projected to an object 601, and thus the dot D2' on the IR image moves to a left direction from a position of the corresponding dot D2 of the calibration image. The distance measurement unit 561 calculates a distance from a position of the dot D2' of the IR image to the object on the basis of a distance between the dot D2' and the dot D2. In addition, the distance measurement unit 561 performs the same processing with respect to all of the dots of the IR image to calculate distances from positions of the respective dots to the object. In addition, the distance measurement unit 561 generates a depth map indicating a distribution of distances up to the object, and supplies the generated depth map to the recognition unit 562.

Figure 35:
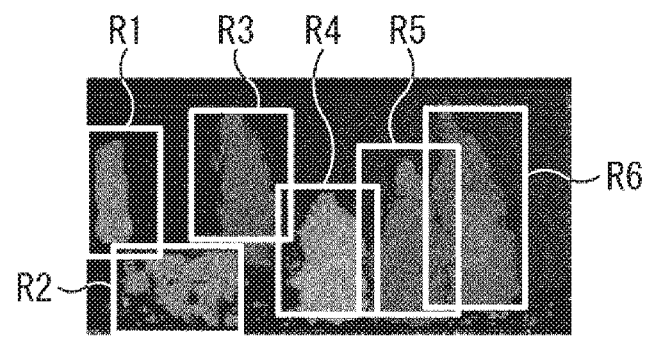
FIG. 35 is a view for describing a method of detecting a region of an object.

FIG. 35 illustrates an example of the depth map. In this example, the depth map is illustrated as a monochrome image. However, in an actual image, a color of a pixel varies in correspondence with a distance up to the object.

In step S203, the recognition unit 562 performs recognition of an object. For example, the recognition unit 562 detects a region in which an object exists on the basis of the depth map. For example, in the example illustrated in FIG. 35, regions R1 to R6 are detected.

Figure 36:
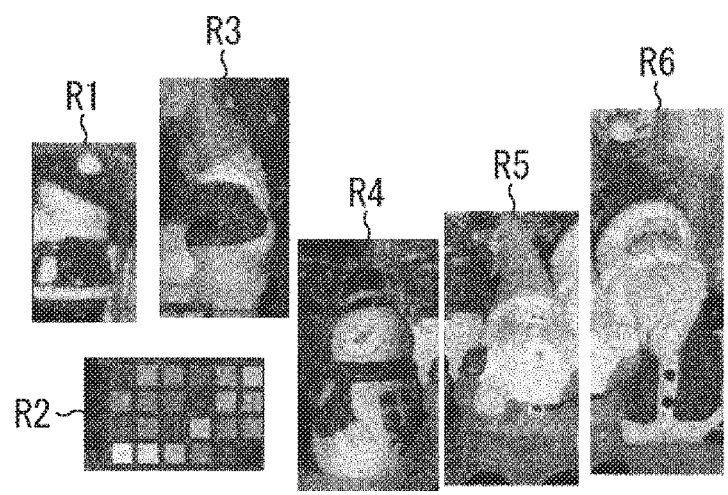
FIG. 36 is a view illustrating an example of a detection result of an object.

In addition, the recognition unit 562 performs recognition of an object in respective regions which are detected on the basis of the Bayer image. As an object recognition method of the recognition unit 562, an arbitrary method can be employed, and a convolutional neural network (CNN) can be used as an example. Accordingly, for example, as illustrated in FIG. 36, dolls in the regions R1, and R3 to R6, a color chart in the region R2 are recognized.

The recognition unit 562 supplies the detection result of the object to the output unit 108.

Then, the object detection processing is terminated.

As described above, after detecting regions in which an object exists on the basis of the IR image, object recognition processing is performed with respect to the regions which are detected. As a result, a calculation amount is reduced, and thus speeding-up of processing or reduction of load is realized. In addition, the IR image and the Bayer image are captured by the same imaging element 106, and imaging ranges becomes the same as each other, and thus it is not necessary to perform parallax correction. In addition, the IR image and the Bayer image are captured in the same frame period, and thus it is not necessary to consider movement of an object, and the like.

Accordingly, object detection with high accuracy is realized at a less processing amount.

Returning to FIG. 27, in step S107, image conversion is performed as in the processing in step S104.

In step S108, the output unit 108 outputs image signals and detection results. That is, the output unit 108 outputs the YC image signals, the IR image signals, and detection results of objects.

In step S109, the control unit 102 determines whether or not to stop imaging. In a case where it is determined that imaging is not stopped, the processing returns to step S101, and processing from step S101 to step S109 is repetitively executed until it is determined in step S109 that imaging is stopped.

On the other hand, in step S109, for example, in a case where a predetermined operation is performed by a user, a case where an imaging continuation time has passed, and the like, the control unit 102 determines that imaging is stopped, and the imaging processing is terminated.

2. Modification Example

Hereinafter, a modification example of the embodiment of the present technology will be described.

As described above, the imaging device 100 can acquire the color image and the IR image in parallel in the same frame period by using one piece of the imaging element 106. Description has been given of an example in which detection (depth sensing) of a distance up to an object is performed by using the IR image, and detection of the object is performed by using a result of the depth sensing. However, the result of the depth sensing may be used for another use.

For example, in face detection or face recognition by using a color image, it is difficult to detect impersonation using an image of a photograph or the like. In contrast, when performing plane detection by the depth sensing using the IR image, detection of impersonation becomes easy.

In addition, the IR image may be used for another use.

For example, processing such as iris authentication, auto focus, auto white balance, and back light correction can be performed using the IR image captured by using flat light. When using the IR image, the performance of the processing at a dark time or at a dark place is further improved in comparison to the case of using a color image.

In addition, for example, the IR image captured by using flat light can be used, particularly, for a viewing use (for example, monitoring or the like) at a dark time or at a dark place.

In addition, for example, when two pieces of the imaging elements 106 are provided in the imaging device 100, it is possible to perform stereo-imaging of the color image and the IR image in parallel.

Figure 37:
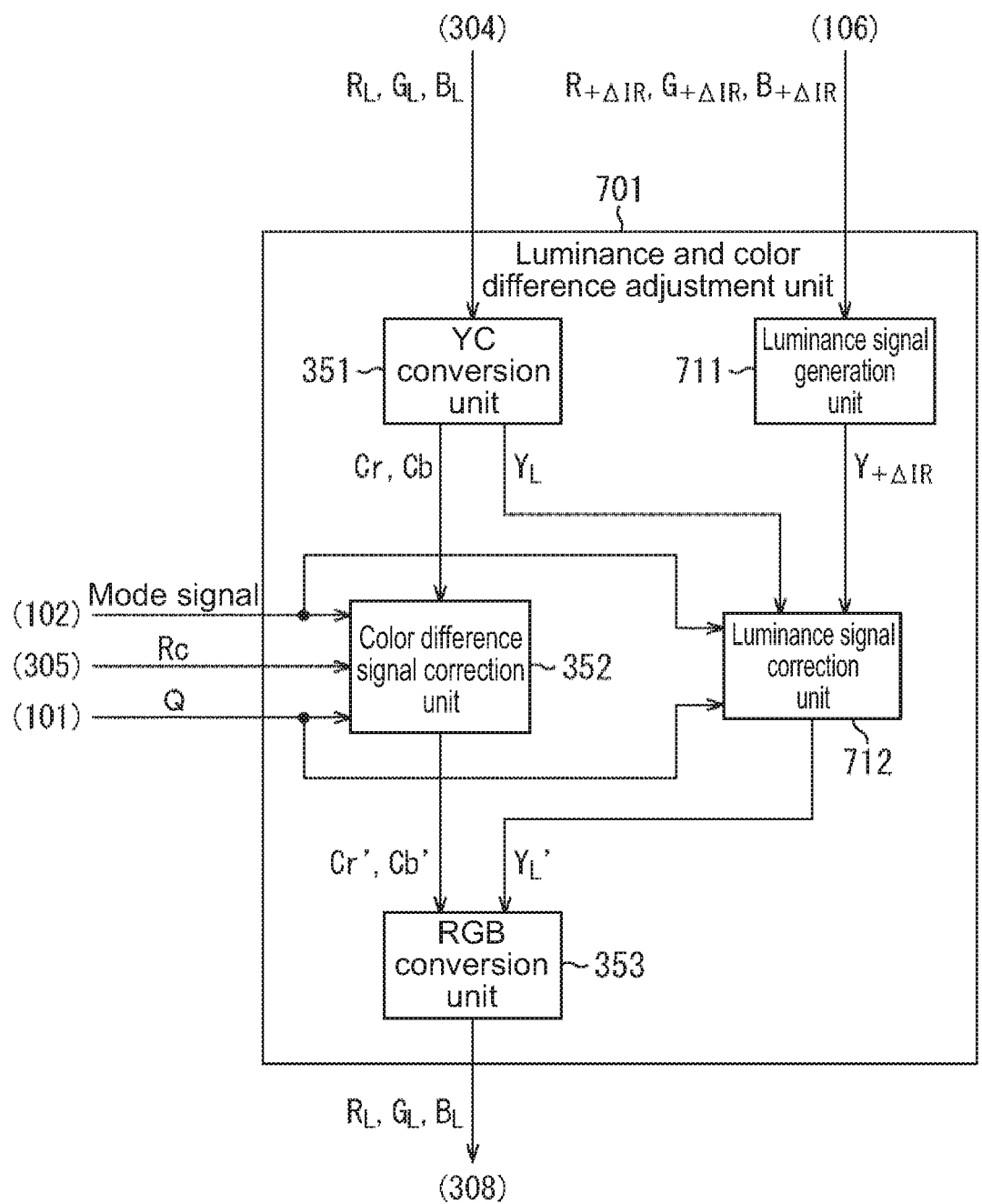
FIG. 37 is a block diagram illustrating a configuration example of luminance and color difference adjustment unit.

In addition, for example, in the image generation unit 121 in FIG. 9, a luminance and color difference adjustment unit 701 in FIG. 37 may be provided in substitution for the color difference adjustment unit 306, and not only a color difference signal but also a luminance signal may be corrected. It should be noted that in FIG. 37, the same reference numerals are given to portions corresponding to FIG. 14.

The luminance and color difference adjustment unit 701 in FIG. 37 is different from the color difference adjustment unit 306 in FIG. 14 in that a luminance signal generation unit 711 and a luminance signal correction unit 712 are added.

The luminance signal generation unit 711 generates luminance signals $Y_{+\Delta IR}$ from $R_{+\Delta IR}$ signals, $G_{+\Delta IR}$ signals, and $B_{+\Delta IR}$ signals which are supplied from the imaging element 106 by using the following Expression (32).

$$Y_{+\Delta IR}=(5G_{+\Delta IR}+2R_{+\Delta IR}+B_{+\Delta IR})/8 \quad (32)$$

The luminance signal generation unit 711 supplies the luminance signals $Y+_{\Delta IR}$ which are generated to the luminance signal correction unit 712.

Figure 38:
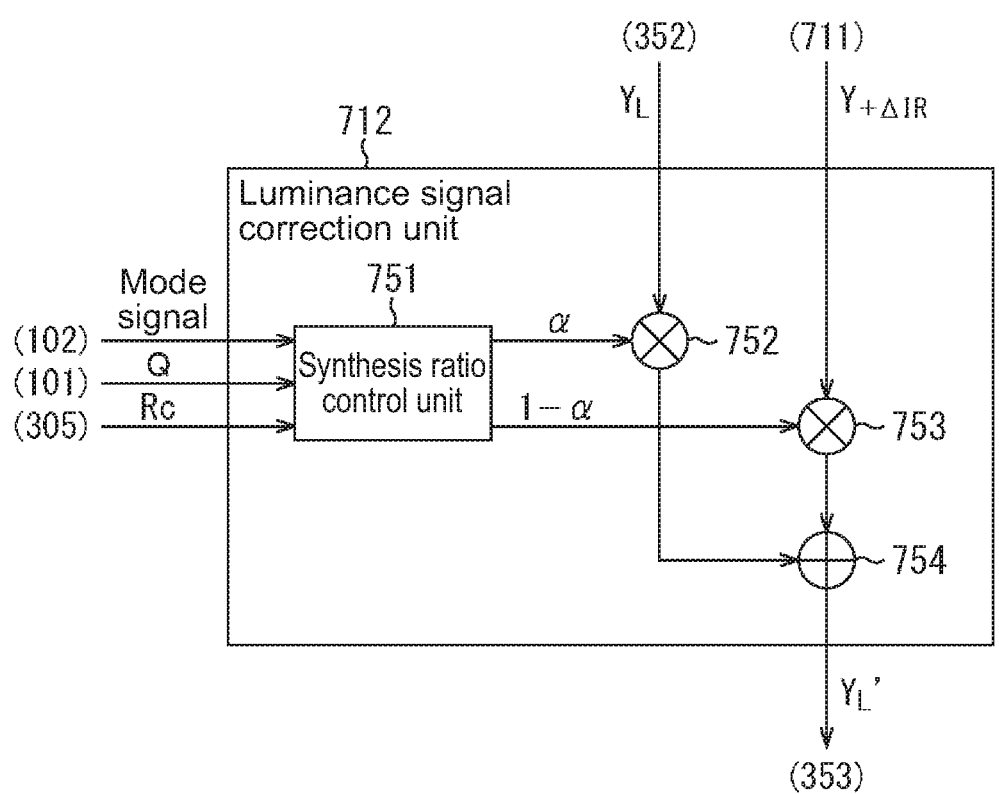
FIG. 38 is a block diagram illustrating a configuration example of a luminance signal correction unit.

FIG. 38 is a block diagram illustrating a configuration example of the luminance signal correction unit 712. The luminance signal correction unit 712 includes a synthesis ratio control unit 751, multipliers 752 and 753, and an adder 754.

The synthesis ratio control unit 751 controls a synthesis ratio α on the basis of the imaging mode, the light measurement amount Q, and the visible light ratio Rc.

Figure 39:
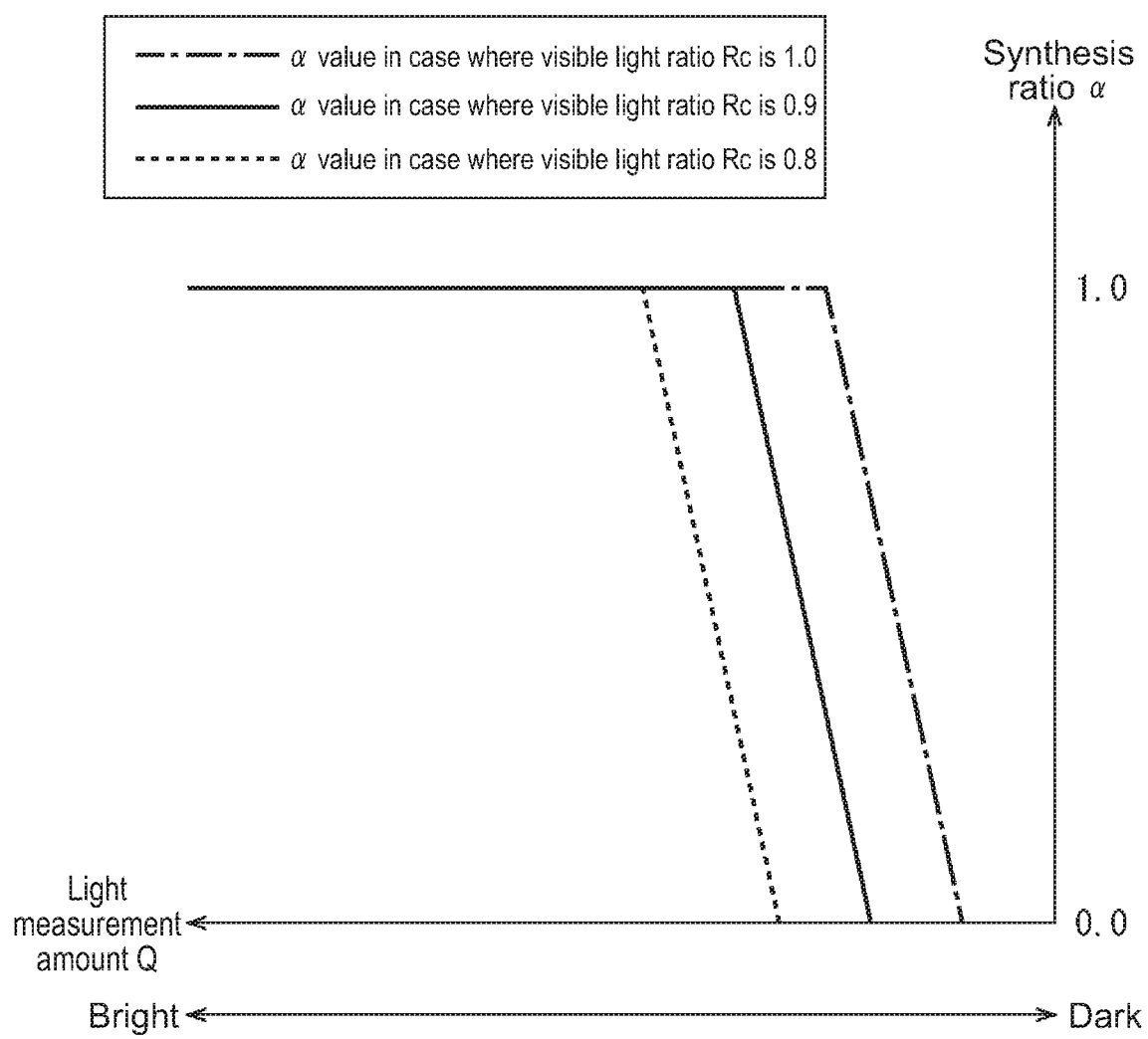
FIG. 39 is a graph showing a setting example of a synthesis ratio.

For example, in a case where a mode is set to the sensing mode, the day mode, or the CNV mode, the synthesis ratio control unit 751 sets the synthesis ratio α by using a graph in FIG. 39.

In FIG. 39, the vertical axis represents the synthesis ratio α, and the horizontal axis represents the light measurement amount Q. In addition, in the same drawing, a one-dot chain line represents a setting example of the synthesis ratio α in a case where the visible light ratio Rc is 1.0, and a solid line represents a setting example of the synthesis ratio α in a case where the visible light ratio Rc is 0.9. In addition, a dotted line represents a setting example of the synthesis ratio α in a case where the visible light ratio Rc is 0.8.

As illustrated in the same drawing, the smaller the light measurement amount Q is and the higher a ratio of an infrared light component is, the smaller the set synthesis ratio α is.

On the other hand, in a case where the mode is set to the night mode, the synthesis ratio control unit 751 sets a value of the synthesis ratio α to zero.

The synthesis ratio control unit 751 supplies the synthesis ratio α that is set to the multiplier 752, and supplies a subtraction result 1−α obtained by subtracting the synthesis ratio α from 1 to the multiplier 753.

It should be noted that the synthesis ratio control unit 751 is provided in the image processing unit 107, but the synthesis ratio control unit 751 may be provided in the control unit 102 as an example.

The multiplier 752 multiplies the synthesis ratio α by the luminance signal $Y_L$, and supplies the multiplication result to the adder 754.

The multiplier 753 multiplies the subtraction result 1−α supplied form the synthesis ratio control unit 751 by a $Y+_{\Delta IR}$ signal, and supplies the multiplication result to the adder 754.

The adder 754 adds the multiplication results of the multipliers 752 and 753, and supplies the addition result to the RGB conversion unit 353 as a luminance signal $Y_L'$.

Accordingly, in a case where the mode is set to the sensing mode, the day mode, or the CNV mode, the luminance signal $Y_L'$ satisfy a relationship of the following Expression (33).

$$Y_L'=\alpha \times (Y_L)+(1-\alpha) \times Y_{+\Delta IR} \quad (33)$$

On the other hand, in a case where the mode is set to the night mode, the luminance signal $Y_L'$ satisfies a relationship of the following Expression (34).

$$Y_L'=Y_{+\Delta IR} \quad (34)$$

The luminance signal correction unit 712 supplies the luminance signal $Y_L'$ to the RGB conversion unit 353.

The RGB conversion unit 353 converts the luminance signal $Y_L'$, and the color difference signals Cr' and Cb' into an $R_L$ signal, a $G_L$ signal, and a $B_L$ signal by using Expressions (22) to (24). The RGB conversion unit 353 supplies the $R_L$ signal, the $G_L$ signal, and the $B_L$ signal after conversion to the high-frequency component recovery unit 308.

In addition, the array of the pixels is illustrative only, and another array may be used.

Figure 40:
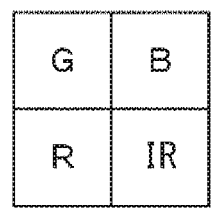
FIG. 40 is a view illustrating a first modification example of a pixel array of an imaging element.

For example, as illustrated in FIG. 40, a pattern including two pixels (vertical)×two pixels (horizontal) may be set to one unit, and pixels 211 may be arranged in a ratio of R pixels:G pixels:B pixels:IR pixels=1:1:1:1 in respective patterns.

Figures 41, 42:
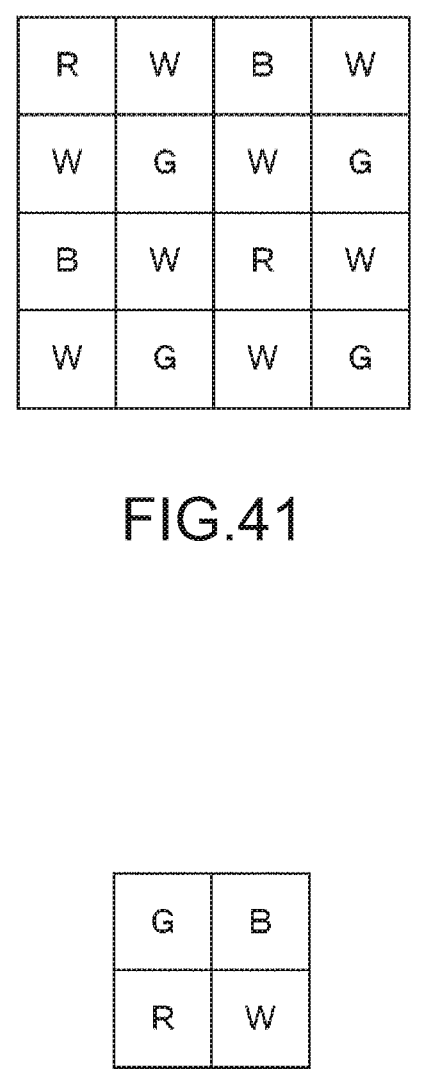

In addition, as illustrated in FIG. 41 and FIG. 42, W (white) pixels may be used instead of the IR pixel. In FIG. 41, the IR pixels in a pixel array in FIG. 5 are substituted with G pixels, and the G pixels in the pixel array are substituted with W pixels. In FIG. 42, the IR pixels in the pixel array in FIG. 40 are substituted with W pixels.

Figure 43:
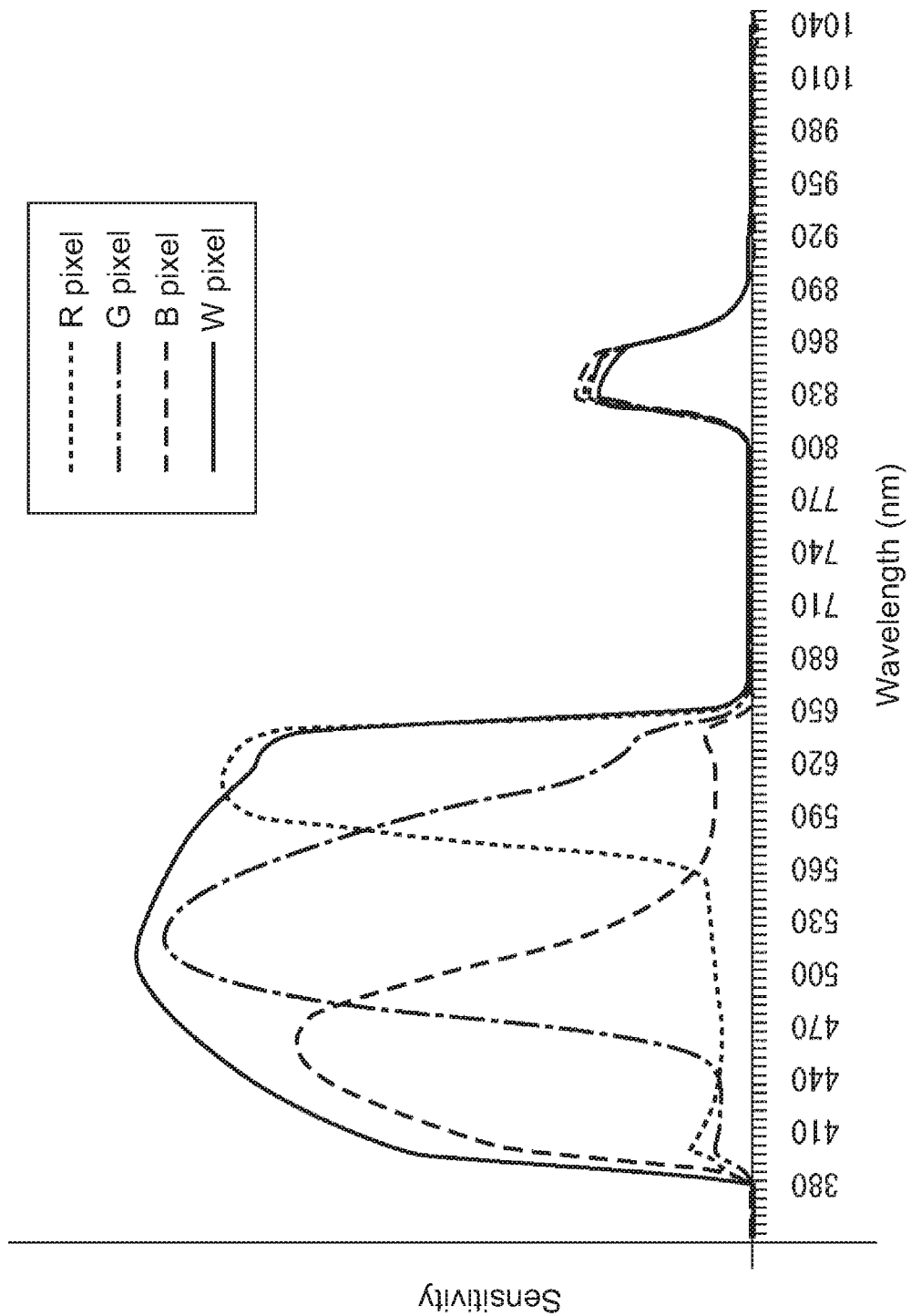
FIG. 43 is a graph showing a second example of the sensitivity characteristics for every pixel.

FIG. 43 is a graph showing an example of sensitivity characteristics for every pixel 211. In the same drawing, the horizontal axis represents a wavelength of light, and the vertical axis represents sensitivity of the pixel 211 with respect to light of the wavelength. In addition, a solid line represents sensitivity characteristics of the W pixels, and a fine dotted line represents sensitivity characteristics of the R pixels. In addition, a one-dot chain line represents sensitivity characteristics of the G pixels, and a rough dotted line represents sensitivity characteristics of the B pixels.

The sensitivity of each of the R pixels, the G pixels, and the B pixels shows a peak with respect to each of red visible right, green visible light, and blue visible light. The sensitivity of the W pixels shows a waveform including a waveform of the sensitivity of the R pixels, the G pixels, and the B pixels. The sensitivity of the R, G, B, and W pixels with respect to infrared light is approximately the same in each case.

In the case of using the W pixels, for example, a visible light component is removed from pixel signals of the W pixels, an infrared light component is extracted, and an IR image is generated.

In addition, invisible light (for example, ultraviolet light) other than the infrared light may be used, pixels capable of detecting the invisible light may be provided instead of the IR pixels, and an image by the invisible light may be obtained.

In addition, for example, as color pixels, a combination of pixels of three or greater colors other than the R pixels, the G pixels, and the B pixels may be used.

In addition, for example, in the viewing mode, the night mode may not be provided, and only the day mode and the CNV mode may be provided. For example, the brightness of surroundings may be classified into two stages of "bright" and "dark", and in a case where the surroundings are bright, a mode may be set to the day mode. In addition, in a case where the surroundings are dark, the mode may be set to the CNV mode.

In addition, for example, in the sensing mode and the CNV mode, the shutter for every pixel may not be turned on, and presence or absence of irradiation with IR light may be controlled for every frame period. In this case, for example, a frame period in which irradiation with the IR light is performed and a frame period in which irradiation with the IR light is not performed are alternately repeated. In addition, IR image signals are generated on the basis of RAW image signals (particularly, signals of IR pixels and W pixels) in the frame period in which irradiation with the IR light is performed, and Bayer image signals and YC image signals are generated on the basis of RAW image signals (particularly, signals of R pixels, G pixels, and B pixels) in the frame period in which irradiation with the IR light is not performed.

In addition, for example, in a case where the IR cut filter 233 can almost completely remove an infrared light component, the sensing mode and the CNV mode may be set to the same mode as in the night mode. That is, even when irradiation with infrared light is continuously performed without using the shutter for every pixel, color pixels do not receive infrared light, and thus it is possible to obtain a color image and an IR image with high image quality.

In addition, for example, the IR cut filter 233 may not be provided in the imaging element 106, and in the component separation unit 303, an infrared light component of the R signals, the G signals, and the B signals may be separated and removed.

In addition, description has been given of an example in which the YC image signals are output from the imaging device 100, but an image signal of another format may be output. For example, image signals of a Bayer array, or image signals in which respective signals of R, G, and B are included in respective pixels may be output.

3. Application Example

{Configuration Example of Computer}

The above-described series of processing can be executed by hardware or software. In the case of executing the series of processing by software, a program that constitutes the software is installed in a computer. Here, examples of the computer include a computer that is provided in dedicated hardware, a general-purpose pc that can executes various functions by installing various programs, and the like.

Figure 44:
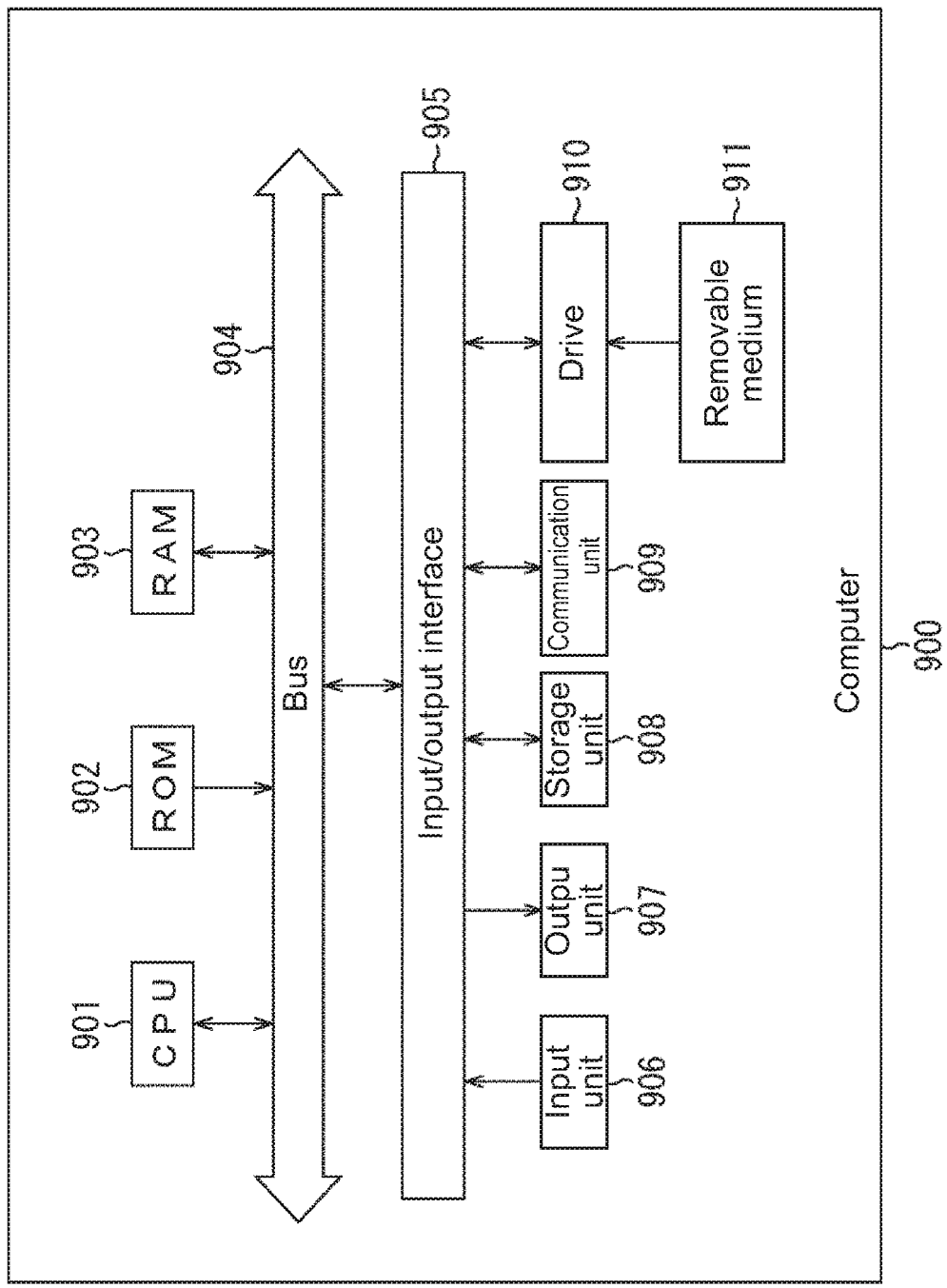
FIG. 44 is a block diagram illustrating a configuration example of a computer.

FIG. 44 is a block diagram illustrating a configuration example of hardware of a computer 900 that executes the above-described series of processing by a program.

In the computer 900, a central processing unit (CPU) 901, a read only memory (ROM) 902, and a random access memory (RAM) 903 are connected to each other through a bus 904.

An input/output interface 905 is further connected to the bus 904. An input unit 906, an output unit 907, a storage unit 908, a communication unit 909, and a drive 910 are connected to the input/output interface 905.

The input unit 906 is constituted by a keyboard, a mouse, a microphone, or the like. The output unit 907 is constituted by a display, a speaker, or the like. The storage unit 908 is constituted by a hard disk, a nonvolatile memory, or the like. The communication unit 909 is constituted by a network interface. The drive 910 drives a removable medium 911 such as a magnetic disk, an optical disc, a magneto-optical disc, and a semiconductor memory.

In the computer 900 having the above-described configuration, the CPU 901 loads a program that is stored, for example, in the storage unit 908 into the RAM 903 through the input/output interface 905 and the bus 904, and executes the program. Accordingly, the above-described series of processing is performed.

The program that is executed by the computer 900 (CPU 901) can be provided in a state of being recorded, for example, on the removable medium 911 as a package medium or the like. In addition, the program can be provided through a wired or wireless transmission medium such as a local area network, the Internet, and digital satellite broadcasting.

In the computer 900, the program can be installed in the storage unit 908 through the input/output interface 905 when the removable medium 911 is mounted in the drive 910. In addition, the program can be installed in the storage unit 908 after being received by the communication unit 909 through the wired or wireless transmission medium. In addition, the program can be installed in the ROM 902 or the storage unit 908 in advance.

It should be noted that the program that is executed by the computer 900 may be a program in which processing is performed in time-series in accordance with the procedure described in this specification, or may be a program in which processing is performed in parallel or at a necessary timing such as when a call is made.

{Application Example to Endoscopic Operating System}

The technology according to the present disclosure is applicable to various products. For example, the technology according to the present disclosure may be applied to an endoscopic operating system.

Figure 45:
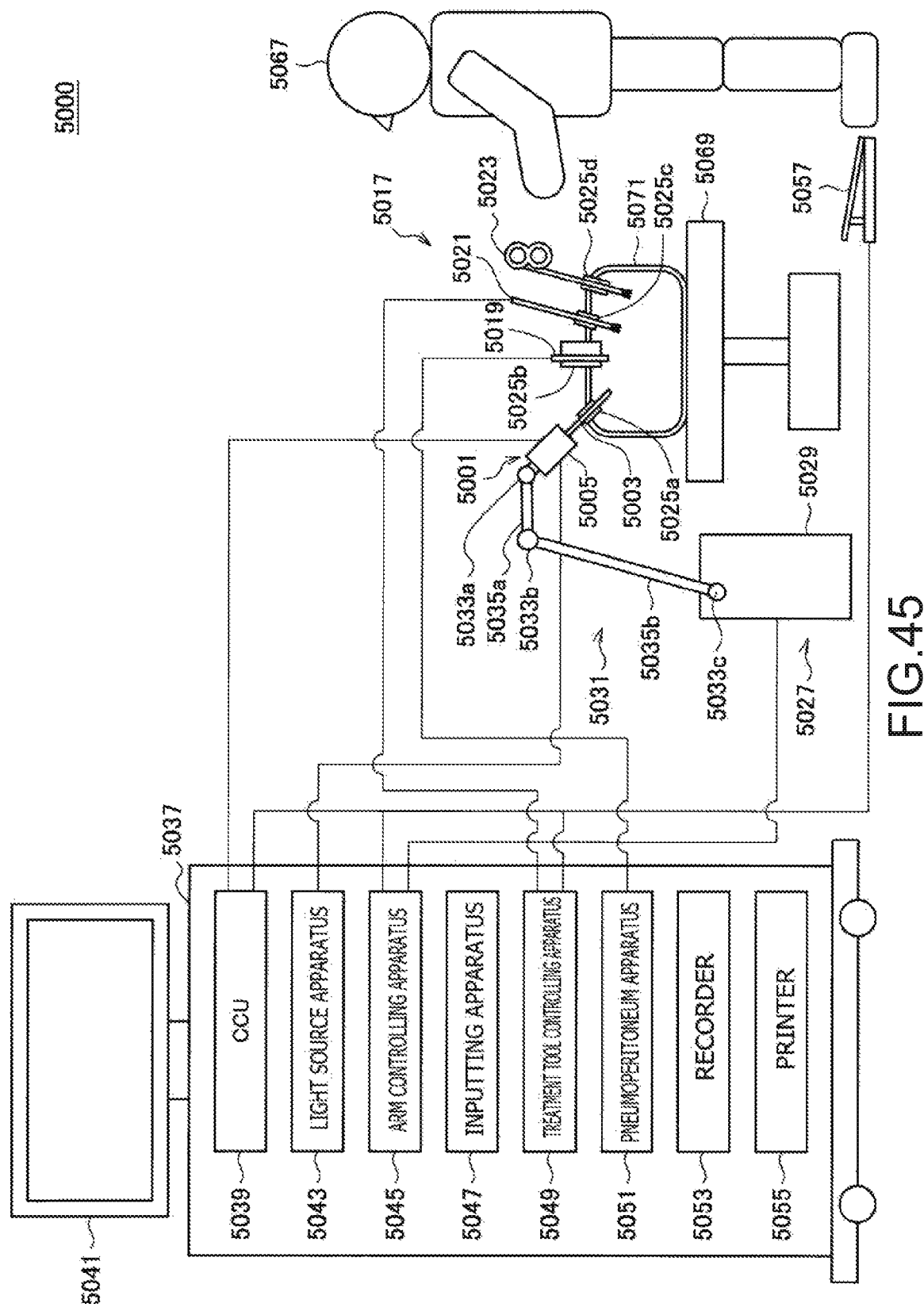
FIG. 45 is a view depicting an example of a schematic configuration of an endoscopic surgery system.

FIG. 45 is a view depicting an example of a schematic configuration of an endoscopic surgery system 5000 to which the technology according to an embodiment of the present disclosure can be applied. In FIG. 45, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body lumens of the patient 5071 through the trocars 5025a to 5025d. In the example depicted, as the other surgical tools 5017, a pneumoperitoneum tube 5019, an energy treatment tool 5021 and forceps 5023 are inserted into body lumens of the patient 5071. Further, the energy treatment tool 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, a pair of tweezers or a retractor may be used.

An image of a surgical region in a body lumen of the patient 5071 imaged by the endoscope 5001 is displayed on a display apparatus 5041. The surgeon 5067 would use the energy treatment tool 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy treatment tool 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body lumen of the patient 5071, and a camera head 5005 connected to a proximal end of the lens barrel 5003. In the example depicted, the endoscope 5001 is depicted which includes as a hard mirror having the lens barrel 5003 of the hard type. However, the endoscope 5001 may otherwise be configured as a soft mirror having the lens barrel 5003 of the soft type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body lumen of the patient 5071 through the objective lens. It is to be noted that the endoscope 5001 may be a direct view mirror or may be a perspective view mirror or a side view mirror.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy treatment tool 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy treatment tool 5021 for cautery or incision of a tissue, sealing of a blood vessel or the like. A pneumoperitoneum apparatus 5051 feeds gas into a body lumen of the patient 5071 through the pneumoperitoneum tube 5019 to inflate the body lumen in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 45, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body lumen of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the surgery room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 46:
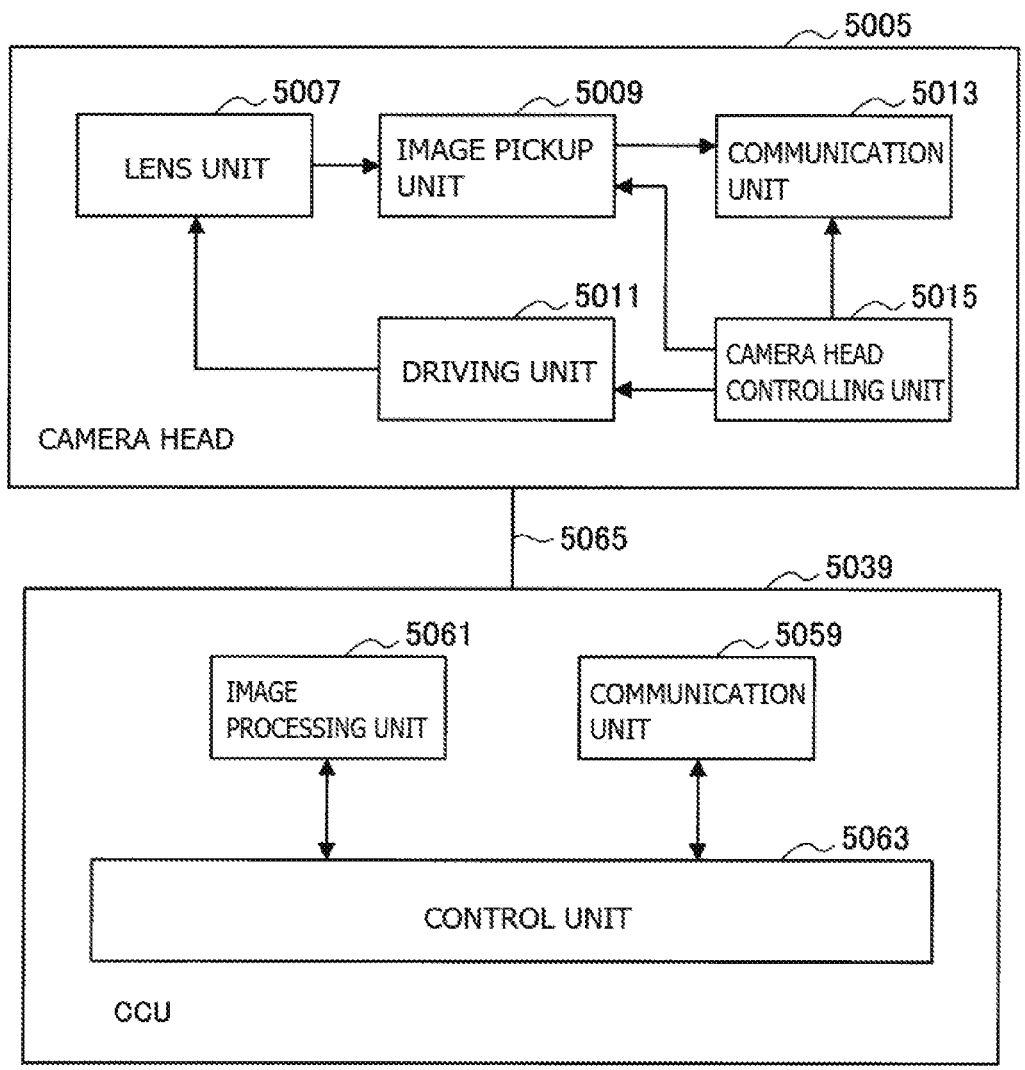
FIG. 46 is a block diagram depicting an example of a functional configuration of a camera head and a camera control unit (CCU) depicted in FIG. 45.

Functions of the camera head 5005 of the endoscope 5001 and the CCU 5039 are described in more detail with reference to FIG. 46. FIG. 46 is a block diagram depicting an example of a functional configuration of the camera head 5005 and the CCU 5039 depicted in FIG. 45.

Referring to FIG. 46, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and is disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy treatment tool 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the surgery room. Therefore, such a situation that movement of medical staff in the surgery room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a soft endoscopic system for inspection or a microscopic surgery system.

The technology according to an embodiment of the present disclosure can be suitably applied to at least either one of the camera head 5005 and the CCU 5039 of the above-mentioned configurations. Specifically, for example, the control unit 102 and the imaging element 106 shown in FIG. 1 can be applied to the camera head controlling unit 5015 and the image pickup unit 5009, the imaging lens 104 and the optical filter 105 shown in FIG. 1 can be applied to the lens unit 5007, the image processing unit 107 shown in FIG. 1 can be applied to the image processing unit 5061, and the infrared light irradiation unit 103 can be provided in the camera head 5005. Accordingly, for example, a clearer surgical region image is obtained and detection accuracy of an object in a surgical region image is improved, and thus surgery can be more safely and more reliably performed.

{Application Example to Vehicle Control System}

Moreover, for example, the technology according to the present disclosure may be realized as a device mounted on any kind of movable objects such as a car, an electric car, a hybrid electric car, a motorcycle, a bicycle, a personal mobility, an aircraft, a drone, a ship, a robot, a construction machine, and an agricultural machine (tractor).

Figure 47:
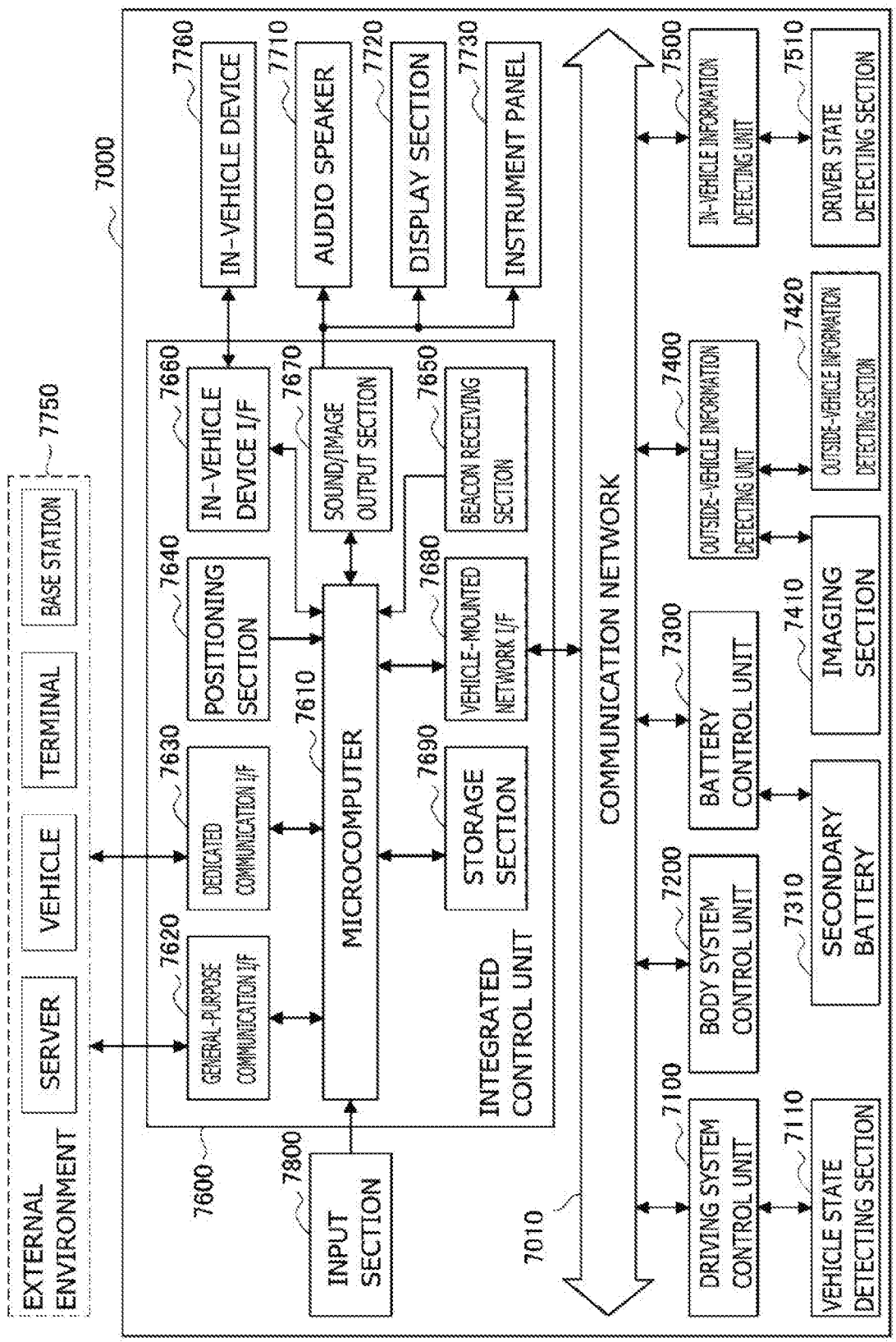
FIG. 47 is a block diagram depicting an example of schematic configuration of a vehicle control system.

FIG. 47 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 47, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 47 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 48:
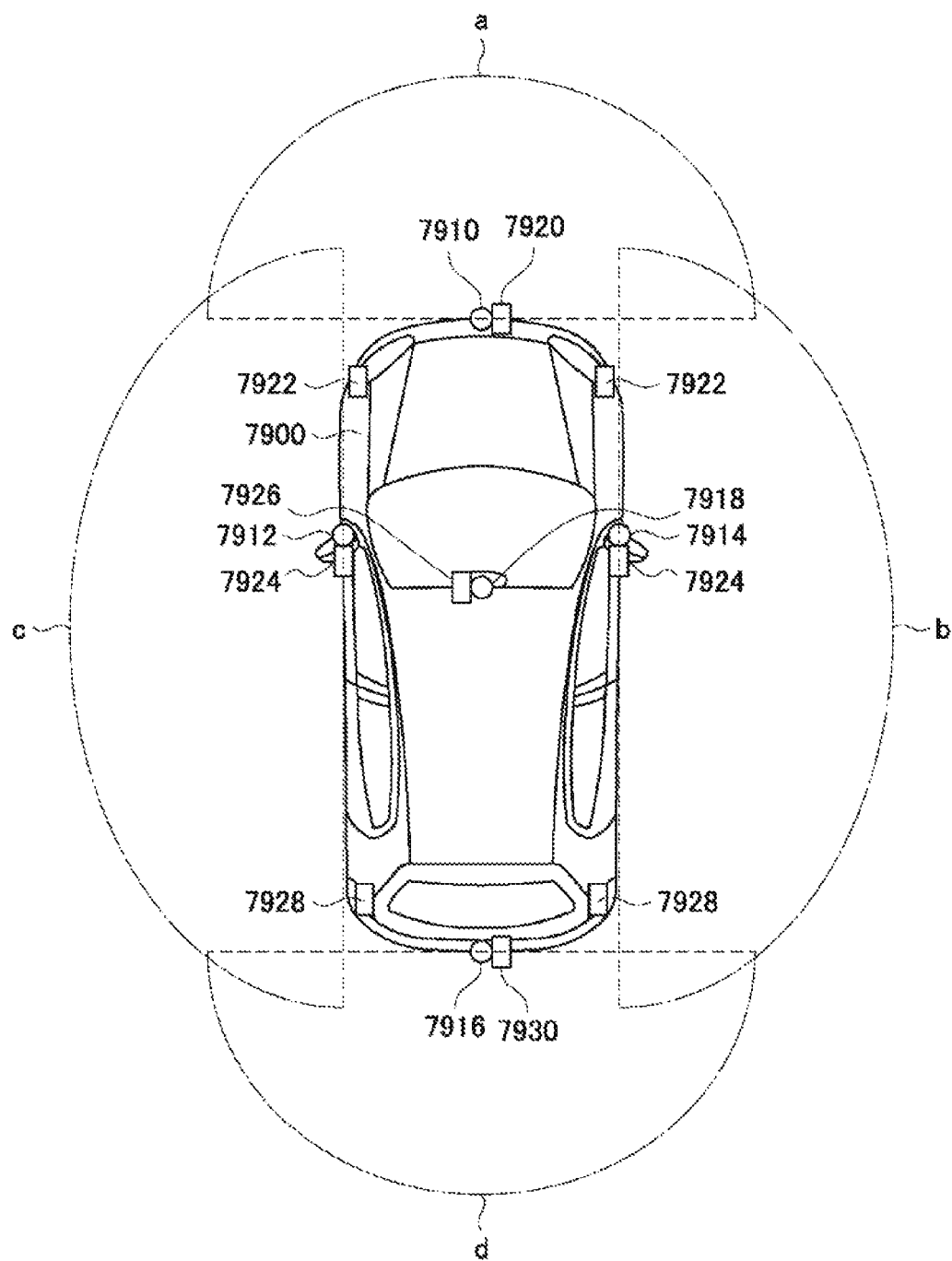
FIG. 48 is a diagram of assistance in explaining an example of installation positions of an outside-vehicle information detecting section and an imaging section.

FIG. 48 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 48 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 47, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 47, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as a text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 47 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the imaging device 100 according to this embodiment described with reference to FIG. 1 is applicable to the imaging section 7410 or the driving state detection unit 7510 in the application example illustrated in FIG. 47. Accordingly, for example, at a dark time or at a dark place, detection accuracy of an object at the outside of a vehicle, or detection accuracy of a driver's face and respective portions of the face in the vehicle is improved, and accuracy of driving assistance such as danger avoidance and automatic driving is improved.

In addition, in this specification, the system represents an assembly of a plurality of constituent elements (devices, modules (parts), and the like), and it is not necessary for all of the constituent elements to be present in the same housing. Accordingly, a plurality of devices which are accommodated in separate housings and are connected to each other through a network, and one device in which a plurality of modules are accommodated in one housing are included in the system.

In addition, an embodiment of the present technology is not limited to the above-described embodiment, and various modifications can be made in a range not departing from the gist of the present technology.

For example, the present technology can have a cloud computing configuration in which one function is shared by a plurality of devices and is processed in cooperation through a network.

In addition, the respective steps described in the flowcharts can be executed in a state of being distributed to a plurality of devices in addition to execution by one device.

In addition, in a case where a plurality of kinds of processing are included in one step, the plurality of kinds of processing included in one step can be executed in a state of being distributed to a plurality of devices in addition to execution by one device.

The effect described in this specification is illustrative only, there is no limitation to the effect, and another effect may be present.

In addition, for example, the present technology can employ the following configurations.

(1) An imaging device including:
a control unit that controls irradiation with invisible light;
an imaging element that includes a first pixel that is capable of detecting the invisible light, and a second pixel that is capable of detecting visible light; and an image generation unit that generates a first image including the invisible light component and a second image including a visible light component on the basis of a first pixel signal transmitted from the first pixel and a second pixel signal transmitted from the second pixel.

(2) The imaging device according to (1), further including
an object detection unit that performs detection of a distance to an object on the basis of the first image and performs detection of an object in the second image on the basis of a detection result of the distance to the object.

(3) The imaging device according to (2), in which
the control unit controls irradiation with the invisible light that projects a predetermined pattern.

(4) The imaging device according to any one of (1) to (3), in which
the imaging element includes a filter that attenuates the invisible light component that is included in light incident to a light-receiving unit of the second pixel.

(5) The imaging device according to (4), in which
the control unit performs control so that irradiation with the invisible light is continuously performed.

(6) The imaging device according to any one of (1) to (5), in which
the control unit sets an exposure period of the first pixel and the second pixel in each frame period, sets an independent exposure period that is a period in which only the first pixel is exposed, and performs control so that irradiation with the invisible light is performed in the independent exposure period.

(7) The imaging device according to any one of (1) to (5), in which
the control unit controls presence or absence of irradiation with the invisible light for every frame period, and
the image generation unit generates the first image on the basis of the first pixel signal in a frame period in which irradiation with the invisible light is performed, and generates the second image on the basis of the second pixel signal in a frame period in which irradiation with the invisible light is not performed.

(8) The imaging device according to any one of (1) to (7), in which
the first pixel includes an IR pixel that is used in detection of infrared light,
the second pixel includes a color pixel that is used in detection of a predetermined color, and
the invisible light is infrared light.

(9) The imaging device according to (8), in which
the color pixel includes an R pixel that is used in detection of a red color, a G pixel that is used in detection of a green color, and a B pixel that is used in detection of a blue color.

(10) The imaging device according to any one of (1) to (7), in which
the first pixel includes a white pixel,
the second pixel includes a color pixel that is used in detection of a predetermined color, and
the invisible light is infrared light.

(11) The imaging device according to (10), in which
the color pixel includes an R pixel that is used in detection of a red color, a G pixel that is used in detection of a green color, and a B pixel that is used in detection of a blue color.

(12) The imaging device according to any one of (1) to (11), further including
an irradiation unit that performs irradiation with the invisible light.

(13) The imaging device according to (12), in which
the irradiation unit performs irradiation with the invisible light having same brightness, or the invisible light that projects a predetermined pattern.

(14) An image processing method including:
a control step of controlling irradiation with invisible light; and
an image generation step of generating a first image including the invisible light component, and a second image including a visible light component on the basis of a first pixel signal transmitted from a first pixel of an imaging element and a second pixel signal transmitted from a second pixel of the imaging element, the first pixel being capable of detecting the invisible light, the second pixel being capable of detecting visible light.

(15) An image processing system including:
an irradiation device that performs irradiation with invisible light;
an imaging device that includes an imaging element including a first pixel capable of detecting the invisible light and a second pixel capable of detecting visible light; and
an image processing device that generates a first image including the invisible light component and a second image including a visible light component on the basis of a first pixel signal transmitted from the first pixel and a second pixel signal transmitted from the second pixel.

REFERENCE SIGNS LIST 100 imaging device
101 light measurement unit
102 control unit
103 infrared light irradiation unit
104 imaging lens
105 optical filter
106 imaging element
107 image processing unit
108 output unit
121 image generation unit
122 image conversion unit
123 sensing unit
202 pixel array unit
211 pixel
231 microlens array
232 color filter
233 IR cut filter
234 color filter
301 RGBIR interpolation filter
302 high-frequency G interpolation filter
303 component separation unit
305 ratio calculation unit
309 Bayer image signal output unit
310 IR image signal output unit
551 object detection unit
561 distance measurement unit
562 recognition unit

The invention claimed is:

1. An imaging device, comprising:
a control unit configured to control irradiation of invisible light on an imaging range;
an imaging element that includes:
a first pixel configured to detect the invisible light, and
a second pixel configured to detect visible light;
an image generation unit configured to generate a first image including an invisible light component and a second image including a visible light component, based on a first pixel signal transmitted from the first pixel and a second pixel signal transmitted from the second pixel, respectively; and
a distance measurement unit configured to execute a correlation operation between each dot of a plurality of dots in the first image and a corresponding dot of a plurality of dots in a calibration image, wherein the calibration image is an image of a plane in which the invisible light with a specific pattern is projected.

2. The imaging device according to claim 1, further comprising an object detection unit configured to:
determine a distance of each of the plurality of dots in the first image to an object, based on the executed correlation operation; and
detect the object in the second image based on the determined distance to the object.

3. The imaging device according to claim 2, wherein the control unit is further configured to control the irradiation of the invisible light to project the specific pattern.

4. The imaging device according to claim 1, wherein the imaging element further includes a filter configured to attenuate the invisible light component in light incident to a light-receiving unit of the second pixel.

5. The imaging device according to claim 4, wherein the control unit is further configured to control the irradiation of the invisible light such that the irradiation is continuous.

6. The imaging device according to claim 1, wherein the control unit is further configured to:
set an exposure period of the first pixel and the second pixel in a frame period;
set an independent exposure period in which only the first pixel is exposed; and
control the irradiation of the invisible light such that the invisible light is irradiated in the independent exposure period.

7. The imaging device according to claim 1, wherein
the control unit is further configured to control one of presence or absence of irradiation with the invisible light for a plurality of frame periods, and
the image generation unit is further configured to:
generate the first image based on the first pixel signal in a frame period in which the invisible light is irradiated, and
generate the second image based on the second pixel signal in a frame period in which the invisible light is not irradiated.

8. The imaging device according to claim 1, wherein
the first pixel includes an infrared (IR) pixel configured to detect infrared light, the second pixel includes a color pixel configured to detect a color, and the invisible light is the infrared light.

9. The imaging device according to claim 8, wherein the color pixel further includes:
   an R pixel configured to detect a red color,
   a G pixel configured to detect a green color, and
   a B pixel configured to detect a blue color.

10. The imaging device according to claim 1, wherein the first pixel includes a white pixel,
    the second pixel includes a color pixel configured to detect a color, and
    the invisible light is infrared light.

11. The imaging device according to claim 10, wherein the color pixel includes:
    an R pixel configured to detect a red color,
    a G pixel configured to detect a green color, and
    a B pixel configured to detect a blue color.

12. The imaging device according to claim 1, further comprising an irradiation unit configured to irradiate the imaging range with the invisible light.

13. The imaging device according to claim 12, wherein the irradiation unit is further configured to irradiate the invisible light with the specific pattern.

14. An image processing method, comprising:
    controlling irradiation of invisible light on an imaging range;
    generating a first image including an invisible light component, and a second image including a visible light component, based on a first pixel signal transmitted from a first pixel of an imaging element and a second pixel signal transmitted from a second pixel of the imaging element, wherein
    the first pixel is configured to detect the invisible light, and
    the second pixel is configured to detect visible light; and
    executing a correlation operation between each dot of a plurality of dots in the first image and a corresponding dot of a plurality of dots in a calibration image, wherein the calibration image is an image of a plane in which the invisible light with a specific pattern is projected.

15. An image processing system, comprising:
    an irradiation device configured to irradiate invisible light;
    an imaging device that includes:
        an imaging element that includes:
            a first pixel configured to detect the invisible light, and
            a second pixel configured to detect visible light; and
    an image processing device configured to:
        generate a first image including an invisible light component and a second image including a visible light component, based on a first pixel signal transmitted from the first pixel and a second pixel signal transmitted from the second pixel; and
        execute a correlation operation between each dot of a plurality of dots in the first image and a corresponding dot of a plurality of dots in a calibration image, wherein the calibration image is an image of a plane in which the invisible light with a specific pattern is projected.

* * * * *